US006633875B2

(12) United States Patent
Brady

(10) Patent No.: US 6,633,875 B2
(45) Date of Patent: Oct. 14, 2003

(54) COMPUTER DATABASE SYSTEM AND METHOD FOR COLLECTING AND REPORTING REAL ESTATE PROPERTY AND LOAN PERFORMANCE INFORMATION OVER A COMPUTER DRIVEN NETWORK

(76) Inventor: Shaun Michael Brady, 3549 Fox Hall Dr., Davidsonville, MD (US) 21035

( * ) Notice: Subject to any disclaimer, the term of this patent is extended or adjusted under 35 U.S.C. 154(b) by 0 days.

(21) Appl. No.: 09/476,071

(22) Filed: Dec. 30, 1999

(65) Prior Publication Data

US 2003/0041063 A1 Feb. 27, 2003

(51) Int. Cl.$^7$ .............................................. G06F 17/30
(52) U.S. Cl. ............................ 707/10; 707/9; 705/36; 705/38
(58) Field of Search ............................ 707/1, 2, 4, 5, 707/10, 102, 104.1; 705/30, 35; 709/101, 201, 203, 217

(56) References Cited

U.S. PATENT DOCUMENTS

| | | | |
|---|---|---|---|
| 5,043,891 A | * | 8/1991 | Goldstein et al. ............ 364/419 |
| 5,596,750 A | * | 1/1997 | Li et al. ...................... 395/671 |
| 5,915,093 A | * | 6/1999 | Berlin et al. ............ 395/200.49 |
| 6,021,397 A | * | 2/2000 | Jones et al. .................... 705/35 |
| 6,122,648 A | * | 9/2000 | Roderick ..................... 707/513 |
| 6,192,347 B1 | * | 2/2001 | Graff ............................ 705/36 |
| 6,246,999 B1 | * | 6/2001 | Riley et al. .................... 705/30 |
| 6,253,208 B1 | * | 6/2001 | Wittgreffe et al. ......... 707/104.1 |

* cited by examiner

Primary Examiner—Hosain T. Alam
Assistant Examiner—Jacques Veillard
(74) Attorney, Agent, or Firm—Mattingly, Stanger & Malur, P.C.

(57) ABSTRACT

Real estate data, particularly data of multifamily housing, is stored in a database. The database is accessible to data providers who add data to the database through connection via a computer driven network, such as the Internet. Also, the database can be queried to generate reports providing property and loan performance information generated from the data input by the data providers. Each record in the database pertains to an asset, which data is proprietary to the data provider. Reports resulting from queries that would provide data of an asset or that could be used to provide data of an asset are not allowed. Data is received from a large number of data providers and is passed through a number of validation checks before being entered into the database in order to ensure integrity of the collected data. Also, for updating data of an asset or receiving data from different data providers for the same asset, asset matching is performed to match data of an asset being received with existing data in the database for that asset. As a result, confidentiality of asset level data is maintained in a database system that is publicly accessible over the Internet.

1 Claim, 84 Drawing Sheets

Select characteristics of the type of properties you want to look at

| Market | Time Period | Financing | Report |

Number of Units: Minimum: ☐ Maximum: ☐

Age of Property: Original Construction Year between: ☐ and ☐
Last Major Renovation between: ☐ and ☐

Building Type: ☐ Garden ☐ Mid Rise/High Rise ☐ Townhouse ☐ Walk Up

| | Heat/Gas | Electric | Water | Sewer |
|---|---|---|---|---|
| Who Pays Utilities: No Preference: | ○ | ○ | ○ | ○ |
| Owner Paid: | ○ | ○ | ○ | ○ |
| Tenant Paid: | ○ | ○ | ○ | ○ |

Amenities: ☐ Pool ☐ Basketball ☐ Covered Parking ☐ Guard
☐ Spa ☐ Tennis ☐ Washer/Dryer ☐ Pets

[ Next ]

FIG. 4

Select Time Period you want to report on

| Market | Property | [Time Period] | Financing | Report |

Time A
4Q 1996

Time B
4Q 1997

Time C
4Q 1998

☐ Same Store Sales

Next

FIG. 5

Select Financing Characteristics of the properties you want to look at

| Market | Property | Time Period | | Report |
|---|---|---|---|---|

| | No Preference | Exclude All | Include Only |
|---|---|---|---|
| Section 8 | ○ | ○ | ○ |
| FHA Insured | ○ | ○ | ○ |
| Non-FHA | ○ | ○ | ○ |
| Tax Abatement | ○ | ○ | ○ |
| Rent Control | ○ | ○ | ○ |
| LIHTC | ○ | ○ | ○ |

[ Next ]

*FIG. 6*

Select the Type of Report you would like to look at

| Market | Property | Time Period | Financing |
|---|---|---|---|

Show  ○ Annualized Data
      ○ Four Trailing Quarters

Using ○ Means
      ○ Medians

Report Title: _____

Report Prepared For: _____

Submit

*FIG. 7*

Data Elements Description

| | |
|---|---|
| CONTROL (HEADER) FILE | 51 |
| LOAN STATIC INFORMATION | 52 |
| LOAN DYNAMIC INFORMATION | 53 |
| LOAN ADJUSTABLE RATE INFORMATION | 54 |
| LOAN PREPAYMENT INFORMATION | 55 |
| FORECLOSURE OR WORKOUT INFORMATION | 56 |
| PROPERTY STATIC INFORMATION | 57 |
| PROPERTY DYNAMIC PERFORMANCE INFORMATION | 58 |
| PROPERTY VALUATION INFORMATION | 59 |
| LOW-INCOME HOUSING TAX CREDIT INFORMATION | 60 |
| TARGET RENT INFORMATION | 61 |
| AFFORDABLE HOUSING PROGRAM INFORMATION | 62 |

LOAN STATIC INFORMATION

```
LOAN PURPOSE
    ACQUISITION/PURCHASE,
    DEVELOPMENT/CONSTRUCTION,
REFINANCE,
    REHABILITATION (>25% OF LOAN
AMOUNT FOR REHAB),
    OTHER, N/A
ORIGINAL LOAN AMOUNT
LOAN CLOSE DATE
INTEREST RATE
    ADJUSTABLE RATE, FIXED RATE
INTEREST RATE INDEX
    TREASURY, 11TH DISTRICT
COST OF FUNDS INDEX,
    CONSUMER PRICE INDEX,
LIBOR,
    PRIM, OTHER
TERM FOR INTEREST RATE INDEX
MORTGAGE MARGIN OR SPREAD
ORIGINAL LOAN RATE
AMORTIZATION BEGIN MONTH
AMORTIZATION PERIOD IN MONTHS
ORIGINAL LOAN TERM IN MONTHS
MATURITY DATE
FHA PROJECT NUMBER
PAYMENT FREQUENCY
PREPAYMENT PENALTY INDICATOR
BALLOON INDICATOR
ORIGINAL LTV RATIO
ORIGINAL PROPERTY VALUE AMOUNT
ISSUANCE BOND RATING
SELLER FINANCED INDICATOR
SUBORDINATE DEBT INDICATOR
SUBORDINATE HARD DEBT AMOUNT
NUMBER OF SUBORDINATE HARD DEBT
INSTRUMENTS
SUBORDINATE SOFT DEBT AMOUNT
NUMBER OF SUBORDINATE SOFT DEBT
INSTRUMENTS
```
~52a

FIG. 9

LOAN STATIC INFORMATION

```
LETTERS OF CREDIT AMOUNT
GRANTS AMOUNT
NUMBER OF GRANTS
MULTIPLE PROPERTY INDICATOR
   MULTIPLE PROPERTIES (EXCLUSIVE OF SCATTERED SITE),
   ONLY ONE PROPERTY,  N/A
POINTS OR FEES AMOUNT
SERVICING FEE
LENDER PARTICIPATION INDICATOR
RECOURSE INDICATOR
ADDITIONAL COLLATERAL
   CROSS COLLATERALIZED,  LETTERS OF CREDIT,
   NO ADDITIONAL COLLATERAL,  OTHER,  N/A
INITIAL REPLACEMENT RESERVE AMOUNT
REQUIRED REPLACEMENT RESERVE CONTRIBUTION AMOUNT
```

LOAN DYNAMIC INFORMATION

```
LOAN STATUS
    CURRENT, DELINQUENT, TERMINATED, WORKOUT, N/A
HUD LOAN STATUS
INSURANCE IN FORCE  HUD HELD  N/A
TERMINATION     FORECLOSURE/REO, PAID OFF IN FULL,
    SOLD/TRANSFERRED,  OTHER, N/A
UNPAID PRINCIPAL BALANCE
SCHEDULED PRINCIPAL BALANCE
PAID UP TO DATE
SCHEDULED PI DUE AMOUNT
CURRENT LOAN RATE
TERMINATION DATE
PAID OFF AMOUNT
PREPAYMENT PENALTY PAIDCURRENT DSC RATIO FIRST
MORTGAGE
LOAN RATE CEILING
LOAN RATE FLOOR
MAXIMUM RATE DECREASE
MAXIMUM RATE INCREASE
MAXIMUM PAYMENT CAP
MAXIMUM NEGATIVE AMORTIZATION
FIRST ADJUSTMENT MONTH
RATE ADJUSTMENT FREQUENCY
RATE PAYMENT ADJUSTMENT FREQUENCY
UNDERWRITING RATE
PREPAYMENT PENALTY TYPE
     DECLINING, STRAIGHT LINE, YIELD MAINTENANCE,
     OTHER, N/A
LOCKOUT END DATE
PREPAYMENT TERM END DATE
FORECLOSURE NOTIFICATION DATE
BANKRUPTCY INDICATOR
FORECLOSURE DATE
SALE DATE
RECOVERED VALUE
SALE AMOUNT
SALE EXPENSE
NEW LOAN CODE
     GRANTED DUE TO FORECLOSURE, GRANTED FOR A
WORKOUT
     N/A
```

PROPERTY STATIC INFORMATION

```
PROPERTY OWNERSHIP
     COOPERATIVE, HUD LIMITED
     DIVIDEND,
     NOT FOR PROFIT, FOR PROFIT,
     REIT,
     GOVERNMENT OWNED/PUBLIC
HOUSING,
     OTHER, N/A
PROPERTY NAME
STREET ADDRESS
CITY NAME
STATE
ZIP
ZIP EXTENSION
COUNTY NAME
COUNTY FIPS CODE
CENSUS TRACT NUMBER
CONGRESS DISTRICT NUMBER
MSA NAME
MSA FIPS CODE
NEIGHBORHOOD TYPE
LATITUDE
LONGITUDE
PURCHASE AMOUNT
REHABILITATION AMOUNT
OTHER ACQUISITION AMOUNT
ACQUISITION DATE
SCATTERED SITE INDICATOR
NUMBER OF RESIDENTIAL BUILDINGS
NUMBER OF STORIES
PROJECT TYPE
     CO-OP, RENTAL, OTHER, N/A
```
~57a

FIG. 12

PROPERTY STATIC INFORMATION

```
SPECIAL TENANCY TYPE
    CORPORATE APARTMENTS, DISABLED,
ELDERLY, MILITARY,
    NONE, STUDENT, OTHER, N/A
ELDERLY HOUSING TYPE
    ASSISTED LIVING, CONGREGATE, CONTINUING
    CARE,
    INDEPENDENT LIVING/NO SERVICE, OTHER,
N/A
BUILDING DESCRIPTION
    GARDEN, HIGH RISE ELEVATOR (7+ STORIES),
    MID RISE ELEVATOR (UP TO 6 STORIES),
    WALK-UP, TOWNHOUSE, OTHER
BUILDING TYPE
    GARDEN, MOBILE HOME PARK, TOWNHOUSE,
    OTHER,
N/A
SRO INDICATOR
    YES, NO, N/A
RENT CONTROL INDICATOR
    YES, NO, N/A
INITIAL CONSTRUCTION YEAR
SUBSTANTIAL REHAB COMPLETION YEAR
NUMBER OF UNITS
NUMBER OF HANDICAPPED ACCESSIBLE UNITS
NUMBER EFFICIENCY UNITS
SQ FT EFFICIENCY UNITS
NUMBER 1 BEDROOM UNITS
AVERAGE SQ FT 1 BEDROOM
NUMBER 2 BEDROOM UNITS
AVERAGE SQ FT 2 BEDROOM
NUMBER 3 BEDROOM UNITS
AVERAGE SQ FT 3 BEDROOM
```

PROPERTY STATIC INFORMATION

```
NUMBER 4+ BEDROOM UNITS
AVERAGE SQ FT 4+ BEDROOM
NET RENTABLE RESIDENTIAL SQ FT
TOTAL PARKING SPACES
GARAGE PARKING SPACES
CARPORT PARKING SPACES
NET COMMERCIAL SQ FT
PROPERTY LAND AREA (ACRES)
ELEVATOR INDICATOR
AIR CONDITIONING INDICATOR
HEAT OR GAS PAYMENT
     OWNER,   TENANT,   N/A
ELECTRIC PAYMENT
     OWNER,   TENANT,   N/A
WATER PAYMENT
     OWNER,   TENANT,   N/A
SEWER PAYMENT
     OWNER,   TENANT,   N/A
WASH/DRYER INDICATOR
TENNIS COURT INDICATOR
SWIMMING POOL INDICATOR
BASKETBALL COURT INDICATOR
WORKOUT FACILITY INDICATOR
GROUND LEASE INDICATOR
```
~57c

FIG. 14

PROPERTY DYNAMIC PERFORMANCE INFORMATION

```
REVENUE AND EXPENSE AS OF DATE
REVENUE AND EXPENSE PERIODS
INCLUDED
GROSS POTENTIAL RESIDENT RENT
GROSS POTENTIAL GOVT RENT
TOTAL GROSS POTENTIAL RENT
TOTAL VACANCY
RESIDENTIAL VACANCY
COMMERCIAL VACANCY
COLLECTION LOSS
NET COMMERCIAL RENT
INTEREST INCOME
NONRENT INCOME
TOTAL REVENUE
PROPERTY MANAGEMENT FEE
TOTAL ADMINISTRATIVE EXPENSE
MARKETING EXPENSE
PAYROLL EXPENSE
MAINTENANCE EXPENSE
TOTAL UTILITY EXPENSE
WATER/SEWER EXPENSE
WATER EXPENSE
SEWER EXPENSE
ELECTRICITY EXPENSE
GAS EXPENSE
OIL EXPENSE
OTHER UTILITY EXPENSE
INSURANCE EXPENSE
SOCIAL SERVICE EXPENSE
TAXES
OTHER EXPENSE
TAX ABATEMENT INDICATOR
TOTAL OPERATING EXPENSE
NET OPERATING INCOME
INTEREST PAID
PRINCIPAL PAID
DEBT SERVICE FIRST MORTGAGE
DEBT SERVICE SUBORDINATE LOANS
GROUND LEASE PAYMENT
REPLACEMENT RESERVE ACTUAL
```
~58a

FIG. 15

PROPERTY DYNAMIC PERFORMANCE INFORMATION

```
EXPENSE
REPLACEMENT RESERVE BALANCE
CAPITAL EXPENDITURES
RESIDUAL RECEIPTS BALANCE
NUMBER OCCUPIED RESIDENTIAL UNITS
NUMBER VACANT UNITS
COMMERCIAL OCCUPIED PERCENT
CURRENT EFFECTIVE MARKET RENT 0 BEDROOM
MARKET RENT 0 BEDROOM AS OF DATE
CURRENT EFFECTIVE MARKET RENT 1 BEDROOM
MARKET RENT 1 BEDROOM AS OF DATE
CURRENT EFFECTIVE MARKET RENT 2 BEDROOM
MARKET RENT 2 BEDROOM AS OF DATE
CURRENT EFFECTIVE MARKET RENT 3 BEDROOM
MARKET RENT 3 BEDROOM AS OF DATE
CURRENT EFFECTIVE MARKET RENT 4+ BEDROOM
MARKET RENT 4+ BEDROOM AS OF DATE
UNIT TURNOVER
```

PROPERTY VALUATION INFORMATION

VALUATION EFFECTIVE DATE
VALUATION TYPE
      APPRAISAL/EXTERNAL VALUATION,
      INTERNAL/UNDERWRITING ASSUMPTION,
ACTUAL SALE PRICE, APT GENERATED

PROPERTY VALUE
REPLACEMENT COST
COMPARABLE SALE AMOUNT
INCOME CAP AMOUNT
TOTAL ESTIMATED PROJECT AMOUNT
VACANCY FACTOR
VALUATION NOI AMOUNT
ACTUAL DSC RATIO
CAP RATE

AFFORDABLE HOUSING INFORMATION

| NON-FHA PROGRAMS INDICATORS | RENT SUBSIDY |
|---|---|
| NON-FHA<br>TAX EXEMPT BOND<br>RTC<br>FHLB<br>CDBG<br>PUBLIC HOUSING<br>RENTAL REHAB.<br>LIHTC<br>FMHA 515<br>HOME<br>STATE AGENCY INSURANCE<br>HOPE6<br>TENANT ASSISTANCE INDICATOR<br>OTHER | SECTION8 INDICATOR<br>SECTION8 BOND REFUND INDICATOR<br>OTHER FED RENT ASSIST INDICATOR<br>NUMBER SUBSIDIZED UNITS<br>FIRST CONTRACT EXPIRATION DATE<br>MULTIPLE CONTRACT INDICATOR<br>SECTION8 NUMBER OF 0 BR UNITS<br>SECTION8 0 BR CONTRACT RENT<br>SECTION8 NUMBER OF 1 BR UNITS<br>SECTION8 1 BR CONTRACT RENT<br>SECTION8 NUMBER OF 2 BR UNITS<br>SECTION8 2 BR CONTRACT RENT<br>SECTION8 NUMBER OF 3 BR UNITS<br>SECTION8 3 BR CONTRACT RENT<br>SECTION8 NUMBER OF 4+ BR UNITS<br>SECTION8 4+ BR CONTRACT RENT<br>NUMBER TOTAL SECT8 UNITS |
| LIHTC | TARGET RENT |
| ANNUAL TAX CREDIT BASIS<br>ACTUAL NUMBER TAX CREDIT UNITS<br>TOTAL NOPAY GRANT AMOUNT<br>PRICE PER CREDIT TO DEVELOPER | NUMBER UNITS 60% TO 80%<br>NUMBER UNITS 50% TO 60%<br>NUMBER UNITS LESS 50%<br>USE RESTRICTION EXPIRATION DATE<br>SET ASIDE UNITS |
| FHA PROGRAMS INDICATORS | |
| SECTION OF ACT CODE<br>FHA 202<br>FHA 312<br>FHA 207<br>FHA 213<br>FHA 221D3 BMIR<br>FHA 221D3 MR | FHA 221D4<br>FHA 223F<br>FHA 231<br>FHA 232<br>FHA 236<br>FHA 202/811<br>    FHA OTHER |

TABLE STRUCTURE FOR DATA LOAD

| Prefix | LD_ | VAL_ | BM_ |
|---|---|---|---|
| Table Usage | Tables used in the "Load Data" process. Contain data as submitted by the data providers. | Tables used in the "Validate Data" and "Review Errors" processes. Contain validation errors and submission data as updated by the MISI data administrator. | Tables used during the "Match assets" process. Contain submission data separated into property static, property dynamic, loan static and loan dynamic tables. |
| Representative Tables | LD_SUBMISSION<br>LD_1SUBMISSION_APT DATA<br>LD_APTDATA_INPUT | VAL_APTDATA_INPUT<br>VAL_VALIDATION_ERROR<br>VAL_STATIC_ERROR<br>VAL_ERROR_DETAIL | BM_PROPERTY<br>BM_PROPERTY_DYNAMIC<br>BM_LOAN<br>BM_LOAN_DYNAMIC |

| Prefix | MA_ | AM_ | WEB_ | |
|---|---|---|---|---|
| Table Usage | Working tables used during the "Match assets" process. Contain proposed and accepted matched groups of properties. | Tables where data for matched properties is consolidated. | Tables used in the "Reporting" process. | |
| Representative Tables | MA_MATCH_PROPERTY<br>MA_WORKING_MATCHES<br>MA_WORKING_MATCH_SETS<br>MA_FINAL_MATCHES<br>MA_FINAL_MATCH_SET | AM_PROPERTY<br>AM_PROPERTY_DYNAMIC | WEB_PROPERTY<br>WEB_PROPERTY_DYNAMIC | |

70

FILE FORMAT HEADER DEFINITIONS

| Provider ID | Provider designator assigned by Data Administrator |
|---|---|
| YYYY | Effective year of the submission. |
| MM | Effective month of the submission ('03' for $1^{st}$ quarter, '06' for $2^{nd}$ quarter, '09' for $3^{rd}$ quarter, '12' for $4^{th}$ quarter). |
| Encryption designator | 'E' for encrypted; 'U' for unencrypted. |
| File designator | 'H' for header file; 'D' for detail file; 'A' for MS Access file. |
| Submission number | Sequential number corresponding to the submission, starting with 1. |
| Extension | '.txt' for text file; '.mdb' for MS Access file. |

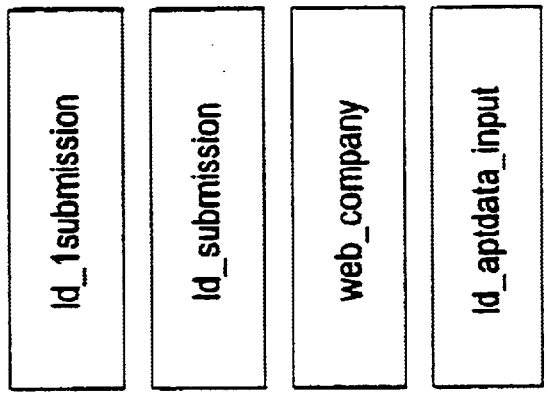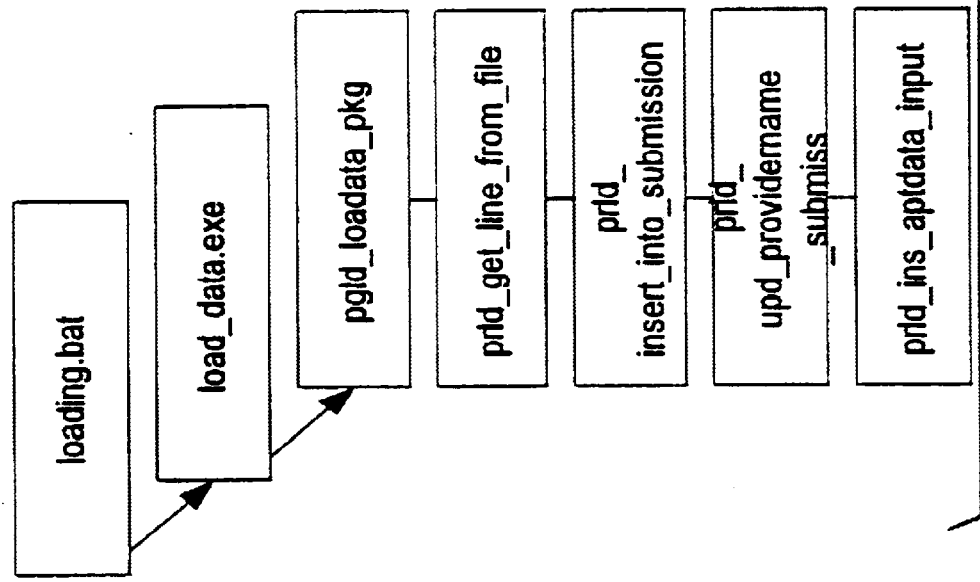
FIG. 22

Tables

- val_aptdata_input
- val_validation_error
- val_static_error
- bm_loan
- bm_property

Procedures

- prval_execute_if_needed
- prval_execute
- prval_prepare_submission
- validate_chardomain
  validate_formula
  validate_ifthentest
  validate_range
  validate_foreignkey
  validate_custom
  validate_static_loan
  validate_static_property

FIG. 24

VALIDATION RULES
LOAN STATIC INFORMATION

| | |
|---|---|
| PROVIDER LOAN ID | MANDATORY FIELD FOR LENDER AND SERVICER DATA PROVIDERS |
| LOAN PURPOSE CODE | A,D,F,H,O,U |
| ORIGINAL LOAN AMT | < 100,000,000 |
| LOAN CLOSE DATE | (1) BETWEEN 1945 AND TODAY<br>(2) IF NULL, MATURITY DATE - ORIGINAL LOAN TERM |
| INTEREST RATE CODE | (1) A, F<br>(2) IF NULL, DEFAULT TO F |
| INDEX CODE | (1) C,I,L,P,T,O,NULL<br>(2) IF NOT NULL, INTEREST RATE CODE = A |
| INDEX TERM | (1) > 0 AND =< 360<br>(2) IF NOT NULL, INTEREST RATE CODE = A |
| MORTGAGE MARGIN OR SPREAD | (1) =< 0.10<br>(2) IF NOT NULL, INTEREST RATE CODE = A |
| ORIGINAL LOAN RATE | >0 AND < 0.20 |
| AMORT BEGIN MO | => 0 AND =< AMORT PERIOD |
| AMORT PERIOD | =>0 AND =<600 |
| ORIGINAL LOAN TERM | (1) =>0 AND =< 600<br>(2) IF NULL, MATURITY DATE - LOAN CLOSE DATE |
| MATURITY DATE | (1) > LOAN CLOSE DATE<br>(2) SHOULD BE WITHIN 6 MONTHS OF LOAN_CLOSE_DATE + ORIGINAL LOAN TERM<br>(3) IF NULL, LOAN CLOSE DATE + ORIGINAL LOAN TERM |
| PAYMENT FREQUENCY | > 0 AND =< 12 |
| FHA PROJECT NUMBER | |
| PREPAYMENT FLAG | Y,N,U |
| BALLOON FLAG | (1) Y,N,U<br>(2) IF "Y," ORIGINAL LOAN TERM < AMORT PERIOD |

FIG. 25

| VALIDATION RULES | |
|---|---|
| LOAN STATIC INFORMATION | |
| ORIGINAL LTV RATIO | IF NULL, CALCULATE AS ORIG LOAN AMT/ORIG PROP VALUE AMT |
| ORIGINAL PROPERTY VALUE AMT | > 0 |
| ISSUANCE BOND RATING | |
| SELLER FINANCED FLAG | Y,N,U |
| SUBORDINATE DEBT FLAG | Y,N,U |
| SUB HARD DEBT AMT | IF > 0, SUBORDINATE DEBT FLAG = Y |
| SUB_NO_HARD_DEBT_INSTRUMENTS | (1) IF > 0, SUBORDINATE DEBT FLAG = Y<br>(2) => 0 AND =< 20 |
| SUB SOFT DEBT AMT | IF >0, SUBORDINATE DEBT FLAG = Y |
| SUB_NO_SOFT_DEBT_INSTRUMENTS | (1) IF >0, SUBORDINATE DEBT FLAG = Y<br>(2) => 0 AND =< 20 |
| LETTERS_OF_CREDIT_AMT | (1) => 0 AND =< ORIGINAL LOAN AMT<br>(2) IF > 0, ADDITIONAL COLLATERAL CODE = L |
| GRANTS AMT | => 0 AND < 100,000,000 |
| NO GRANTS | => 0 AND =< 20 |
| MULTIPLE PROPERTY FLAG | Y,N,U |
| POINTS OR FEES AMT | => 0 AND < 0.10*ORIGINAL LOAN AMT |
| SERVICING FEE | => 0 AND =<. 10 |
| LENDER PARTICIPATION FLAG | (1) Y,N,U<br>(2) IF NULL, DEFAULT TO N |
| RECOURSE FLAG | Y,N,U |
| ADDITIONAL COLLATERAL CODE | C,L,N,O,U |
| INITIAL REPLACE RESERVE AMT | => 0 AND =< ORIGINAL LOAN AMT*.50 |
| REPLACE_RESV CONTRIBUTION AMT | => 0 AND < 10,000*NO UNITS |

VALIDATION RULES
LOAN DYNAMIC INFORMATION

| | |
|---|---|
| LOAN STATUS CODE | C,D,H,T,W,U; |
| TERMINATION_CODE | (1) F,P,S,O,U<br>(2) IF NOT NULL OR NOT "U," THEN LOAN STATUS CODE MUST BE T |
| ACTUAL_UNPD_PRINC_BALANCE AMT | =>0 AND =< ORIGINAL_LOAN_AMT |
| SCHEDULED_PRINC_BALANCE_AMT | >0 AND =< ORIGINAL_LOAN_AMT |
| PAID UP TO DATE | > LOAN CLOSE DATE AND < TODAY |
| SCHEDULED PI DUE AMT | |
| CURRENT_LOAN_RATE | (1) >0 AND < 0.20<br>(2) IF INTEREST_RATE_CODE = F, MUST = ORIGINAL_LOAN_RATE<br>(3) IF NULL AND INTEREST_RATE_CODE = F, THEN ORIGINAL_LOAN_RATE |
| TERMINATION_DATE | (1) > LOAN CLOSE DATE AND < TODAY<br>(2) IF NOT NULL, LOAN STATUS = "T" |
| PAID_OFF_AMT | (1) =>0 AND =< ORIGINAL_LOAN_AMT<br>(2) IF NOT NULL, LOAN STATUS CODE = T<br>(3) IF NOT NULL, TERMINATION CODE = P |
| PREPAYMENT_PENALTY_AMT | (1) < 0.20*ACTUAL_UNPD_PRINC_BALANCE_AMT<br>(2) IF NOT NULL, LOAN STATUS CODE = T |

VALIDATION RULES
LOAN ADJUSTABLE RATE INFORMATION

| | | |
|---|---|---|
| LOAN_RATE_CEILING | (1) | => 0 AND <.20 |
| | (2) | IF NOT NULL, INTEREST RATE CODE = A |
| LOAN_RATE_FLOOR | (1) | =>0 AND <.20 |
| | (2) | IF NOT NULL, INTEREST RATE CODE = A |
| MAX_RATE_DECREASE | (1) | =>0 AND <.10 |
| | (2) | IF NOT NULL, INTEREST RATE CODE = A |
| MAX_RATE_INCREASE | (1) | => 0 AND <.10 |
| | (2) | IF NOT NULL, INTEREST RATE CODE = A |
| MAX_PAYMENT_CAP_AMT | (1) | => 0 AND =<ORIGINAL LOAN AMT |
| | (2) | IF NOT NULL, INTEREST RATE CODE = A |
| MAX_NEGATIVE_AMORT | (1) | => 0 AND <2.0 |
| | (2) | IF NOT NULL, INTEREST RATE CODE = A |
| FIRST_ADJUSTMENT_MO | (1) | > 0 AND <ORIGINAL LOAN TERM |
| | (2) | IF NOT NULL, INTEREST RATE CODE = A |
| RATE_ADJUSTMENT_FREQ | (1) | > 0 AND <ORIGINAL LOAN TERM |
| | (2) | IF NOT NULL, INTEREST RATE CODE = A |
| RATE_PAYMENT_FREQ | (1) | > 0 AND <ORIGINAL LOAN TERM |
| | (2) | IF NOT NULL, INTEREST RATE CODE = A |
| UNDERWRITE_RATE | (1) | > 0 AND <.20 |
| | (2) | IF NOT NULL, INTEREST RATE CODE = A |

VALIDATION RULES
LOAN PREPAYMENT INFORMATION

| PREPAYMENT TYPE CODE | (1) D,S,Y,O,U |
|---|---|
| | (2) IF NOT NULL OR NOT "U," LOAN PREPAYMENT FLAG = Y |
| LOCKOUT END DATE | (1) => LOAN CLOSE DATE AND =< MATURITY DATE |
| | (2) IF NOT NULL, LOAN PREPAYMENT FLAG = Y |
| PREPAYMENT TERM END DATE | (1) => LOCKOUT END DATE AND =< MATURITY DATE |
| | (2) IF NOT NULL, LOAN PREPAYMENT FLAG = Y |

FIG. 29

FORECLOSURE OR WORKOUT INFORMATION

| FORECLOSURE_NOTIFICATION_DATE | (1) => LOAN CLOSE DATE AND <MATURITY DATE |
|---|---|
| | (2) IF NOT NULL, LOAN STATUS CODE NOT C |
| BANKRUPTCY FLAG | Y,N,U |
| FORECLOSURE DATE | (1) =>LOAN CLOSE DATE AND < MATURITY DATE |
| | (2) IF NOT NULL, LOAN STATUS CODE = T |
| | (3) IF NOT NULL, TERMINATION CODE = F |
| SALE_DATE | (1) => LOAN CLOSE DATE AND <TODAY |
| | (2) => FORECLOSURE DATE AND <TODAY |
| RECOVERED VALUE AMT | => 0 AND =<ORIGINAL LOAN AMT |
| SALE AMT | |
| SALE EXPENSE AMT | => 0 AND =<ORIGINAL LOAN AMT |
| NEW LOAN CODE | F,N,W,U |

FIG. 30

VALIDATION RULES
PROPERTY STATIC INFORMATION

| PROVIDER_PROPERTY_ID | MANDATORY FIELD FOR PROPERTY OWNER AND MANAGER DATA PROVIDERS |
|---|---|
| PROPERTY OS CODE | C,G,L,N,P,R,O,U |
| PROPERTY NAME | |
| STREET ADDRESS | |
| CITY NAME | |
| COUNTY NAME | COUNTY_NAME AND COUNTY_FIPS_CODE SHOULD MATCH (COUNTY FIPS CODE HAS PRECEDENCE) |
| COUNTY_FIPS_CODE | COUNTY_NAME AND COUNTY_FIPS_CODE SHOULD MATCH (COUNTY FIPS CODE HAS PRECEDENCE) |
| STATE | (1) MUST BE ONE OF 53 CODES (50 STATES, DC, PR, VI) |
| ZIP | (1) MANDATORY FIELD<br>(2) MUST MATCH STATE<br>(3) NUMERIC CHARACTERS ONLY, LEADING ZEROS REQUIRED (ALL POSITIONS MUST BE FILLED) |
| ZIP EXTENSION | NULL OR NUMERIC CHARACTERS ONLY, LEADING ZEROS REQUIRED (ALL POSITIONS MUST BE FILLED) |
| CENSUS TRACT NO | PROVIDED, OR ELSE DERIVED |
| LATITUDE | IF PROVIDED, > .15 AND < 75, OR ELSE DERIVED |
| LONGITUDE | IF PROVIDED, < -45 AND > -180, OR ELSE DERIVED |
| PURCHASE AMT | => 0 AND < 100,000,000 |
| REHABILITATION AMT | => 0 AND < 100,000,000 |
| OTHER ACQUISITION AMT | => 0 AND < 100,000,000 |
| ACQUISITION DATE | =< LOAN CLOSE DATE |
| SCATTERED SITE FLAG | (1) Y,N,U<br>(2) IF Y, NO BUILDINGS > 1 |
| NO RESIDENTIAL BUILDINGS | > 0 AND < 100 |
| NO STORIES | > 0 AND < 100 |

FIG. 31

VALIDATION RULES
PROPERTY STATIC INFORMATION

| | |
|---|---|
| PROJECT TYPE CODE | C,R,O,U |
| SPECIAL TENANCY TYPE CODE | C,D,E,M,N,S,O,U |
| ELDERLY HOUSING TYPE CODE | (1) A,C,E,I,N,O,U |
| | (2) IF NOT NULL OR "U," SPECIAL_TENANCY_CODE = E |
| BUILDING TYPE CODE | G,P,T,O,U |
| BUILDING_DESCRIPTION CODE | SYSTEM DERIVED FROM BUILDING_TYPE_CODE, NO_STORIES AND ELEVATOR FLAG |
| SRO FLAG | Y,N,U |
| RENT CONTROL FLAG | Y,N,U |
| INITIAL_CONSTRUCTION_YR | (1) > 1850 AND < TODAY |
| | (2) IF NULL AND LOAN_PURPOSE_CODE = "D," THEN LOAN CLOSE DATE |
| SUBSTANTIAL_REHAB_COMPLETE_YR | (1) > 1945 AND < TODAY |
| | (2) MUST BE > INITIAL CONSTRUCTION YR |
| | (3) IF NULL AND LOAN_PURPOSE_CODE = "H," THEN LOAN CLOSE DATE |
| NO UNITS | (1) => 5 AND =< 10,000 |
| NO 0 BEDROOM | => 0 AND =< NO UNITS |
| SQ FT 0 BEDROOM | =>100 AND < 1000 |
| NO 1 BEDROOM | => 0 AND =< NO UNITS |
| SQ FT 1 BEDROOM | => 200 AND < 2000 |
| NO 2 BEDROOM | => 0 AND =< NO UNITS |
| SQ FT 2 BEDROOM | => 300 AND < 3000 |
| NO 3 BEDROOM | => 0 AND =< NO UNITS |
| SQ FT 3 BEDROOM | = > 400 AND < 4000 |
| NO 4 BEDROOM | => 0 AND =< NO UNITS |
| SQ FT 4 BEDROOM | => 500 AND < 5000 |
| NO UNITS HANDICAPPED | =< NO UNITS |

VALIDATION RULES
PROPERTY STATIC INFORMATION

| | |
|---|---|
| NO SUBSIDIZED UNITS | =< NO UNITS |
| NET RENTABLE RESIDENTIAL SQ FT | (1) => 1100 AND =< 1,500,000 |
| NET COMMERCIAL SQ FT | |
| PROPERTY LAND AREA | > 0.10 AND < 1000 |
| TOTAL PARKING | < 2 * NO UNITS |
| GARAGE PARKING | <= TOTAL PARKING |
| CARPORT PARKING | <= TOTAL PARKING |
| ELEVATOR_FLAG | (1) Y,N,U |
| | (2) IF NO STORIES > 6 SHOULD BE "Y" |
| AIR CONDITION FLAG | Y,N,U |
| HEAT OR GAS PAYMENT FLAG | O,T,U |
| ELECTRIC PAYMENT FLAG | O,T,U |
| WATER PAYMENT FLAG | O,T,U |
| SEWER PAYMENT FLAG | O,T,U |
| WASH DRYER FLAG | Y,N,U |
| TENNIS COURT FLAG | Y,N,U |
| SWIMMING POOL FLAG | Y,N,U |
| BASKETBALL COURT FLAG | Y,N,U |
| WORKOUT FACILITY FLAG | Y,N,U |
| GROUND LEASE FLAG | Y,N,U |

VALIDATION RULES
PROPERTY DYNAMIC INFORMATION

| REVENUE_AND_EXPENSE_AS_OF_DATE | IF PROPERTY EFFECTIVE_DATE IS NOT POPULATED IN HEADER FILE, DATA WILL BE LOADED INTO THE PROPERTY QUARTER USING THIS FIELD. |
|---|---|
| NUMBER OF PERIODS INCLUDED | (1) MANDATORY FIELD<br>(2) 1,2,3,4 |
| GROSS_POTNTL_RESIDENT_RENT_AMT | (1) => 0 AND < NO UNITS*100,000<br>(2) =< TOTAL GROSS POTENTIAL RENT AMT |
| GROSS_POTENTIAL_GOVT_RENT_AMT | (1) => 0 AND < NO UNITS*100,000<br>(2) =< TOTAL GROSS POTENTIAL RENT AMT |
| TOTAL_GROSS_POTENTIAL_RENT_AMT | (1) EQUAL TO: GROSS_POTNTL_RESIDENT_RENT_AMT + GROSS_POTENTIAL_GOVT_RENT_AMT |
| VACANCY_AMT | (1) EQUAL TO: VACANCY_RESIDENTIAL_AMT + VACANCY_COMMERCIAL_AMT<br>(3) => 0 AND < NO UNITS*50,000 |
| VACANCY_RESIDENTIAL_AMT | (1) => 0 AND =< VACANCY AMT |
| VACANCY_COMMERCIAL_AMT | (2) => 0 AND < NO UNITS*50,000<br>=> 0 AND =< VACANCY AMT |
| COLLECTION LOSS AMT | => 0 AND < 0.20*TOTAL GROSS POTENTIAL RENT AMT |
| NET COMMERCIAL RENT AMT | => 0 AND < 0.30*TOTAL GROSS POTENTIAL RENT AMT |
| INTEREST INCOME AMT | => 0 |
| NON RENT AMT | => 0 |
| TOTAL_REVENUE_AMT | EQUAL TO: TOTAL_GROSS_POTENTIAL_RENT_AMT - VACANCY_AMT - COLLECTION_LOSS_AMT + NET_COMMERCIAL_RENT_AMT + INTEREST_INCOME_AMT + NON_RENT_AMT |
| PROPERTY MANAGEMENT FEE AMT | =>0 AND < TOTAL REVENUE*.25 |
| ADMIN TOTAL EXPENSE AMT | =>0 AND < TOTAL REVENUE*.15 |
| ADMIN MKTG EXPENSE AMT | =>0 AND <= ADMIN TOTAL EXPENSE AMT |

FIG. 34

VALIDATION RULES
PROPERTY DYNAMIC INFORMATION

| | |
|---|---|
| PAYROLL_EXP_AMT | =>0 AND < TOTAL_REVENUE*.30 |
| MAINTENANCE_EXPENSE_AMT | =>0 AND < TOTAL_REVENUE*.40 |
| UTILITY_EXPENSE_AMT | (1) EQUAL TO: WATER_AND_SEWER_EXPENSE_AMT + ELECTRICITY_EXPENSE_AMT + GAS_EXPENSE_AMT + OIL_EXPENSE_AMT + OTHER_UTILITY_AMT<br>(2) => 0 AND < TOTAL_REVENUE_AMT*.50 |
| WATER_AND_SEWER_EXPENSE_AMT | (1) EQUAL TO: WATER_EXPENSE_AMT + SEWER_EXPENSE_AMT<br>(2) =>0 AND < UTILITY_EXPENSE_AMT |
| WATER_EXPENSE_AMT | => 0 AND =< WATER_AND_SEWER_EXPENSE_AMT |
| SEWER_EXPENSE_AMT | => 0 AND =<WATER_AND_SEWER_EXPENSE_AMT |
| ELECTRICITY_EXPENSE_AMT | => 0 AND =< UTILITY_EXPENSE_AMT |
| GAS_EXPENSE_AMT | => 0 AND =< UTILITY_EXPENSE_AMT |
| OIL_EXPENSE_AMT | => 0 AND =< UTILITY_EXPENSE_AMT |
| OTHER_UTILITY_AMT | => 0 AND =< UTILITY_EXPENSE_AMT |
| INSURANCE_EXPENSE_AMT | => 0 AND < TOTAL_REVENUE *.15 |
| SOC_SERVICE_EXP_AMT | => 0 AND < TOTAL_REVENUE |
| TAX_AMT | => 0 AND < TOTAL_REVENUE *.40 |
| OTHER_EXPENSE_AMT | => 0 AND < TOTAL_REVENUE *.15 |
| TAX_ABATEMENT_FLAG | Y,N,U |
| TOTAL_OP_EXPENSE_AMT | EQUAL TO: PROPERTY_MANAGEMENT_FEE_AMT + ADMIN_TOTAL_EXPENSE_AMT + PAYROLL_EXP_AMT + UTILITY_EXPENSE_AMT + INSURANCE_EXPENSE_AMT + SOC_SERVICE_EXP_AMT + TAX_AMT |
| NET_OPERATING_INCOME_AMT | EQUAL TO: TOTAL_REVENUE_AMT − TOTAL_OP_EXPENSE_AMT |
| INTEREST_PAID_AMT | > 0 AND <.20*ORIGINAL_LOAN_AMT |
| PRINCIPAL_PAID_AMT | > 0 AND < ORIGINAL_LOAN_AMT |
| DEBT_SERVICE_AMT | EQUAL TO: INTEREST_PAID_AMT + PRINCIPAL_PAID_AMT |
| DEBT_SERVICE_SUBORD_LOANS_AMT | IF >0, SUBORDINATE_DEBT_FLAG = Y |
| GROUND_LEASE_PAYMENT_AMT | IF > 0, GROUND_LEASE_FLAG = Y |

FIG. 35

VALIDATION RULES
PROPERTY DYNAMIC INFORMATION

| | |
|---|---|
| REPLACEMENT RESERVE AMT | < ORIGINAL LOAN AMT*.20 |
| REPLACEMENT RESERVE BAL AMT | < ORIGINAL LOAN AMT |
| CAPITAL EXPENDITURE AMT | |
| RESIDUAL RECEIPTS BAL AMT | IF > 0, PROPERTY OS CODE = L |
| NO OCCUPIED RESIDENTIAL UNITS | => 0 AND =< NO UNITS |
| NO CURRENT VACANT UNITS | => 0 AND =< NO UNITS |
| COMMERCIAL OCCUPIED PERCENT | => 0 AND <1.0 |
| CURRENT EFFECTIVE MKTRENT 0 BR | > 0 AND < 3000 |
| MARKET RENT 0 BR AS OF DATE | IF CURRENT EFFECTIVE MKTRENT 0 BR > 0, IS NOT NULL |
| CURRENT EFFECTIVE MKTRENT 1 BR | > 0 AND < 6000 |
| MARKET RENT 1 BR AS OF DATE | IF CURRENT EFFECTIVE MKTRENT 1 BR > 0, IS NOT NULL |
| CURRENT EFFECTIVE MKTRENT 2 BR | > 0 AND < 9000 |
| MARKET RENT 2 BR AS OF DATE | IF CURRENT EFFECTIVE MKTRENT 2 BR > 0, IS NOT NULL |
| CURRENT EFFECTIVE MKTRENT 3 BR | > 0 AND < 12000 |
| MARKET RENT 3 BR AS OF DATE | IF CURRENT EFFECTIVE MKTRENT 3 BR > 0, IS NOT NULL |
| CURRENT EFFECTIVE MKTRENT 4 BR | > 0 AND < 15000 |
| MARKET RENT 4 BR AS OF DATE | IF CURRENT EFFECTIVE MKTRENT 4 BR > 0, IS NOT NULL |
| UNIT TURNOVER | < 0.5 * NO UNITS |

FIG. 36

VALIDATION RULES
TARGET RENT INFORMATION

| | |
|---|---|
| NO UNITS 60 TO 80 | => 0 AND =< NO UNITS |
| NO UNITS 50 TO 60 | => 0 AND =< NO UNITS |
| NO UNITS LESS 50 | => 0 AND =< NO UNITS |
| SETASIDE UNITS | (1) => 0 AND =< NO UNITS (2) SUM OF FIRST THREE NO_UNITS SHOULD NOT EXCEED NO UNITS OR SETASIDE UNITS |
| USE RESTRICT EXPIRE DATE | > ACQUISITION DATE |

*FIG. 37* — 370

VALIDATION RULES
AFFORDABLE HOUSING PROGRAM INFORMATION

| | |
|---|---|
| AH SAI FLAG | Y,N,U |
| AH TEB FLAG | Y,N,U |
| AH RTCAH FLAG | Y,N,U |
| AH FHLB FLAG | Y,N,U |
| AH 515 FLAG | Y,N,U |
| AH RR FLAG | Y,N,U |
| AH LIHTC FLAG | Y,N,U |
| AH CDBG FLAG | Y,N,U |
| AH PH FLAG | Y,N,U |
| AH OTHER FLAG | Y,N,U |
| AH NON FHA FLAG | Y,N,U |
| AH HOME FLAG | Y,N,U |
| AH HOPE6 FLAG | Y,N,U |
| SECTION8 FLAG | Y,N,U |
| OTHER FED RENT ASSIST FLAG | Y,N,U |
| AH TENANT ASSIST FLAG | Y,N,U |

*FIG. 38* — 380

VALIDATION RULES
PROPERTY VALUATION INFORMATION ~390

| VALUATION EFFECTIVE DATE | E,I,P,A |
| --- | --- |
| VALUATION TYPE CODE | IF FHA PROJECT NO IS NULL, > 0 |
| PROPERTY VALUE AMT | |
| REPLACEMENT COST AMT | |
| COMPARE SALE AMT | |
| INCOME CAP AMT | |
| TOTAL ESTIMATED PROJECT AMT | |
| VACANCY FACTOR | < 0.30 |
| VALUATION NOI AMT | > 0.80 AND < 3.00 |
| ACTUAL DSCR | > 0.02 AND < 0.20 |
| CAP RATE | |

*FIG. 39*

VALIDATION RULES
LOW-INCOME HOUSING TAX CREDIT INFORMATION ~400

| ANNUAL_TAX_CREDIT_BASIS_AMT | (1) => 0 AND < 0.25*PURCHASE AMT |
| --- | --- |
| | (2) IF > 0, AH LIHTC FLAG = Y |
| ACTUAL_NO_TAX_CREDIT_UNITS | (1) => 0 AND < NO UNITS |
| | (2) IF > 0, AH LIHTC FLAG = Y |
| TOTAL NOPAY GRANT AMT | IF > 0, AH LIHTC FLAG = Y |
| PRICE_PER_CREDIT_TO_DEVELOPER | (1) => 0.25 AND < 1.0 |
| PRICE_PER_CREDIT_TO_DEVELOPER | (2) IF > 0, AH LIHTC FLAG = Y |

*FIG. 40*

SAMPLE SUMMARY REPORT

|  | PER UNIT | PER SF |
|---|---|---|
| PROPERTY PERFORMANCE | | |
| TOTAL INCOME | 5,685 | 7.25 |
| TOTAL OPERATING EXPENSES | 3,148 | 3.82 |
| NET OPERATING INCOME | 2,572 | 3.27 |
| EFFECTIVE MARKET RENT | 6,271 | 7.83 |
| OPERATING EXPENSE AS % OF INCOME | 56.17 | 56.17 |
| FINANCIAL DATA | | |
| CAPITAL IMPROVEMENTS | 486 | .54 |
| PRINCIPAL PAYMENTS | 254 | .29 |
| INTEREST PAYMENTS | 1,619 | 2.12 |
| CASH FLOW AFTER D/S | 464 | .55 |
| DEBT SERVICE COVERAGE | 1.33 | 1.33 |
| END YEAR REPL. RESERVES BALANCE | 250 | .30 |

| PROPERTY CHARACTERISTICS | |
|---|---|
| AVERAGE NUMBER OF UNITS | 206.00 |
| UNITS PER ACRE | 20.00 |
| VACANCY RATE (END OF PERIOD) | 5.00 |
| TURNOVER RATE (ANNUAL) | 57.79 |

FIG. 50

SAMPLE DETAIL REPORT

|  | PER UNIT | PER SF |
|---|---|---|
| INCOME ACCOUNTS | | |
| GROSS POTENTIAL RESIDENT RENT | 6,371 | 7.80 |
| GROSS POT GOVERNMENT RENT | | |
| SUB-TOTAL: TOT GROSS POT RENT | 6,371 | 7.83 |
| NET COMMERCIAL RENT | | |
| NOT RENT INCOME | 218 | .25 |
| COLLECTION LOSS | 32 | .03 |
| VACANCY LOSS | 372 | .39 |
| TOTAL OPERATING REVENUE | 5,685 | 7.25 |
| | | |
| EXPENSE ACCOUNTS | | |
| PROPERTY MANAGEMENT | 271 | .33 |
| ADMINISTRATIVE | 268 | .36 |
| MARKETING | 139 | .17 |
| PAYROLL | 724 | .87 |
| MAINTENANCE AND REPAIRS | 470 | .58 |
| UTILITIES | 546 | .62 |
| WATER AND SEWER | 300 | .33 |
| WATER | 173 | .16 |
| SEWER | 129 | .14 |
| ELECTRICITY | 143 | .17 |
| GAS | 100 | .09 |
| OIL | | |
| OTHER UTILITY | 45 | .06 |
| INSURANCE | 128 | .16 |
| SOCIAL SERVICES | | |
| PROPERTY TAXES | 589 | .79 |
| OTHER EXPENSES | 105 | .09 |
| TOTAL OP EXPENSES | 3,146 | 3.82 |
| NET OPERATING INCOME | 2,572 | 3.27 |
| | | |
| OTHER EXPENSES | | |
| PRINCIPAL PAYMENTS | 254 | .29 |
| INTEREST PAYMENTS | 1,619 | 2.12 |
| DEBT SERVICE | 1,683 | 2.12 |
| NET CASH FLOW EXCLUS OF CAP EX | 464 | .55 |
| REPLACEMENT RESERVE EXPENSE | 275 | .32 |
| CAPITAL IMPROVEMENT EXPENSE | 486 | .54 |
| | | |
| EFFECTIVE MARKET RENTS | | |
| 0 BEDROOM | 400 | |
| 1 BEDROOM | 553 | |
| 2 BEDROOM | 709 | |
| 3+ BEDROOM | 720 | |

DETAIL REPORT STATISTICS SAMPLE

|  | PER UNIT | PER SF |
|---|---|---|
| INCOME ACCOUNTS | | |
|   GROSS POTENTIAL RESIDENT RENT | D | D |
|   GROSS POTENTIAL GOVERNMENT RENT | D | D |
|   SUB-TOTAL: TOTAL GROSS POTENTIAL RENT | D | D |
|   NET COMMERCIAL RENT | E | E |
|   NOT RENT INCOME | D | D |
|   COLLECTION LOSS | D | D |
|   VACANCY LOSS | D | D |
|     TOTAL OPERATING REVENUE | D | D |
| EXPENSE ACCOUNTS | | |
|   PROPERTY MANAGEMENT | D | D |
|   ADMINISTRATIVE | D | D |
|   MARKETING | D | D |
|   PAYROLL | D | D |
|   MAINTENANCE AND REPAIRS | D | D |
|   UTILITIES | D | D |
|     WATER AND SEWER | D | D |
|       WATER | B | B |
|       SEWER | B | B |
|     ELECTRICITY | D | D |
|     GAS | D | D |
|     OIL | E | E |
|     OTHER UTILITY | D | D |
|   INSURANCE | D | D |
|   SOCIAL SERVICES | E | E |
|   PROPERTY TAXES | D | D |
|   OTHER EXPENSES | D | D |
|     TOTAL OPERATING EXPENSES | D | D |
|   NET OPERATING INCOME | D | D |
| OTHER EXPENSES | | |
|   PRINCIPAL PAYMENTS | D | D |
|   INTEREST PAYMENTS | D | D |
|     DEBT SERVICE | D | D |
|   NET CASH FLOW EXCLUSIVE OF CAP EXPENSE | D | D |
|   REPLACEMENT RESERVE EXPENSE | A | A |
|   CAPITAL IMPROVEMENT EXPENSE | C | C |
| EFFECTIVE MARKET RENTS | | |
|   0 BEDROOM | A | E |
|   1 BEDROOM | D | E |
|   2 BEDROOM | D | E |
|   3+ BEDROOM | B | E |

NUMBER OF PROPERTIES IN RESULT SET
"A: = 3 TO 10, "B" = 11 TO 18, "C" = 19 to 30, "D" = 21 or more, "E" = Insufficient data

*FIG. 52*

CONTROL (HEADER) FILE

| FIELD NAME | FIELD DESCRIPTION | VALIDATION | FIELD WIDTH | FIELD FORMAT |
|---|---|---|---|---|
| DATA_PROVIDER_ID | Data provider's unique text identifier. (Assigned by MISI) | Mandatory field | 12 | |
| FILE_CREATION_DATE | Date the file was compiled | Mandatory field | 8 | MMDDYYYY |
| LOAN_DATA_EFFECTIVE_MO | Effective month for the loan data contained in the file | Mandatory field | 2 | 03,06,09,12 |
| LOAN_DATA_EFFECTIVE_YR | Effective year for the loan data contained in the file | Mandatory field | 4 | YYYY |
| PROP_DATA_EFFECTIVE_MO | Effective month for the property data contained in the file. If assets have different property data effective dates, this field will be populated from the Revenue & Expense as of date contained in the text file. | | 2 | MM |
| PROP_DATA_EFFECTIVE_YR | Effective year for the property data contained in the file. If assets have different property data effective dates, this field will be populated from the Revenue & Expense as of data in the text file. | | 4 | YYYY |
| NUMBER_OF_RECORDS | The number of records contained in the file. | Mandatory field | 8 | 99999999 |
| CONTACT_FIRST_NAME | First name of the person who compiled this file. | | 15 | |
| CONTACT_LAST_NAME | Last name of the person who compiled this file. | | 15 | |
| CONTACT_TELEPHONE | Telephone number of the person who compiled this file. | | 20 | |

*FIG. 53*

LOAN STATIC INFORMATION

| FIELD NAME | FIELD DESCRIPTION | VALIDATION | FIELD WIDTH | FIELD FORMAT |
|---|---|---|---|---|
| PROVIDER_LOAN_ID | The loan number assigned to this loan asset by the data provider. | Mandatory field for lender and servicer data providers. | 32 | |
| LOAN_PURPOSE_CODE | A code indicating the purpose of the loan. Valid values are:<br>A - property acquisition/purchase<br>D - development/construction<br>F - refinance<br>H - rehabilitation (>25% of loan amount for rehabilitation)<br>O - other<br>U - not available | A, D, F, H, O, U | 1 | A,D,F,H,O,U |
| | | If value is "H," enter rehab year in SUBSTANTIAL_REHAB_COMPLETE_YR field in property static table. | | |
| | | If value is "D," enter construction year in INITIAL_CONSTRUCTION_YR field in property static table. | | |
| ORIGINAL_LOAN_AMT | The face value of the loan at origination. | <100,000,000 | 15 | 999999999999.99 |
| LOAN_CLOSE_DATE | The date on which the loan was closed. | Between 1945 and today | 8 | MMDDYYYY |
| INTEREST_RATE_CODE | A code indicating the interest type of the loan. Valid values are:<br>A - adjustable rate mortgage<br>F - fixed rate | A, F | 1 | A,F |
| | | Defaults to "F" if value is not given | | |
| INDEX_CODE | The index used to determine the adjustment to the loan rate. Valid values are:<br>C - 11th District Cost of Funds Index<br>I - Consumer Price Index<br>L - LIBOR<br>P - Prime<br>T - Treasury<br>O - Other | C, I, L, P, T, O, null | 1 | C,I,L,P,T,O |
| | | If not null, INTEREST_RATE_CODE must be "A". | | |
| INDEX_TERM | The constant maturity term, in months, of the instrument used to determine the interest rate (i.e., 3 month, 6 month, 12 month, 36 month). | >0 and =< 360 | 3 | 999 |
| | | If not null, INTEREST_RATE_CODE must be "A". | | |

*FIG. 54a*

| | | | |
|---|---|---|---|
| MORTGAGE_MARGIN_OR_SPREAD | The margin added to the index described by INDEX_CODE to establish a rate. Must be expressed as a decimal number. | =<0.10; | 6 | .99999 |
| ORIGINAL_LOAN_RATE | The interest rate at the loan closing. Enter as a decimal value such as .07375. | If not null, INTEREST_RATE_CODE must be "A" >0 and <.20 | 6 | .99999 |
| AMORT_BEGIN_MO | The month within the loan term that amortization begins. 0 for nonamortizing loan | =>0 and =< AMORT_PERIOD | 3 | 999 |
| AMORT_PERIOD | Amortization period in months required to amortize the loan. 0 for nonamortizing loan. | =>0 and =<600 | 5 | 99999 |
| ORIGINAL_LOAN_TERM | The number of months from loan closing date to maturity. | >0 and =<600 | 3 | 999 |
| MATURITY_DATE | The scheduled end date of the loan. | >LOAN_CLOSE_DATE and <today  Should be within 6 months of LOAN_CLOSE_DATE + ORIGINAL_LOAN_TERM | 8 | MMDDYYYY |
| PAYMENT_FREQUENCY | The annual number of scheduled loan payments. | >0 and =<12 | 2 | 99 |
| FHA_PROJECT_NUMBER | Project number assigned to FHA insured loans. | | 8 | 99999999 |
| PREPAYMENT_FLAG | A code indicating whether or not prepayment penalty terms exist for the loan. Valid values are:<br>Y - yes<br>N - no<br>U - not available | Y, N, U | 1 | Y,N,U |

*FIG. 54b*

| Field | Description | Validation | Length | Format |
|---|---|---|---|---|
| BALLOON_FLAG | A system-calculated code indicating whether or not the loan has a balloon feature. Valid values are:<br>Y - yes<br>N - no<br>U - not available | Y, N, U | 1 | Y,N,U |
| ORIGINAL_LTV_RATIO | The original principal balance of the loan divided by the value of the property at the time of loan origination. | If "Y", ORIGINAL_LOAN_TERM < AMORT_PERIOD<br>If null, system will calculate as ORIGINAL_LOAN_AMT / ORIGINAL_PROPERTY_VALUE_AMT | 7 | 9.999999 |
| ORIGINAL_PROPERTY_VALUE_AMT | The value of the property at the time the loan was originated. | >0 | 15 | 999999999999.99 |
| ISSUANCE_BOND_RATING | A code indicating the bond rating at issuance when the loan was rated. For example: A, AA, AAA... | | 8 | |
| SELLER_FINANCED_FLAG | Does the seller hold a note on the mortgage? Valid values are:<br>Y - yes<br>N - no<br>U - not available | Y, N, U | 1 | Y,N,U |
| SUBORDINATE_DEBT_FLAG | A code indicating whether or not subordinate debt exists. Valid values are:<br>Y - yes<br>N - no<br>U - not available | Y, N, U | 1 | Y,N,U |
| SUB_HARD_DEBT_AMT | Total original value of all subordinate hard debt. Hard subordinate debt is subordinate debt that has scheduled payments | If > 0 then SUBORDINATE_DEBT_FLAG must be "Y" | 15 | 999999999999.99 |
| SUB_NO_HARD_DEBT_INSTRUMENTS | Total number of subordinate hard debt instruments. | >0 and =<20 or null<br>If >0, SUBORDINATE_DEBT_FLAG must be "Y" | 2 | 99 |

*FIG. 54c*

| Field | Description | Size | Format/Values |
|---|---|---|---|
| SUB_SOFT_DEBT_AMT | Total original value of all soft subordinate debt. Soft subordinate debt is debt without scheduled payment terms. | 15 | If >0 SUBORDINATE_DEBT_FLAG must be "Y" | 999999999999.99 |
| SUB_NO_SOFT_DEBT_INSTRUMENTS | Total number of soft subordinate debt instruments. | 2 | => 0 and =< 20 or null<br>If > 0, SUBORDINATE_DEBT_FLAG must be "Y" | 99 |
| LETTERS_OF_CREDIT_AMT | The letter of credit amount(s) that collateralize the loan. | 15 | => 0 or =< ORIGINAL_LOAN_AMT or null | 999999999999.99 |
| GRANTS_AMT | Amount of grants outstanding on the property | 15 | > 0 and < 100,000,000 o null | 999999999999.99 |
| NO_GRANTS | Number of grants outstanding on the property | 2 | > 0 and =< 20 or null | 99 |
| MULTIPLE_PROPERTY_FLAG | A code indicating if the loan is associated with multiple properties. Valid values are:<br>Y - yes (exclusive of scattered site properties)<br>N - no (only one property)<br>U - not available | 1 | Y, N, U | Y,N,U |
| POINTS_OR_FEES_AMT | Amount paid for points or fees for loan origination, discounts, or for other loan fees paid at closing. | 15 | => 0 and < 0.10 of ORIGINAL_LOAN_AMT | 999999999999.99 |
| SERVICING_FEE | The rate applied to the loan to calculate the fee to be paid for servicing the loan; expressed as decimal | 6 | => 0 and =< 0.10 | .99999 |
| LENDER_PARTICIPATION_FLAG | A code indicating whether or not the loan has features that provide for participation by the lender in cash flow from the property. Valid values are:<br>Y - yes<br>N - no<br>U - not available | 1 | Y, N, U<br>Default to "N" if value is not given | Y,N,U |

FIG. 54d

| Field | Description | | Size | Valid Values |
|---|---|---|---|---|
| RECOURSE_FLAG | A code indicating whether or not the lender has recourse to the borrower. Valid values are:<br>Y - yes<br>N - no<br>U - not available | Y, N, U | 1 | Y,N,U |
| ADDITIONAL_COLLATER AL_CODE | A code indicating the type of additional collateral associated with this loan. Valid values are:<br>C - cross collateralized<br>L - letters of credit<br>N - no additional collateral<br>O - other<br>U - not available | C, L, N, O, U | 1 | C,L,N,O,U |
| INITIAL_REPLACE_RESE RVE_AMT | Replacement reserve at closing. | > 0 and =< ORIGINAL_LOAN_AMT * 0.50 | 15 | 9999999999.99 |
| REPLACE_RESV_CONTRI BUTION_AMT | The amount per unit per year that is required to be added to the replacement reserve. There may be a grace period prior to the beginning of on-going contributions. | > 0 and <10,000 * NO_UNITS | 15 | 9999999999.99 |

*FIG. 54e*

LOAN DYNAMIC INFORMATION

| FIELD NAME | FIELD DESCRIPTION | VALIDATION | FIELD FORMAT |
|---|---|---|---|
| LOAN_STATUS_CODE | A code representing the status of the loan. Valid values are:<br>C - current<br>D - delinquent<br>H - HUD-held inventory<br>T - terminated<br>W - workout<br>U - not available | C, D, H, T, W, U | 1  C,D,T,W,U |
| TERMINATION_CODE | A code representing the reason that the loan was paid off. Valid values are:<br>F - foreclosure/REO<br>P - paid off in full<br>S - sold/transferred<br>O - other<br>U - not available | F, P, S, O, U<br><br>If not null or not "U," then LOAN_STATUS_CODE must be "T" | 1  F,P,S,O,U |
| ACTUAL_UNPD_PRINC_BAL ANCE_AMT | The actual principal balance of the loan as of end of the quarter. | >0 and =< ORIGINAL_LOAN_AMT | 15  9999999999999.99 |
| SCHEDULED_PRINC_BALAN CE_AMT | The scheduled principal balance of the loan as of the end of the quarter. | >0 and =< ORIGINAL_LOAN_AMT | 15  9999999999999.99 |
| PAID_UP_TO_DATE | The date through which the loan would be current given the unpaid principal balance. | => LOAN_CLOSE_DATE and < today | 8  MMDDYYYY |
| SCHEDULED_PI_DUE_AMT | The amount of principal and interest payments that are due under the loan schedule. | | 15  9999999999999.99 |
| CURRENT_LOAN_RATE | The current interest rate of the loan for adjustable rate mortgages. | > 0 and <.20;<br><br>If INTERST_RATE_CODE = "F," must equal ORIGINAL_LOAN_RATE | 6  .99999 |

FIG. 55a

| Field | Description | Length | Rules/Format |
|---|---|---|---|
| TERMINATION_DATE | The date the loan was paid off, foreclosed, refinanced, etc. | 8 | > LOAN_CLOSE_DATE and < today; If not null, LOAN_STATUS_CODE must be "T"; MMDDYYYY |
| PAID_OFF_AMT | The amount paid to pay off the loan in full. | 15 | > 0 and =< ORIGINAL_LOAN_AMT; If > 0, LOAN_STATUS_CODE must be "T" and TERMINATION_CODE must be "P"; 9999999999999.99 |
| PREPAYMENT_PENALTY_AMT | The amount of prepayment penalties paid. | 15 | <20*  ACTUAL_UNPAID_PRINCIPAL_BALANCE; If > 0, LOAN_STATUS_CODE must be "T"; 9999999999999.99 |

*FIG. 55b*

LOAN ADJUSTABLE RATE INFORMATION

| FIELD NAME | FIELD DESCRIPTION | VALIDATION | FIELD WIDTH | FIELD FORMAT |
|---|---|---|---|---|
| LOAN_RATE_CEILING | The maximum interest rate allowed; if there is no ceiling, enter .00000; if not provided, leave blank. Express as a decimal value. | => 0 and < 0.20<br>If > 0, INTEREST_RATE_CODE = "A" | 6 | .99999 |
| LOAN_RATE_FLOOR | The minimum interest rate allowed; if there is no floor, enter .00000; if not provided, leave blank. Express as a decimal value. | => 0 and <.20<br>If > 0, INTEREST_RATE_CODE = "A" | 6 | .99999 |
| MAX_RATE_DECREASE | The maximum rate decrease allowed for a single adjustment period; if there is no maximum, enter .00000; if not provided, leave blank. Express as a decimal value. | => 0 and < 0.10<br>If > 0, INTEREST_RATE_CODE = "A" | 6 | .99999 |
| MAX_RATE_INCREASE | The maximum rate increase allowed for a single adjustment period; if there is no maximum, enter .00000; if not provided, leave blank. Express as a decimal value. | => 0 and < 0.10<br>If > 0, INTERET_RATE_CODE = "A" | 6 | .99999 |
| MAX_PAYMENT_CAP_AMT | The maximum payment change at each payment adjustment from previous payment amounts; if there is no maximum, enter .00; if not provided, leave blank. | => 0 and =< ORIGINAL_LOAN_AMT<br>If > 0, INTEREST_RATE_CODE = "A" | 15 | 999999999999.99 |
| MAX_NEGATIVE_AMORT | The maximum allowed ratio of unpaid balance to original loan amount. | > 0 and < 2.00<br>If >0, INTEREST_RATE_CODE = "A" | 6 | 99.999 |
| FIRST_ADJUSTMENT_MO | The number of the month within the term of the loan when the first adjustment was made. | > 0 and < ORIGINAL_LOAN_TERM<br>If > 0, INTEREST_RATE_CODE = "A" | 3 | 999 |

FIG. 56a

| | | | |
|---|---|---|---|
| RATE_ADJUSTMENT_FREQ | The number of months between rate adjustments after the first adjustment. | 3 | 999 |
| | | If > 0, INTEREST_RATE_CODE = "A" | |
| RATE_PAYMENT_FREQ | The number of months between payment adjustments after the first adjustment. | 3 | 999 |
| | | If > 0, INTEREST_RATE_CODE = "A" | |
| UNDERWRITE_RATE | The constant interest rate for debt service used in underwriting this ARM. | 6 | .99999 |
| | | > 0 and < 0.20 | |
| | | If > 0, INTEREST_RATE_CODE = "A" | |

FIG. 56b

LOAN PREPAYMENT INFORMATION

| FIELD NAME | FIELD DESCRIPTION | VALIDATION | FIELD WIDTH | FIELD FORMAT |
|---|---|---|---|---|
| PREPAYMENT_TYPE_CODE | A code indicating the type of prepayment penalty clause. Valid values are:<br>D - declining<br>S - straight line<br>Y - yield maintenance<br>O - other<br>U - not provided | D, S, Y, O, U<br><br>If not null or not "U," LOAN_PREPAYMENT_FLAG = "Y" | 1 | D,S,Y,O,U |
| LOCKOUT_END_DATE | The last date for which prepayment is prohibited. | => LOAN_CLOSE_DATE and =< MATURITY_DATE<br><br>If not null, LOAN_PREPAYMENT_FLAG = "Y" | 8 | MMDDYYYY |
| PREPAYMENT_TERM_END_DATE | The last date in the loan term for which prepayment penalties can be applied. | => LOCKOUT_END_DATE and =< MATURITY_DATE<br><br>If not null, LOAN_PREPAYMENT_FLAG = "Y" | 8 | MMDDYYYY |

*FIG. 57*

FORECLOSURE OR WORKOUT INFORMATION

| FIELD NAME | FIELD DESCRIPTION | VALIDATION | FIELD WIDTH | FIELD FORMAT |
|---|---|---|---|---|
| FORECLOSURE_NOTIFICATION_DATE | Date of foreclosure notification or start of foreclosure process. | => LOAN_CLOSE_DATE and <= MATURITY_DATE | 8 | MMDDYYYY |
| BANKRUPTCY_FLAG | A code indicating whether or not the borrower was in bankruptcy at the time the property was foreclosed. Valid values are:<br>Y - yes<br>N - no<br>U - not available | If not null, LOAN_STATUS_CODE cannot be "C"<br><br>Y, N, U | 1 | Y,N,U |
| FORECLOSURE_DATE | The date the foreclosure was effective or the date deed in lieu of foreclosure was executed. | => LOAN_CLOSE_DATE and <= MATURITY_DATE<br><br>If not null, LOAN_STATUS_CODE = "T" and TERMINATION_CODE = "F" | 8 | MMDDYYYY |
| SALE_DATE | Date property was sold under foreclosure. | => LOAN_CLOSE_DATE and <today<br>=> FORECLOSURE_DATE and <today | 8 | MMDDYYYY |
| RECOVERED_VALUE_AMT | The value recovered from foreclosure net of all holding and sales expenses. | >0 and =< ORIGINAL_LOAN_AMT | 15 | 999999999999.99 |
| SALE_AMT | The gross sales price of the property sold under foreclosure. | | 15 | 999999999999.99 |
| SALE_EXPENSE_AMT | Costs incurred in selling a foreclosed property including holding costs. | =>0 and =< ORIGINAL_LOAN_AMT | 15 | 999999999999.99 |

*FIG. 58a*

NEW_LOAN_CODE   A code indicating whether or not a new loan was   F, N, W, U   1   F,N,W,U
granted due to foreclosure or workout. Valid
values are:
    F - granted due to foreclosure
    N - no new loan
    W - granted for a workout
    U - not available

*FIG. 58b*

PROPERTY STATIC INFORMATION

| FIELD NAME | FIELD DESCRIPTION | VALIDATION | FIELD WIDTH | FIELD FORMAT |
|---|---|---|---|---|
| PROVIDER_PROPERTY_ID | The property number assigned to this property asset by the data provider. | Mandatory field for property owner and manager data providers | 32 | |
| PROPERTY_OS_CODE | The type of ownership entity for the property. Valid values are:<br>C - cooperative<br>G - Government owned or public housing<br>L - HUD limited dividend<br>N - not for profit (including joint ventures)<br>P - for profit<br>R - REIT<br>O - other<br>U - not available | C, G, L, N, P, R, O, U | 1 | C,G,L,N,P,R,O,U |
| PROPERTY_NAME | Marketing name used for the property. | | 41 | |
| STREET_ADDRESS | The street address of the property (NOT the mailing address of the property owner/manager). For scattered site properties, provide the address of the on-site property management office. | Key field for asset matching process | 51 | |
| CITY_NAME | The city where the property is located. | | 24 | |
| COUNTY_NAME | The name of the county (or independent city) where the property is located. | COUNTY_NAME and COUNTY_FIPS_CODE should match; COUNTY_FIPS_CODE has precedence | 24 | |
| COUNTY_FIPS_CODE | The FIPS code of the county (or independent city) where the property is located. | COUNTY_NAME and COUNTY_FIPS_CODE should match; COUNTY_FIPS_CODE has precedence | 3 | |
| STATE | The postal abbreviation of the state/province where the property is located. | Must be one of 53 state postal codes. (50 states, DC, PR, and VI) | 2 | |

FIG. 59a

| Field | Description | Length | Format |
|---|---|---|---|
| ZIP | The zip/postal code of the property. Validation to be provided by the geocoding software. | 5 | Mandatory Field. Numeric characters only, leading zeros required. (All positions must be filled.) Should be valid for the STATE indicated | 99999 |
| ZIP_EXTENSION | Zip code extension. | 4 | null or numeric characters only, leading zeros required. (All positions must be filled.) | 9999 |
| CENSUS_TRACT_NO | Census tract where the property is located. | 18 | Provided, or else derived | |
| LATITUDE | Latitude of the property location. (signed decimal number) | 10 | If provided, >15 and <75, or else derived | ±999.99999 |
| LONGITUDE | Longitude of the property location. (signed decimal number) | 10 | If provided, < -45 and > -180, or else derived | ±999.99999 |
| PURCHASE_AMT | The original amount to purchase (for acquisition) or total hard construction cost plus land cost (for new construction) | 15 | => 0 and < 100,000,000 | 999999999999.99 |
| REHABILITATION_AMT | The costs incurred to rehabilitate the property at or just subsequent to property acquisition. | 15 | => 0 and < 100,000,000 | 999999999999.99 |
| OTHER_ACQUISITION_AMT | All other costs when added to PURCHASE_AMT and REHABILITATION_AMT to account for total property cost | 15 | => 0 and < 100,000,000 | 999999999999.99 |
| ACQUISITION_DATE | The date that the property was purchased or acquired. | 8 | =< LOAN_CLOSE_DATE | MMDDYYYY |
| SCATTERED_SITE_FLAG | A code indicating whether or not the property is a scattered site. Valid values are:<br>Y - yes<br>N - no<br>U - not available | 1 | Y,N,U<br>If "Y", NO_BUILDINGS must be >1 | Y,N,U |
| NO_RESIDENTIAL_BUILDINGS | The number of residential buildings on the property. | 3 | >0 and < 100 | 999 |

*FIG. 59b*

| | | | | |
|---|---|---|---|---|
| NO_STORIES | Number of stories in the highest residential building. | >0 and <100 | 3 | 999 |
| PROJECT_TYPE_CODE | A code describing the type of project. Valid values are:<br>C - co-op<br>R - rental<br>O - other (Mutual Housing Assoc., etc.)<br>U - not available | C, R, O, U | 1 | C,R,O,U |
| SPECIAL_TENANCY_TYPE_CODE | A code describing the types of tenants resident on the property. Valid values are:<br>C - corporate apartments<br>D - disabled<br>E - elderly (55+)<br>M - military<br>N - none<br>S - student<br>O - other<br>U - not available | C, D, E, M, N, S, O, U | 1 | C,D,E,M,N,S,O,U |
| ELDERLY_HOUSING_TYPE_CODE | A code indicating the type of Elderly Housing. Valid values are:<br>A - assisted living<br>C - congregate<br>F - continuing care facility<br>I - independent living facility<br>N - no elderly housing<br>O - other<br>U - not available | A, C, F, I, N, O, U<br>If not null or not "U," SPECIAL_TENANCY_TYPE_CODE must be "E" | 1 | A,C,F,E,N,O,U |

FIG. 59c

| Field | Description | Length | Valid Values |
|---|---|---|---|
| BUILDING_TYPE_CODE | A code describing the type of buildings in the complex. If more than one type of building exists, predominant building type. (Building description codes, i.e., high-rise, etc., will be determined by the system based on NO_STORIES and ELEVATOR_FLAG.) Valid values are:<br>G - garden<br>P - mobile home park<br>T - townhouse<br>O - other<br>U - not available | 1 | G, P, T, O, U |
| SRO_FLAG | A code indicating whether this property is Single Room Occupancy. Valid values are:<br>Y - yes<br>N - no<br>U - not available | 1 | Y, N, U |
| RENT_CONTROL_FLAG | A code indicating whether this property is subject to provisions of local rent control statutes. Valid values are:<br>Y - yes<br>N - no<br>U - not available | 1 | Y, N, U |
| INITIAL_CONSTRUCTION_YR | The year the property was initially constructed. | 4 | Between 1850 and today<br><br>If null and LOAN_PURPOSE_CODE = "D," system will populate with LOAN_CLOSE_DATE | YYYY |
| SUBSTANTIAL_REHAB_COMPLETE_YR | The year the most recent rehabilitation of the property was completed. | 4 | Between 1945 and today<br><br>If null and LOAN_PURPOSE_CODE = "H", system will populate with LOAN_CLOSE_DATE | YYYY |

*FIG. 59d*

| | | | |
|---|---|---|---|
| NO_UNITS | The number of units on the property including ALL potential rental units - models, staff units, office, etc. | => 5 and =< 10,000<br><br>NO_UNITS must be within 5% of Sum of Unit Mix (NO_0_BEDROOMS + NO_1_BEDROOMS + NO_2_BEDROOMS + NO_3_BEDROOMS + NO_4_BEDROOMS) | 5 | 99999 |
| NO_0_BEDROOM | The number of efficiencies or studios with 0 bedrooms. | => 0 and < NO_UNITS | 5 | 99999 |
| SQ_FT_0_BEDROOM | The average square feet per unit for units with 0 bedrooms. | > 100 and 1000 | 5 | 99999 |
| NO_1_BEDROOM | The number of units on the property with 1 bedroom. | => 0 and < NO_UNITS | 5 | 99999 |
| SQ_FT_1_BEDROOM | The average square feet per unit for units with 1 bedroom. | > 200 and < 2000 | 5 | 99999 |
| NO_2_BEDROOM | The number of units on the property with 2 bedrooms (den should be counted as a bedroom) | => 0 and < NO_UNITS | 5 | 99999 |
| SQ_FT_2_BEDROOM | The average square feet per unit for units with 2 bedrooms (den should be counted as a bedroom) | > 300 and < 3000 | 5 | 99999 |
| NO_3_BEDROOM | The number of units on the property with 3 bedrooms (den should be counted as a bedroom) | =>0 and < NO_UNITS | 5 | 99999 |
| SQ_FT_3_BEDROOM | The average square feet per unit for units with 3 bedrooms (den should be counted as a bedroom) | > 400 and <4000 | 5 | 99999 |
| NO_4_BEDROOM | The number of units on the property with 4 or more bedrooms (den should be counted as a bedroom) | => 0 and < NO_UNITS | 5 | 99999 |
| SQ_FT_4_BEDROOM | The average square feet per unit for units with 4 or more bedrooms (den should be counted as a bedroom) | > 500 and < 5000 | 5 | 99999 |

FIG. 59e

| | | | |
|---|---|---|---|
| NO_UNITS_HANDICAPPED | The number of units that are handicapped accessible | =< NO_UNITS | 5 | 99999 |
| NO_SUBSIDIZED_UNITS | The number of subsidized units in the property. | =< NO_UNITS | 5 | 99999 |
| NET_RENTABLE_RESIDENTIAL_SQ_FT | The total square feet for residential rental purposes. | => 1100 and =< 1,500,000 | 7 | 9999999 |
| | If null, system will calculate from above information on average square footage and number of units by bedroom size | | | |
| NET_COMMERCIAL_SQ_FT | The net commercial rentable square footage (i.e., retail, commercial...). This should not include square feet attributable to amenities. | | 7 | 9999999 |
| PROPERTY_LAND_AREA | The property land area as measured in acres. | > 0.10 and <1000 | 8 | 9999.999 |
| TOTAL_PARKING | Total number of parking spaces. | < 2 * NO_UNITS | 5 | 99999 |
| GARAGE_PARKING | Total number of parking spaces in a garage. | =< TOTAL_PARKING | 5 | 99999 |
| CARPORT_PARKING | Total number of parking spaces that are covered but are not in a garage. | =< TOTAL_PARKING | 5 | 99999 |
| ELEVATOR_FLAG | A code indicating whether or not the property has elevators. Valid values are:<br>Y - yes (1 or more buildings have an elevator)<br>N - no (none of the buildings have an elevator)<br>U - not available | Y, N, U | 1 | Y,N,U |
| AIR_CONDITION_FLAG | A code indicating whether or not the property has air conditioning. Valid values are:<br>Y - yes (1 or more buildings have air conditioning)<br>N - no (none of the buildings have air conditioning)<br>U - not available | Y, N, U | 1 | Y,N,U |

FIG. 59f

| | | | |
|---|---|---|---|
| HEAT_OR_GAS_PAYMENT_FLAG | A code describing the responsibility for payment of heat costs. Valid values are:<br>O - owner<br>T - tenant<br>U - not available | O, T, U | 1 | O,T,U |
| ELECTRIC_PAYMENT_FLAG | A code describing the responsibility for payment of electricity costs. Valid values are:<br>O - owner<br>T - tenant<br>U - not available | O, T, U | 1 | O,T,U |
| WATER_PAYMENT_FLAG | A code indicating the responsibility for payment of water costs. Valid values are:<br>O - owner<br>T - tenant<br>U - not available | O, T, U | 1 | O,T,U |
| SEWER_PAYMENT_FLAG | A code indicating the responsibility for payment of sewer costs. Valid values are:<br>O - owner<br>T - tenant<br>U - not available | O, T, U | 1 | O,T,U |
| WASH_DRYER_FLAG | A code indicating whether or not the individual units have hook-ups for washers and dryers. Valid values are:<br>Y - yes (1 or more buildings have hook-ups)<br>N - no (none of the buildings have hook-ups)<br>U - not available | Y, N, U | 1 | Y,N,U |
| TENNIS_COURT_FLAG | A code indicating whether or not the property has tennis court(s). Valid values are:<br>Y - yes<br>N - no<br>U - not available | Y, N, U | 1 | Y,N,U |

FIG. 59g

| | | | |
|---|---|---|---|
| SWIMMING_POOL_FLAG | A code indicating whether or not the property has swimming pool(s). Valid values are:<br>　　Y - yes<br>　　N - no<br>　　U - not available | 1 | Y,N,U |
| BASKETBALL_COURT_FLAG | A code indicating whether or not the property has basketball court(s). Valid values are:<br>　　Y - yes<br>　　N - no<br>　　U - not available | 1 | Y,N,U |
| WORKOUT_FACILITY_FLAG | A code indicating whether or not the property has a workout facility(s). Valid values are:<br>　　Y - yes<br>　　N - no<br>　　U - not available | 1 | Y,N,U |
| GROUND_LEASE_FLAG | A code indicating if a ground lease exists. Valid values are:<br>　　Y - yes<br>　　N - no<br>　　U - not available | 1 | Y,N,U |

FIG. 59h

PROPERTY DYNAMIC PERFORMANCE INFORMATION

| FIELD NAME | FIELD DESCRIPTION | VALIDATION | FIELD WIDTH | FIELD FORMAT |
|---|---|---|---|---|
| REVENUE_AND_EXPENSE_AS_OF_DATE | "As of" date for the revenue and expense amounts below | Mandatory Field | 8 | MMDDYYYY |
| NUMBER_OF_PERIODS_INCLUDED | Number of periods (quarters) covered by the revenue and expense amounts below | Mandatory Field 1, 2, 3, or 4 | 2 | 99 |
| GROSS_POTENTIAL_RESIDENT_RENT_AMT | The annual gross potential rental income from tenants on 100% of the residential units including models, staff units, office, etc., but excludes direct payments received as subsidies from organizations other than the tenant. | >0 and <NO_UNITS * 100,000 =< TOTAL_GROSS_POTENTIAL_RENT_AMT | 15 | 999999999999.99 |
| GROSS_POTNTL_GOVT_RENT_AMT | The annual gross governmental rental assistance received as a subsidy for tenants. | >0 and <NO_UNITS * 100,000 =< TOTAL_GROSS_POTENTIAL_RENT_AMT | 15 | 999999999999.99 |
| TOTAL_GROSS_POTENTIAL_RENT_AMT | The annual gross potential rental income from 100% of the residential units including all models, staff units, office, etc. Includes all government assistance. | Equal to: GROSS_POTENTIAL_RESIDENTIAL_RENT_AMT + GROSS_POTENTIAL_GOVT_RENT_AMT; otherwise is undifferentiated gross potential rent | 15 | 999999999999.99 |
| VACANCY_AMT | The total annual amount of gross potential rental income not collected due to vacancies and other uses of units/space. | >0 and <NO_UNITS * 50,000 Equal to: VACANCY_RESIDENTIAL_AMT + VACANCY_COMMERCIAL_AMT | 15 | 999999999999.99 |
| VACANCY_RESIDENTIAL_AMT | The annual amount of gross potential residential rental income not collected due to vacancies and other uses of units. | >0 and <NO_UNITS*100,000 >0 and <NO_UNITS*50,000 | 15 | 999999999999.99 |

FIG. 60a

| Field | Description | Validation | Length | Max Value |
|---|---|---|---|---|
| VACANCY_COMMERCIAL_AMT | The annual amount of gross potential commercial rental income not collected due to vacancies and other uses of units. | Null or =<VACANCY_AMT | 15 | 999999999999.99 |
| COLLECTION_LOSS_AMT | The amount of gross potential residential rent not collected due to collection losses. | => 0 and < .20 * TOTAL_GROSS_POTENTIAL_RENT_AMT | 15 | 999999999999.99 |
| NET_COMMERCIAL_RENT_AMT | The total net rental income from 100% of the commercial space. | => 0 and < 0.30 * TOTAL_GROSS_POTENTIAL_RENT_AMT | 15 | 999999999999.99 |
| INTEREST_INCOME_AMT | The amount of income received from interest | | 15 | 999999999999.99 |
| NON_RENT_AMT | Income from nonrental sources, for example: parking, laundry, furniture rentals, meal services, etc. | | 15 | 999999999999.99 |
| TOTAL_REVENUE_AMT | A system calculated amount indicating the total income for the property. | Equal to: TOTAL_GROSS_POTENTIAL_RENT_AMT - VACANCY_AMT - COLLECTION_LOSS_AMT + NET_COMMERCIAL_RENT_AMT + INTEREST_INCOME_AMT + NON_RENT_AMT | 15 | 999999999999.99 |
| PROPERTY_MANAGEMENT_FEE_AMT | The management fee for the property (excluding bookkeeping and computer fees). | =>0 and < TOTAL_REVENUE_AMT * 0.25 | 15 | 999999999999.99 |
| ADMIN_TOTAL_EXPENSE_AMT | Total expenses related to the administration of the property. Examples include: advertising, leasing, telephone, office supplies, project legal and audit, model and other overhead units, leased furniture, etc. | =>0 and < TOTAL_REVENUE_AMT * 0.15 | 15 | 999999999999.99 |
| ADMIN_MKTG_EXPENSE_AMT | Expenses related to the marketing and advertising of rental units in the property, locator fees, model expenses, promotions, etc. | <= ADMIN_TOTAL_EXPENSE_AMT | 15 | 999999999999.99 |

*FIG. 60b*

| Field | Description | Validation | Max |
|---|---|---|---|
| PAYROLL_EXP_AMT | The human resource cost associated with managing the property. Examples include: salaries, employee units, benefits, payroll taxes, etc. | => 0 and < TOTAL_REVENUE_AMT * 0.30 | 15 | 9999999999999.99 |
| MAINTENANCE_EXPENSE_AMT | Expenses related to the maintenance of the property. Examples include: trash removal, pest treatments, routine maintenance, decorating, cleaning, turnover, elevator, pool, snow removal, gardening, etc. | => 0 and < TOTAL_REVENUE_AMT * 0.40 | 15 | 9999999999999.99 |
| UTILITY_EXPENSE_AMT | Total utility expenses related to property utilities. Examples include: water, sewer, electricity, gas, etc. | => 0 and < TOTAL_REVENUE_AMT*.50  Equal to: WATER_AND_SEWER_EXPENSE_AMT + ELECTRICITY_EXPENSE_AMT+ GAS_EXPENSE_AMT + OIL_EXPENSE_AMT + OTHER_UTILITY_AMT | 15 | 9999999999999.99 |
| WATER_AND_SEWER_EXPENSE_AMT | Property expenses for water and sewer utility service. | => 0 and < UTILITY_EXPENSE_AMT  Equal to: WATER_EXPENSE_AMT + SEWER_EXPENSE_AMT | 15 | 9999999999999.99 |
| WATER_EXPENSE_AMT | Expenses for water utility service | => 0 =< WATER_AND_SEWER_EXPENSE_AMT | 15 | 9999999999999.99 |
| SEWER_EXPENSE_AMT | Expenses for sewer utility service | => 0 =< WATER_AND_SEWER_EXPENSE_AMT | 15 | 9999999999999.99 |
| ELECTRICITY_EXPENSE_AMT | Property expenses for electricity. | =>0 and < UTILITY_EXPENSE_AMT | 15 | 9999999999999.99 |
| GAS_EXPENSE_AMT | Property expenses for gas. | =>0 and < UTILITY_EXPENSE_AMT | 15 | 9999999999999.99 |
| OIL_EXPENSE_AMT | Property expenses for fuel oil. | =>0 and < UTILITY_EXPENSE_AMT | 15 | 9999999999999.99 |

FIG. 60c

| | | | |
|---|---|---|---|
| OTHER_UTILITY_AMT | Utility expenses related to the property other than water, sewer, electricity, gas or fuel oil. Examples include steam heat, coal, etc. | => 0 and < UTILITY_EXPENSE_AMT | 15 | 99999999999.99 |
| INSURANCE_EXPENSE_AMT | Expenses incurred to insure the property and its contents. Includes both real and personal property insurance. This should be the actual insurance expense rather than the amount that is paid into escrow. | => 0 and < TOTAL_REVENUE_AMT * 0.15 | 15 | 99999999999.99 |
| SOC_SERVICE_EXP_AMT | Expenses incurred providing social services, including congregate services expenses. | => 0 and < TOTAL_REVENUE_AMT | 15 | 99999999999.99 |
| TAX_AMT | Tax expense paid for both real and personal property. Does NOT include income tax expense. This should be the actual property tax expense rather than the amount that is paid into escrow. | => 0 and < TOTAL_REVENUE_AMT * 0.40 | 15 | 99999999999.99 |
| OTHER_EXPENSE_AMT | Expenses other than those defined above related to the property. DOES NOT include depreciation, amortization or property income tax. | => 0 and < TOTAL_REVENUE_AMT * 0.15 | 15 | 99999999999.99 |
| TAX_ABATEMENT_FLAG | A code indicating whether or not the property is currently not required to pay property taxes due to tax abatement. Valid values are:<br>Y - yes<br>N - no<br>U - not available | Y, N, U | 1 | Y,N,U |

*FIG. 60d*

| | | | |
|---|---|---|---|
| TOTAL_OP_EXPENSE_AMT | Total operating expenses for the property. | Equal to:<br>PROPERTY_MANAGEMENT_FEE_AMT +<br>ADMIN_TOTAL_EXPENSE_AMT +<br>PAYROLL_EXP_AMT +<br>MAINTENANCE_EXPENSE_AMT +<br>UTILITY_EXPENSE_AMT +<br>INSURANCE_EXPENSE_AMT +<br>SOC_SERVICE_EXP_AMT +<br>TAX_AMT +<br>OTHER_EXPENSE_AMT | 15 | 999999999999.99 |
| NET_OPERATING_INCOME_AMT | The net operating income of the property determined as the difference between Total Revenue and Total Operating Expenses. | Equal to: TOTAL_REVENUE_AMT - TOTAL_OP_EXPENSE_AMT | 15 | 999999999999.99 |
| INTEREST_PAID_AMT | Total interest expense payments on the first mortgage | => 0 and < 0.20 * ORIGINAL_LOAN_AMT | 15 | 999999999999.99 |
| PRINCIPAL_PAID_AMT | Total principal payments on the first mortgage | => 0 and < ORIGINAL_LOAN_AMT | 15 | 999999999999.99 |
| DEBT_SERVICE_AMT | Total principal and interest payments made on the first mortgage | Equal to: INTEREST_PAID_AMT + PRINCIPAL_PAID_AMT | 15 | 999999999999.99 |
| DEBT_SERVICE_SUBORDINATE_LOANS_AMT | Total principal and interest payments made on all subordinate loans. | If > 0, SUBORDINATE_DEBT_FLAG must be "Y" | 15 | 999999999999.99 |
| GROUND_LEASE_PAYMENT_AMT | Payment amount for a ground lease, if applicable | If >0, GROUND_LEASE_FLAG must be "Y" | 15 | 999999999999.99 |
| REPLACEMENT_RESERVE_AMT | The amounts paid to the replacement reserves. | < ORIGINAL_LOAN_AMT * 0.20 | 15 | 999999999999.99 |
| REPLACEMENT_RESERVE_BAL_AMT | The balance in the replacement reserves. | < ORIGINAL_LOAN_AMT | 15 | 999999999999.99 |
| CAPITAL_EXPENDITURE_AMT | The cost of improvements to the property that were capitalized and not expensed. | | 15 | 999999999999.99 |

FIG. 60e

| | | | |
|---|---|---|---|
| RESIDUAL_RECEIPTS_BAL_AMT | The cash flow in excess of the limited dividend amount. | If > 0, PROPERTY_OS_CODE must be "L" | 15 | 999999999999.99 |
| NO_OCCUPIED_RESIDENTIAL_UNITS | The number of units on the property that are occupied by residents. | => 0 and =< NO_UNITS | 5 | 99999 |
| NO_CURRENT_VACANT_UNITS | The number of units on the property that are vacant at the end of this reporting period. | => 0 and =< NO_UNITS | 5 | 99999 |
| COMMERCIAL_OCCUPIED_PERCENT | The percentage of the total commercial square feet for the property that are currently occupied. Express as a decimal number. | => 0 and =< 1.00 | 6 | 999999 |
| CURRENT_EFFECTIVE_MKT_RENT_0_BR | The average effective market rent for a 0 bedroom unit from the most recent lease. Effective monthly rent is lease rate net of all incentives. | Null or > 0 and < 3000 | 15 | 999999999999.99 |
| MARKET_RENT_0_BR_AS_OF_DATE | The lease date for the current effective market rent, 0 bedroom. | | 8 | MMDDYYYY |
| CURRENT_EFFECTIVE_MKT_RENT_1_BR | The average effective market rent for a 1 bedroom unit from the most recent lease. Effective monthly rent is lease rate net of all incentives. | Null or >0 and <6000 | 15 | 999999999999.99 |
| MARKET_RENT_1_BR_AS_OF_DATE | The lease date for the current effective market rent, 1 bedroom. | | 8 | MDDYYYY |
| CURRENT_EFFECTIVE_MKT_RENT_2_BR | The average effective market rent for a 2 bedroom unit from the most recent lease. Effective monthly rent is lease rate net of all incentives. | null or > 0 and < 9,000 | 15 | 999999999999.99 |
| MARKET_RENT_2_BR_AS_OF_DATE | The lease date for the current effective market rent, 2 bedroom. | | 8 | MMDDYYYY |
| CURRENT_EFFECTIVE_MKT_RENT_3_BR | The average effective market rent for a 3 bedroom unit from the most recent lease. Effective monthly rent is lease rate net of all incentives. | null or > 0 and <12,000 | 15 | 999999999999.99 |

FIG. 60f

| | | | |
|---|---|---|---|
| MARKET_RENT_3_BR_AS_O F_DATE | The lease date for the current effective market rent, 3 bedroom. | 8 | MMDDYYYY |
| CURRENT_EFFECTIVE_MKT RENT_4_BR | The average effective market rent for a 4 bedroom unit from the most recent lease. Effective monthly rent is lease rate net of all incentives. | null or > 0 and < 15,000 | 15 | 99999999999.99 |
| MARKET_RENT_4_BR_AS_O F_DATE | The lease date for the current effective market rent, 4 bedroom. | 8 | MMDDYYYY |
| UNIT_TURNOVER | The number of tenants that have moved out in this period. | => 0 and < 3 * NO_UNITS | 5 | 99999 |

*FIG. 60g*

PROPERTY VALUATION INFORMATION

| FIELD NAME | FIELD DESCRIPTION | VALIDATION | FIELD WIDTH | FIELD FORMAT |
|---|---|---|---|---|
| VALUATION_EFFECTIVE_D ATE | The effective date of the valuation. | | 8 | MMDDYYYY |
| VALUATION_TYPE_CODE | A code indicating the source of the valuation. Valid values are:<br>E - appraisal/external valuation<br>I - Internal/underwriting assumption<br>P - actual sale price<br>A - APT generated | E, I, P, A | 1 | E,I,P,A |
| PROPERTY_VALUE_AMT | The value of the property. | If FHA_PROJECT_NO is null, must be >0 | 15 | 999999999999.99 |
| REPLACEMENT_COST_AMT | Appraiser or underwriters value of the property based on the estimated cost of replacement at the time of valuation. | | 15 | 999999999999.99 |
| COMPARE_SALE_AMT | Appraiser or underwriter's value based on comparable sales in the prior 12 months at time of valuation. | | 15 | 999999999999.99 |
| INCOME_CAP_AMT | Appraiser or underwriter's value based on the income generated from the property at the time of valuation. | | 15 | 999999999999.99 |
| TOTAL_ESTIMATED_PROJE CT_AMT | Total assumed project costs used at underwriting valuation. | | 15 | 999999999999.99 |
| VACANCY_FACTOR | The vacancy factor used for valuation. Expressed as decimal amount. | <0.30 | 10 | 9999.99999 |
| VALUATION_NOI_AMT | Net Operating Income utilized for valuation. | >0.80 and <3.00 | 15 | 999999999999.99 |

FIG. 61a

| | | | |
|---|---|---|---|
| ACTUAL_DSCR | Debt Service Coverage Ratio for valuation. | > 0.02 and < 0.20 | 10 | 9999.99999 |
| CAP_RATE | Capitalization rate used to determine Income Capitalization Value. | | 10 | 9999.99999 |

FIG. 61b

LOW-INCOME HOUSING TAX CREDIT INFORMATION

| FIELD NAME | FIELD DESCRIPTION | VALIDATION | FIELD WIDTH | FIELD FORMAT |
|---|---|---|---|---|
| ANNUAL_TAX_CREDIT_BAS IS_AMT | The property basis that was actually used to determine the credit. This should agree with the state Form 8609. | > 0 and < 0.25 * PURCHASE_AMT<br><br>If > 0, AH_LIHTC_FLAG must be "Y" | 15 | 999999999999.99 |
| ACTUAL_NO _TAX_CREDIT_UNITS | The number of units actually used to determine available tax credit. | > 0 and < NO_UNITS<br><br>If > 0, AH_LIHTC_FLAG must be "Y" | 5 | 99999 |
| TOTAL_NOPAY_GRANT_AM T | The total value of grants that will not be repaid. | If > 0, AH_LIHTC_FLAG must be "Y" | 15 | 999999999999.99 |
| PRICE_PER_CREDIT_TO_DE VELOPER | The price per dollar of tax credit basis paid to the developer. | > 0.25 and < 1.00<br><br>If > 0, AH_LIHTC_FLAG must be "Y" | 6 | .99999 |

*FIG. 62*

TARGET RENT INFORMATION

| FIELD NAME | FIELD DESCRIPTION | VALIDATION | FIELD WIDTH | FIELD FORMAT |
|---|---|---|---|---|
| NO_UNITS_60_TO_80 | The total number of units in the property set aside for tenants whose income is greater than 60% of the median income for the area, but less than 80% of the median income for the area. | => 0 and =< NO_UNITS | 5 | 99999 |
| NO_UNITS_50_TO_60 | The total number of units in the property set aside for tenants whose income is greater than 50% of the median income for the area, but less than 60% of the median income for the area. | => 0 and =< NO_UNITS | 5 | 99999 |
| NO_UNITS_LESS_50 | The total number of units in the property set aside for tenants whose income is less than 50% of the median income for the area. | => 0 and =< NO_UNITS | 5 | 99999 |
| SETASIDE_UNITS | Total number of units in the property that are set aside for tenants with income less than the median income of the areas. | => 0 and =< NO_UNITS | 5 | 99999 |
| USE_RESTRICT_EXPIRE_DATE | Date on which all of the units in the property can be rented at market rates and are not restricted to tenants that meet target income requirements. | > ACQUISITION_DATE | 8 | MMDDYYYY |

*FIG. 63*

AFFORDABLE HOUSING PROGRAM INFORMATION

| FIELD NAME | FIELD DESCRIPTION | VALIDATION | FIELD WIDTH | FIELD FORMAT |
|---|---|---|---|---|
| AH_SAI_FLAG | State Agency Insurance<br>Y - yes<br>N - no<br>U - not available | Y, N, U | 1 | Y,N,U |
| AH_TEB_FLAG | Tax Exempt Bond/MRB/Section 11b<br>Y - yes<br>N - no<br>U - not available | Y, N, U | 1 | Y,N,U |
| AH_RTCAH_FLAG | RTC Affordable Housing Sale<br>Y - yes<br>N - no<br>U - not available | Y, N, U | 1 | Y,N,U |
| AH_FHLB_FLAG | Federal Home Loan Bank affordable housing program<br>Y - yes<br>N - no<br>U - not available | Y, N, U | 1 | Y,N,U |
| AH_515_FLAG | 515/Other "FMHA" or "RECD"<br>Y - yes<br>N - no<br>U - not available | Y, N, U | 1 | Y,N,U |
| AH_RR_FLAG | Rental Rehabilitation grants or loans, other than CDBG<br>Y - yes<br>N - no<br>U - not available | Y, N, U | 1 | Y,N,U |

*FIG. 64a*

| | | | |
|---|---|---|---|
| AH_LIHTC_FLAG | Low-Income Housing Tax Credit<br>Y - yes<br>N - no<br>U - not available | Y, N, U<br>Complete Low-Income Housing Tax Credit information. | 1 | Y,N,U |
| AH_CDBG_FLAG | Community Development Block Grant<br>Y - yes<br>N - no<br>U - not available | Y, N, U | 1 | Y,N,U |
| AH_PH_FLAG | Public Housing<br>Y - yes<br>N - no<br>U - not available | Y, N, U | 1 | Y,N,U |
| AH_OTHER_FLAG | Other non-FHA program<br>Y - yes<br>N - no<br>U - not available | Y, N, U | 1 | Y,N,U |
| AH_NON_FHA_FLAG | Property has one or more non-FHA programs<br>Y - yes<br>N - no<br>U - not available | Y, N, U<br>At least one of the non-FHA affordable housing codes is YES. | 1 | Y,N,U |
| AH_HOME_FLAG | HOME program<br>Y - yes<br>N - no<br>U - not available | Y, N, U | 1 | Y,N,U |
| AH_HOPE6_FLAG | HOPE6 program<br>Y - yes<br>N - no<br>U - not available | Y, N, U | 1 | Y,N,U |

*FIG. 64b*

| SECTION8_FLAG | Assisted by one or more Section 8 contracts. Valid values are:<br>Y - yes<br>N - no<br>U - not available | 1 | Y,N,U |
| --- | --- | --- | --- |
| OTHER_FED_RENT_ASSIST_FLAG | Assisted by one or more Federal programs other than Section 8 contracts. Valid values are:<br>Y - yes<br>N - no<br>U - not available | 1 | Y,N,U |
| AH_TENANT_ASSIST_FLAG | Units in this property receive some form of project-based tenant rental assistance. Valid values are:<br>Y - yes<br>N - no<br>U - not available | 1 | Y,N,U |

*FIG. 64c*

COMPUTER DATABASE SYSTEM AND METHOD FOR COLLECTING AND REPORTING REAL ESTATE PROPERTY AND LOAN PERFORMANCE INFORMATION OVER A COMPUTER DRIVEN NETWORK

FIELD OF THE INVENTION

The invention relates to a computer database system and method using a database in a computer database system for collecting and processing information from data providers of real estate property and loan performance information and providing reports concerning the information in response to queries, and in particular to collecting and reporting the property and loan performance information over a computer driven network.

BACKGROUND OF THE INVENTION

Based on numerous public and private studies, it is widely agreed that the real estate data market lacks a consistent, standardized, and timely centralized source of property and loan performance information, especially with respect to the multifamily housing industry. Consequently, the economic cycles affecting real estate are more severe than they would be otherwise, costing the nation billions of dollars in lost revenues, productivity, and affordable housing stock.

Many of the industry's larger owners, managers, financial institutions, and rating and research organizations have long felt the need to standardize and share their confidential and proprietary performance data under an agreed set of 'confidentiality principals'. However, no such agreement has existed to govern the way in which data is collected, secured, and in particular processed into statistical reports that can be made publicly available. A main concern with respect to such an agreement has involved outlining a reporting process that does not reveal the confidential aspects of the underlying assets and related properties.

Data of the type needed for building a database of real estate property and loan performance information has typically been maintained by an independent research company or organization. Such a company or organization maintains the confidentiality of the data by checking each report request and following strict guidelines governing the confidentiality of the data. However, data providers are concerned that the same measures of confidentiality cannot be maintained when the report queries are processed automatically and responses forwarded electronically over a computer driven network, such as the Internet.

Accordingly, despite the availability of the Internet and database servers, in general, the real estate data market is still under served by this technology. The primary reason for this is the reluctance of the asset managers and property owners, who have the proprietary data needed for building an adequate database, to come forward and provide the data. The reluctance is due to their concern for maintaining the confidentiality of the data. That is, if confidential data of assets is entered into a database that is available for searching over the Internet, then the risk for the data provider is that the data may be made available to the public, at great harm to the individual data provider.

SUMMARY OF THE INVENTION

It is an object of the invention to collect, store and provide reports on real estate property and loan performance information provided by data providers from the real estate industry, especially the multifamily real estate industry, using a computer database and a computer driven network, such as the Internet.

It is an object of the invention to establish a computer database into which data of real estate assets, including detailed information identifying the property and its usage, as well as loan information and financial performance information is entered into the database by data providers in a standardized format over a computer driven network.

Further, it is an object of the invention to generate reports from the information stored in the database, including pre-aggregated and user defined reports without the need for manual processing of the report requests that are forwarded to users over a computer driven network without compromising the confidentiality of the data of any of the underlying assets.

BRIEF DESCRIPTION OF THE DRAWINGS

FIG. 4 shows a user interface for entering property information in a user query process.

FIG. 5 shows a user interface for entering time period information in a user query process.

FIG. 6 shows a user interface for entering financing information in a user query process.

FIG. 7 shows a user interface for entering report format details in a user query process.

FIG. 8 is a table showing the description of data elements stored in the database of the system.

FIG. 9 is a table of loan static information.

FIG. 10 is a table of additional loan static information.

FIG. 11 is a table of loan dynamic information.

FIG. 12 is a table of property static information.

FIG. 13 is a table of additional property static information.

FIG. 14 is a table of additional property static information.

FIG. 15 is a table of property dynamic performance information.

FIG. 16 is a table of additional property dynamic performance information.

FIG. 17 is a table of property valuation information.

FIG. 18 is a table of affordable housing information.

FIG. 19 a table of data structures used in explaining the data load process according to the present invention.

FIG. 20 is a table showing an example of the standard text file format used for the control file (header) in providing data to be stored in the database of the system.

FIG. 22 is a diagram of the call flow and corresponding tables used in the data submission process shown in FIG. 22.

FIG. 24 is a diagram of the call flow and corresponding tables used in the data validation process shown in FIG. 23.

FIG. 25 is a table of validation rules for loan static information.

FIG. 26 is a table of validation rules for loan static information.

FIG. 27 is a table of validation rules for loan dynamic information.

FIG. 28 is a table of validation rules for loan adjustable rate information.

FIG. 29 is a table of validation rules for loan prepayment information.

FIG. 30 is a table of validation rules for foreclosure or workout information.

FIG. 31 is a table of validation rules for property static information.

FIG. 32 is a table of validation rules for property static information.

FIG. 33 is a table of validation rules for property static information.

FIG. 34 is a table of validation rules for property dynamic information.

FIG. 35 is a table of validation rules for property dynamic information.

FIG. 36 is a table of validation rules for property dynamic information.

FIG. 37 is a table of validation rules for target rent information.

FIG. 38 is a table of validation rules for affordable housing program information.

FIG. 39 is a table of validation rules for property valuation information.

FIG. 40 is a table of validation rules for low-income housing tax credit information.

FIG. 50 is a diagram of a sample summary report generated by the system of the present invention.

FIG. 51 is a diagram of a sample detail report generated by the system of the present invention.

FIG. 52 is a diagram of a detail report statistics sample generated by the system of the present invention.

FIG. 53 is a table of the details of the control (header) file.

FIG. 54*a* is a table of the details of the loan static information data elements.

FIG. 54*b* is a table of additional details of the loan static information data elements.

FIG. 54*c* is a table of additional details of the loan static information data elements.

FIG. 54*d* is a table of additional details of the loan static information data elements.

FIG. 54*e* is a table of additional details of the loan static information data elements.

FIG. 55*a* is a table of the details of the loan dynamic information data elements.

FIG. 55*b* is a table of additional details of the loan dynamic information data elements.

FIG. 56*a* is a table of the details of the loan adjustable rate information data elements.

FIG. 56*b* is a table of additional details of the loan adjustable rate information data elements.

FIG. 57 is a table of the details of the loan loan prepayment information data elements.

FIG. 58*a* is a table of the details of the foreclosure or workout information data elements.

FIG. 58*b* is a table of additional details of the foreclosure or workout information data elements.

FIG. 59*a* is a table of the details of the property static information data elements.

FIG. 59*b* is a table of additional details of the property static information data elements.

FIG. 59*c* is a table of additional details of the property static information data elements.

FIG. 59*d* is a table of additional details of the property static information data elements.

FIG. 59*e* is a table of additional details of the property static information data elements.

FIG. 59*f* is a table of additional details of the property static information data elements.

FIG. 59*g* is a table of additional details of the property static information data elements.

FIG. 59*h* is a table of additional details of the property static information data elements.

FIG. 60*a* is a table of the details of the property dynamic performance information data elements.

FIG. 60*b* is a table of additional details of the property dynamic performance information data elements.

FIG. 60*c* is a table of additional details of the property dynamic performance information data elements.

FIG. 60*d* is a table of additional details of the property dynamic performance information data elements.

FIG. 60*e* is a table of additional details of the property dynamic performance information data elements.

FIG. 60*f* is a table of additional details of the property dynamic performance information data elements.

FIG. 60*g* is a table of additional details of the property dynamic performance information data elements.

FIG. 61*a* is a table of the details of the property valuation information data elements.

FIG. 61*b* is a table of additional details of the property valuation information data elements.

FIG. 62 is a table of the details of the low-income housing tax credit information data elements.

FIG. 63 is a table of the details of the target rent information data elements.

FIG. 64*a* is a table of the details of the affordable housing program information data elements.

FIG. 64b is a table of additional details of the affordable housing program information data elements.

FIG. 64c is a table of additional details of the affordable housing program information data elements.

DETAILED DESCRIPTION OF THE PREFERRED EMBODIMENTS

Figure 1:
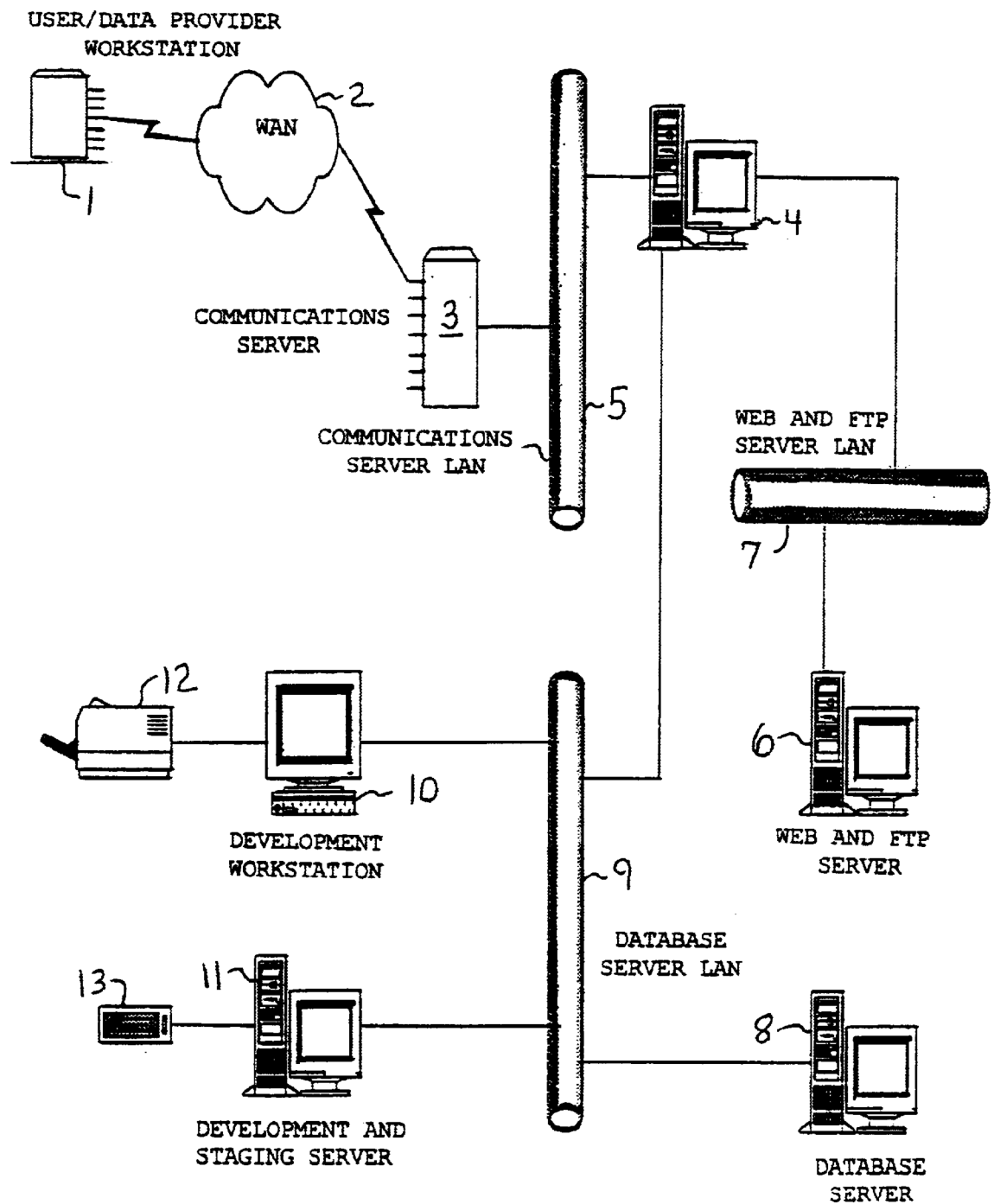
FIG. 1 shows the network architecture for the system of the present invention.

FIG. 1 shows the system architecture of the present invention. A data provider or user interfaces with the system through a workstation 1 using browser software. Workstation 1 is connected through a wide area network (WAN) 2 to a communications server 3. Communications server 3 functions as a channel service unit/data service unit that is connected to the WAN 2 or other computer driven network, such as the Internet. Communications server 3 may be, for example, an Ascend MAX4004 computer.

As also shown in FIG. 1, a firewall server 4 is connected to communications server 3 through a communications server LAN 5. A WEB and FTP (file transfer protocol) server 6 is connected to firewall server 4 through a WEB and FTP server LAN 7. Database server 8 is connected to firewall server 3 through a database server LAN 9. Also connected to database server 9 are development workstation 10 and development and staging server 11. A printer 12 is shown connected to development workstation 10 and a tape drive 13 is shown connected to development and staging server 11.

The network architecture shown in FIG. 1 is not intended to show each element of the system in detail, but rather to convey an overview of the system architecture. In particular, the communications server 3 and firewall server 4 could be combined. Also, it is intended that the system be managed by an administrator staff person, hereinafter referred to as a data or system administrator or administrator staff person. The workstation for the administrator could be either the development workstation 10, staging server 11 or anther workstation not shown in FIG. 1. The administrator can have access to the system through database server LAN 9, which is a secure LAN, through a T-1 line connection. Alternatively, the administrator can have access through a direct Internet IP address through the firewall server 4. Communications server LAN 5 may be an unsecure LAN. Further, WEB and FTP server LAN 7 is preferably a secure LAN.

Part of the security provided by the system of the present invention resides in the separation of WEB and FTP server LAN 7 and database server LAN 9, and more particularly the requirement that data exchanged between LANs 7 and 9 pass through firewall server 4. In this way, the WEB and FTP server 6, which is accessible to the WAN 2, is not connected to database server 8, which stores the proprietary asset data. Reports that are generated in response to queries from a user are output from database server 8 to WEB and FTP server 6 for access by the user. Firewall server 4 prevents direct access by users coming into the system through communications server 3, to database server 8.

According to the present invention, users, such as the general public, are able to access a WEB page via HTTP that is maintained on the WEB and FTP server 6. That is, the firewall server 4 allows communications by query users to the WEB and FTP server 6 for requesting and receiving reports. Accordingly, a user name/password combination is required at the WEB server level. On the other hand, it is anticipated that administrator staff and data providers will have access for FTP sever functions and therefore will require user name/passwords at the firewall level in order to prevent unauthorized access to the services performed by this part of the system, i.e. access to the database server 8 or staging server 11.

Access to the database server 8 by the WEB and FTP server 6 is preferably through Oracle TNS and SQL net. The database server 8 preferably will run an operating system such as Microsoft's Windows NT operating system and the database management system by Oracle, for example. Netscape is a suitable WEB server and each of the server machines is of a type suitable for the application in view of frequency of use and performance required. The hardware of the system is easily upgradable in view of the architecture shown in FIG. 1 and a system monitor maintained at a data administrator workstation monitors and warns the system administrator when various components of the system are over utilized, when excessive paging occurs or when disk space is low. Further, each of the servers is of the type having multiple disk drives and running RAID type fault tolerant operations.

Firewall server 4 preferably runs on Check Point's Firewall-1 software on a Microsoft Windows NT operating system. Plural network cards are used in this machine to provide security for the Oracle database run on database server 8. Preferably, one network card will be connected to the communications server LAN 5, another to the WEB and FTP server LAN 7 and yet another to the database server LAN 9.

Although any suitable WEB server software can be used to host the system WEB site on server 6, preferably the WEB server 6 runs Microsoft Windows NT operating system and Netscape Enterprise server with live wire for the WEB services. Preferably also, the FTP service is run by Microsoft's Internet information server.

According to the architecture of the system shown in FIG. 1, the firewall server 4, WEB server 6 and database server 8, as well as communications server 3, can be maintained in a data center separately from or together with the development workstation 10 and development and staging server 11. A data administrator can gain access to the system through communications server 3, for example by the Internet or through a dedicated line to the communications server. Also, the data administrator can perform work on the workstation 10 and server 11 through direct connection to database server LAN 9, which preferably is not directly connected to the Internet for enhanced security. Further, although the staging server 11 is shown separated from the database server 8, its function is to store data that is to be processed before being entered into the database. Accordingly, the staging server function can be incorporated in another server, including the databse sever 8.

Although the architecture of the system shown in FIG. 1 includes separate LANs 7 and 9, this is the preferred arrangement for security purposes. However, the database server 8 and WEB server 6 could be connected directly to the firewall server 4 or connected to it through a single LAN.

Figure 2:
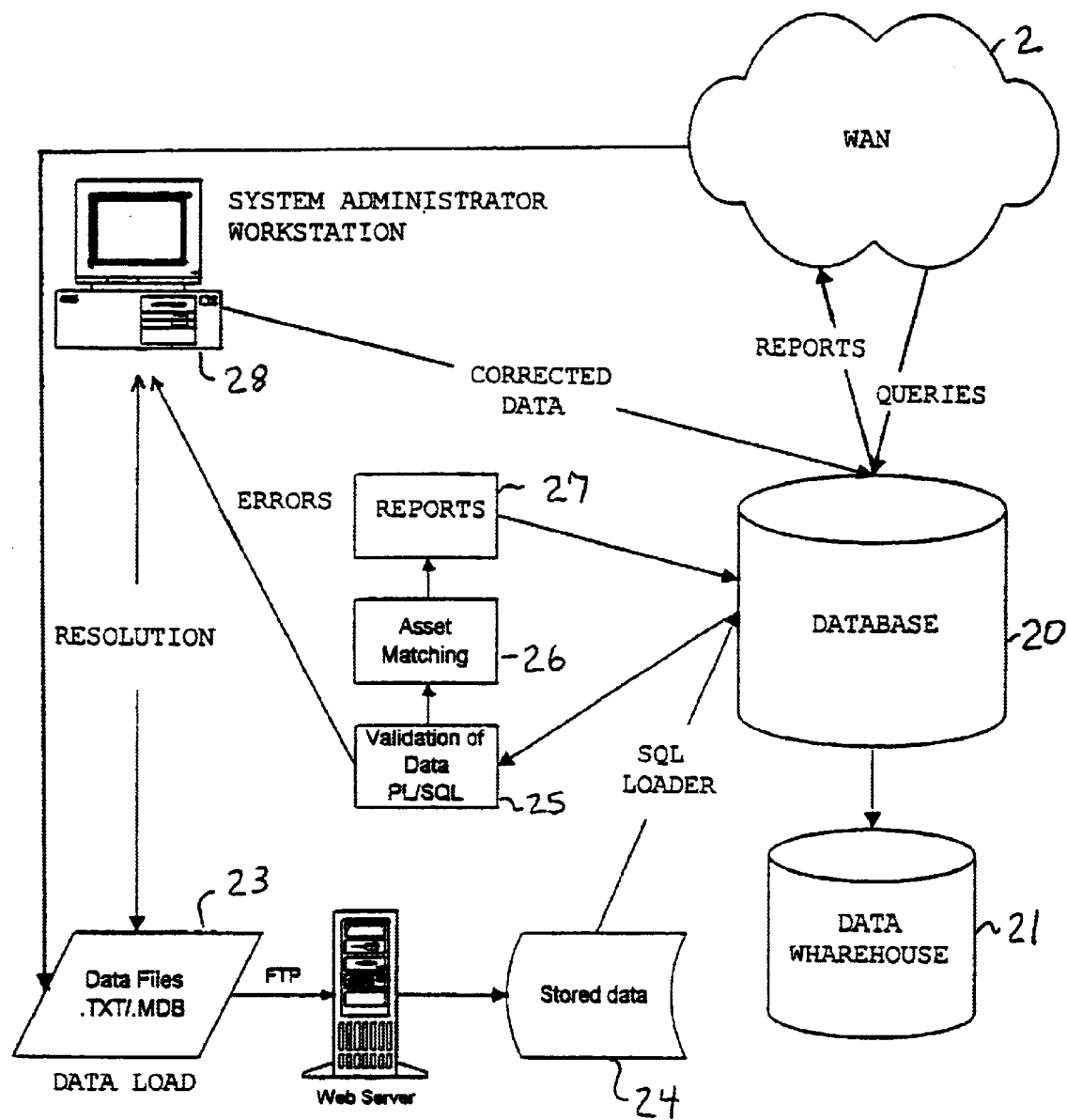
FIG. 2 shows an overview of the data flow in the system of FIG. 1.

FIG. 2 shows an overview of the data flow in the system shown in FIG. 1. Database server 8 of FIG. 1 is shown as a database 20 and a data warehouse 21, which are separate from each other. Database 20 is preferable an Oracle database and data warehouse 21 is preferably an OLAP MDBMS data warehouse.

When a user accesses the system through WAN 2 to query the database, either user-defined reports or pre-aggregated reports can be requested. Generally, pre-aggregated reports are stored in data warehouse 21, whereas user-defined reports are generated by processing of data stored in database 20.

Data is entered into the database system from a data administrator workstation 28 or by a data provider through WAN 2 as data files 23 in a data load process described in greater detail hereinafter. The system includes many workstations 1, although only one is shown. It is understood that an example of such a workstation is a personal or business computer supporting browser software and having Internet communications ability.

First, the data files are loaded into WEB server 6 as stored data 24 that is then loaded into database 20 using SQL loader software. The loading of stored data 24 from the WEB server 6 to the staging server 11 or database 20 of database server 8 is through firewall server 4, as shown in FIG. 1. Once data is stored in the staging server or database, it is subject to several processes, such as a validation of data process 25, an asset matching process 26 and a reporting process 27 that determines whether or not a requested report can be made available without violating the confidentiality rules. When the validation of data process 25 determines that an error is present in the data, the stored data having the error is forwarded to the data administrator workstation 28, and if correctable, is stored in database 20 as corrected data at a later time. If the data cannot be corrected, then the data administrator informs the data provider accordingly.

The data administrator hosts a WEB page on the WEB server 6 that is accessible to the public through the WAN 2, such as the Internet. Users of the system enter into the system for the purpose of providing data or for receiving a report according to a query process.

FIGS. 3–7 show a user interface for making a search query of the data stored in databases 20 and 21. The user interface is supported by browser software stored on the data provider/user workstation 1. First, a user name/password page is presented to the user before the multitab page shown in FIGS. 3–7 is accessed.

Figure 3:
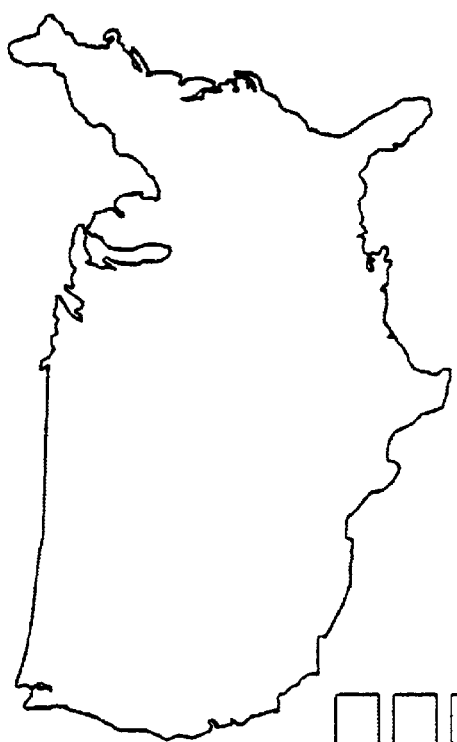
FIG. 3 shows a user interface for selecting geographic area or market information in a user query process.

In the pages shown in FIGS. 3–7, a query interface is presented from which custom queries can be requested. Custom queries are produced using an interactive structured query language (SQL) tool, however different tools may be used. FIG. 3 shows the WEB page enabling geographic area or market data to be entered. FIG. 4 shows the WEB page enabling property information to be entered. FIG. 5 shows a page enabling a time period for the report to be specified and FIG. 6 shows a page enabling financing information to be specified.

With the reports available from the system of the invention, information can be made available regarding risk, returns, and best practices in financing and managing real estate, for example in the multifamily housing industry. The system provides information, using computer driven network access, on the performance of multifamily housing assets (properties and loans) that balances the confidentiality requirements of participating firms with the ability to perform broad and useful analyses. The availability of this information in an environment in which the confidentiality risk of providing the information is minimized will satisfy a need not yet adequately met in the multifamily housing business.

Preferably, the database will contain data provided by members of the real estate industry, such as the multifamily housing industry, including property owners, property managers, lenders, and loan servicers. The following detailed description of the invention is related to the multifamily housing industry, but the invention is not limited thereto.

Subscribers or members of the system are assigned a log-in identifier that can be used to gain access to the system or administrator member services. The system will also support the assignment of an ID to non-members that will allow them to generate reports. It is expected that non-members will generally not be data providers. The data providers are responsible for submitting data to the system and therefore receive a unique log-in identifier that allows them to access read and write subdirectories used for data transfer. In the event that a data provider is a large organization, company or firm, individuals within the data provider organization will have IDs providing different levels of access to the system.

The system will be available to provide both on-line and custom reports that can be requested through the user query interface. Preferably, standard on-line reports generated by the system provide summary and detail income and expense data for a selected market, respectively, as shown in FIGS. 50 and 51. The reports also contain basic property information, including average number of units, vacancy rates, and effective market rents.

As opposed to custom query reports, pre-aggregated data requests are typically special tabulations from the computer database of the system that create electronic data files summarizing performance data. Pre-aggregated data requests allow a user to select static data that is grouped together in some fashion and joined with non-static data belonging to that group.

Example: Create a summary income and expense report (non-static data) for assets in the Northeast United States (static data). Group the assets by building type (garden, high-rise/mid-rise, townhouse).

Pre-aggregated data sets and reports are prepared from the data stored in database 20, and then stored in the data warehouse 21. Accordingly, the pre-aggregated reports are accessible in response to a query from a user.

The system also supports batch queries that are requested by a user. In response to such a request, a set of standard reports for predetermined queries at regular time intervals (quarterly, semi-annually, annually) are provided.

Example: Create detail income and expense reports each quarter for each of the regions in the United States where properties have less than 150 units and are not FHA insured. Create a second set of detail income and expense reports for each of the regions in the United States where properties have 150 units or more and are not FHA insured.

Requests for batch query processing are preferably automatically executed off-line at the time intervals specified. Script files define the selection criteria for batch reports.

Confidentiality Rules

Data providers supply highly confidential data to the system predicated on assurances that their data remains secure. Security features that are typical in the art are employed to ensure such confidentiality. Further, confidentiality rules, which control whether a report is output or not, based on the underlying asset information on which the report is based, are also used in generating the reports. These confidentiality rules are intended to prevent disclosure of asset level information in reports, or the discovery of such information by combining and decomposing statistics obtained through reports.

An example of one such confidentiality rule is the "5/3" confidentiality rule. In general, query results and reports from the system present only aggregate information. Asset level data can be determined from aggregate data if only one underlying asset is used to generate the report. Also, certain underlying asset information can be determined by deduction from an aggregate report if a requester is a data provider of one asset and the report is based on only a limited number of assets, particularly if there are only two assets, one of which is an asset with which the query requester has familiarity.

To prevent the disclosure or discovery of asset level data, therefore, aggregate results are returned only upon satisfaction of a confidentiality rule. The confidentiality rule is set by the system and has two conditions to be satisfied, mainly the data of the report must satisfy the following conditions: (1) The data must be based on a predetermined number of assets; and (2) The data must be based on a predetermined number of independent data providers.

For example, preferably an aggregate report is provided or output from the system to the query requester, only if the number of assets that support the data of the report are at least 5; and the number of independent data providers that are providing the data are at least 3. The number of assets and the number of independent data providers that are used in the confidentiality rule can be set according to agreement among the data providers. As a minimum, the number of assets and the number of independent data providers supplying the data should be at least three. This prevents a query from being designed for generating a report that provides data from which the underlying asset data can be determined. Further, because data on an asset may be supplied by more than one data provider, the basic confidentiality rule is refined to account for special conditions that can arise.

In performing the counting of the number of independent data providers, the "owner" of the data, not the data provider, is used as the indicator for making the determination. The owner is the provider determined to be "closest" to the data being supplied. A hierarchy for determining the owner of the data is set in a table, maintained by the system management computer. Further, both property information and loan information must separately meet the confidentiality rule, so the 5/3 rule example becomes a 5/3/3 rule, i.e. three independent data providers for the property information of the asset and three for the associated loan information. The following is an example that illustrates an application by the system of the confidentiality rule.

Example: A number of property owners supply data on their properties and their corresponding loans. However, Lender 1 also provides information on all of these assets. In this case, since Lender 1 is hierarchically determined to be the closest data provider to the loan information because Lender 1 "owns" all of the loan information, there is only a single data provider for the information about the loans for each asset, and the rule requiring that the second number of independent data providers be met for the loan information is not satisfied, i.e. the second "3" in the 5/3/3 rule is not met.

There are additional considerations that are met in implementing the confidentiality rule according to a preferred embodiment of the present invention. For example, results covering different points of time must meet the rule for all points of time that are reported. That is, calculations showing results from two or more different years require that the 5/3 rule be met in both the start year and the end year. Further, the system requires that each value in a report must be based on at least three data points (observations). If an element in a returned report is not based on at least three non-null values in the result set, this value is suppressed in the report.

An important actor in the multifamily housing industry is the Federal Housing Administration (FHA)/HUD, an insurer of loans and provider of subsidies. Much of the information about HUD's portfolio is in the public domain or is otherwise widely available. This affects confidentiality implementation in two important ways. First, any queries that request only HUD properties need only be based on a minimum of 5 assets and do not have to meet the test of three data providers. Second, for all other queries, HUD assets cannot be counted (because its data may be publicly available) toward the satisfaction of the requirement that there be three independent data providers (i.e., it becomes a 5/4 rule).

General Description of Data Content

Preferably, the system database 20 stores asset information in records made up of approximately 225 data elements related to properties, loans, and affordable housing information. FIG. 8 shows a table 50 of the basic data elements stored in the database. Some of this information is "static" and remains relatively constant over time, while other information is termed "dynamic" because the data values change with periodic updates to the database.

Static Data

Static data elements describe the permanent attributes of an asset, and changes in them usually indicate fundamental changes in the character of the asset. For example, the number of residential buildings on a property is a static data element and a change in this number would only be expected as a result of a substantial construction effort (except for corrections to errors in the original data). Such a change would clearly indicate that the basic character of a property had changed. Substantial changes to the character of an asset, such as a change in the number of buildings, means that information about the asset after the change is not comparable with information before the change. To handle this situation, an existing asset that undergoes substantial change is recorded in the database as being terminated. Because the asset derived from the original continues to exist, a corresponding new asset is created in the database, incorporating the new features of the asset with those that remain unchanged.

Dynamic Data

Dynamic data elements describe the attributes of an asset that are expected to change frequently; these will be updated through quarterly data submissions. For example, dynamic data includes operating information such as utility expenses and rental income for properties, the amount of the unpaid principal balance for loans, and the current interest rate on adjustable rate loans.

Within the system database, these data elements form a continuous history describing properties and loans over the period for which an asset is active. When an asset becomes inactive, its dynamic information will no longer be updated, though the historical information will be retained in the database so that it is available for the analysis of trends. Also, it is expected that some data providers may provide data whose values have been annualized. The data providers will provide an as-of date and the number of months covered by the data to determine the time period covered by the annualized data.

As shown in FIG. 8, table 50 of data elements includes control file information 51. This information includes header information, such as a data provider's unique text identifier, which is assigned by the system administrator; the effective month for the loan data contained in the file; the effective year for the loan data contained in the file; and the number of records contained in the file, for example. Further, control file information 51 can include text message for the data administrator along with the name and telephone number of the person who compiled the file being submitted, all as shown in detail in FIG. 53.

Loan static information 52 is also shown in FIG. 8. Details of the loan static information are shown in tables 52a and 52b in FIGS. 9 and 10, respectively.

The load dynamic information 53 shown in FIG. 8 also includes the following data elements: loan adjustable rate information 54, load prepayment information 55, foreclosure or workout information 56, all of which are shown in detail in table 53a shown in FIG. 11.

FIG. 8 also shows, property static information 57, property dynamic performance information 58, property valuation information 59, low-income housing tax credit information 60, target rent information 61 and affordable housing program information 62. The data elements included for each asset stored in the database are intended to comprise a comprehensive description of the asset. Additional data elements can be provided for each asset or some of the data elements as listed could be reduced, depending upon a specific design of the system implementation.

FIGS. 12–14 show tables 57a–c, respectively, which together comprise the property static information.

FIGS. 15 and 16 show tables 58a and 58b collectively showing the property dynamic performance information 58 indicated as being one of the data elements, according to FIG. 8. FIGS. 17 and 18 show the property valuation information 59 in table 59a and the low-income housing tax credit information 60, target rent information 61 and affordable housing program information 62 in table 62a.

The Data Elements Descriptions for the data elements contained in system database as partially shown in FIGS. 9–18, include the acceptable predefined options for fields that are multiple choice. The Data Elements Descriptions also contain the format verification and validation rules, if any, being used for the data element and the start position, field size, and formatting structure for each element.

FIGS. 53–64c show the details of the control file or header (FIG. 53) and also each of the 255 data elements that are categorized and grouped together under the appropriate headings as shown in FIG. 8. For each data element, as shown, the field name, field description, validation rule, field width and sample field format are shown. The data stored for each asset is a combination of all of the data elements shown in FIGS. 54–64c plus the control file shown in FIG. 53. It is understood that a data provider works with a predefined data base to enter the data into each of the fields of the data elements by prompting, using a web page format for example. The data elements are sequential, so the starting point for each data element can be determined by adding the fixed field widths together.

Although the foregoing explanation of the data to be maintained in the computer database of the system has been focussed on financial information for real estate properties, additonal data can also be maintained. Supplemental data in this regard includes the affordable housing information shown in Table 62a in FIG. 18, participation in FHA and non-FHA programs, and project-based tenant rent subsidies, the number of units under contract and the levels of contract rent by unit bedroom count.

The system database also maintains various supplemental data tables to support certain query requirements and administrative functions. Preferably, data tables are maintained for counties and metropolitan areas that contain geographic, population, and descriptive economic information related to these areas. User control and administrative information is also maintained. This information is used to grant access privileges and to maintain the information needed for auditing user activities and for performing various administrative functions, such as generating bills for use of the system. This information can be maintained by the data administrator and does not need to be supplied by data providers.

It is possible that several data providers may provide data on the same asset. For example, a property owner and a lender may both provide data on a property and the loans that it secures. A hierarchy of data providers is used to select data elements that are provided by the source "closest" to the data. A hierarchy for determining the owner of the data is set and maintained by the system management computer in the manner shown by the following example.

For property data, an owner is considered closer to the data than a lender; a manager is considered closer to the data than an owner. For loan data, a lender is considered closer to the data than an owner; a servicer is considered closer to the data than a lender.

As a result of this data selection process, it is expected that most assets in the database will be a composite of data elements from different providers. This will also provide a way to "fill-in" data that has not been supplied by the data provider closest to the asset.

To determine if data of an asset that is already stored is being provided, the data of the asset being submitted is matched with the asset data already stored in the database 20. The logic for asset matching is achieved by following a succession of rules, to be explained in greater detail hereinafter. Generally, fields are compared and assets joined on the basis of matching fields. The main fields to be used for this process are zip code, city, state, street address, number of units, number of stories, and FHA number. An asset match is determined by comparing the number of matches in the fields of the assets to a threshold number. If a number of matches occurs, but it is below the threshold number, the determination must be made manually.

The system of the present invention permits users and the data administrator to perform the following processes.

Administrative Processes.

An online application that allows data administrator personnel to maintain validation and asset matching rules, monitor and execute certain data load processes, and maintain user information.

Reporting Process.

In response to template queries, a user can create search criteria for two types of reports: Trend Analysis and Geographic Comparisons.

Data Load Process

The data load process verifies and loads the property and loan data provided by the data providers. Preferably, this process is completed only periodically, for example once per quarter.

The data load process is composed of the following processes.

Receive data files. This process uses manual and automated processes to receive data files from the data providers.

Load data. This process uses Oracle's SQL*Loader product to load the submitted header and data files into the database.

Validate data. This process applies validation rules against the submitted data and saves the resulting validation errors. The validation rules may be modified automatically or manually using administration tools.

Review Errors. This process allows the manual editing, approving and rejecting of submissions and assets that fail the data validation tests.

Match assets. Preferably, this is a user-guided process that identifies multiple data submissions for the same asset from different providers. The process creates a single composite record for each matched asset.

Migrate data.

This process is preferably executed once per quarter to make validated data available to the WEB-based reporting application.

The data load process involves the step-by-step migration of data through several sets of database tables. A naming convention distinguishes the tables that are used in each sub-process. Table 70 shown in FIG. 19 shows the key tables used by the data load process.

Receive Data Files

The first step in the Data Load Process is to receive data files from the data providers. Preferably, data is collected from data providers on a quarterly basis. The data providers can submit files manually via diskette or email to the system administrator and preferably directly via FTP (i.e., file transfer protocol) to the WEB and FTP server 6. Each data provider has an "incoming" FTP directory, explained in greater detail hereinafter, where transmitted files are placed. The submitted files are provided in a pre-defined fixed-width text file format or in a pre-defined Microsoft (MS) Access database file. Files may also be compressed and encrypted.

The Data Provider's File

It is an objective of the present invention to reduce the burden of submitting data by using a file format and file submission system that increases the ease of electronic data submission. Preferably, each provider receives a predefined Microsoft Access database that runs on the data provider workstation (interface) 1 for compiling the data. The database also contains export specifications that can be used to create the preferred format for the fixed-width text file for loading the information into the database system.

Data File Layout

Specifically, the electronic file that is submitted is preferably a fixed-width text file that can be automatically processed by the system. In addition, a header file that is submitted with each data file automates processing of the data submission. A database, such as Microsoft Access database, is preferably used by the data provider at the workstation 1 to compile the data to be submitted. The database can contain the system table for compiling the submission data. A second table will be included for the header file information that is submitted with the data file. The Access database may be transmitted to the system directly, or the data providers may use the export specification file contained within the database to export the submission data and control file into a fixed-width text file format for transmission to the system.

Header File

The standard text file format requires that each quarterly submission must include two files: one header (or control) file and one data file. All submission files are named using the following convention, for example:

Provider ID+YYYY+MM+encryption designator+file designator+submission number+extension.

With reference to FIG. 20, the provider IDs are assigned to be 12 characters or fewer. The YYYYMM should be the effective year and month of the submission. The encryption designator will be either "E" for encrypted or "U" for unencrypted. The file designator will be "H" for header, "D" for detail, or "A" for MS Access. The submission number will be a sequential counter corresponding to the number of times the data provider has submitted this file. The first file will be labeled "1." The extension will be either "txt" or "mdb" for text and MS Access submissions, respectively. A period will separate the file name and the extension. The redundancy in this naming convention is intentional. Data providers using an operating system without long file name support will use their FTP client to create the correct name on the system FTP Server.

Example: AJACKSON first runs the C program (discussed below) to make sure the submission is in the correct format. Then, he optionally encrypts the file. The data provider ID for John Smith Management Company is "SMITHMGMT." Assuming he has a pair of unencrypted header and detail files for his first submission effective 12/99, he will name them

SMITHMGMT199912UH1.TXT

SMITHMGMT199912UD1.TXT

Ensuring Correct Format: File Verification

The FTP directories are checked for new submissions. When a new submission is detected, a copy is made of the file from the FTP server to the database server. If necessary, The system will unencrypt the file. A file verification utility program (C program) is executed that performs very basic format checks on the data.

Examples of the format checks include scanning for correct record length, the presence of carriage returns in the file, and the presence of both a header and a detail file. The C program does not perform data validation checks since this utility functions for the purpose of ensuring that the system can load the data successfully. (The program recognizes that UNIX files and PC files use different row terminators.) The system administrator distributes the C source code and Intel binaries for this program to the data providers. The data providers must run this program and correct any errors it identifies before submitting a file. This program ensures that SQL*Loader can load the data into a table of the same configuration as the input file, with all columns allowing nulls.

Data Receipt Notification

Once the file verification program runs, The system will send an email note to the point of contact (POC) listed in the header file, and it will send an email note to the POC named in the DATA_PROVIDER table, if they are not the same. The note will detail the following:

Date and time of the submission

Status (success or failure) of the C program

Error messages from the program, if any.

Other users authorized by the data provider, with approval from administrator, may request that the system notify them when it has received a file.

File Archiving

After processing a file, The system will copy it into a subdirectory belonging to a data provider's root directory. These subdirectories will be named by quarter, for example, 99QTR4. They will be read-only for the data provider. The system will rename the files as it copies them to preserve version information, such as HEADER1.DAT, DETAIL1.DAT, etc. By looking at these directories, providers and administrator staff can see a complete history of previously submitted files. All data will be loaded via SQL*Loader into the SUBMISSION and INPUT_FILE tables in the database.

Before processing a file, the system will copy files to the staging database server. The database server will have a node with directories named for the data providers, and subdirectories named by effective year and month, for example, 199912. An administrator staff member will be able to read these files, but data providers will have no access to them. To the extent allowed by disk space, these files are always present on the database server. If storage constraints demand that old files be removed, they can be archived on digital linear tapes or other media.

More specifically, submission files that have been placed in the submission directories are backed up. Submission files are moved from the provider's incoming ftp directory in the WEB and FTP server 6 to the "_fakeftpdir" directory. The files are also copied to the provider's backup directory "Backup_ftp" and then removed from their original location (to prevent reloading). In order to receive data from a new data provider, the copying.bat file needs to be updated manually.

Figure 21:
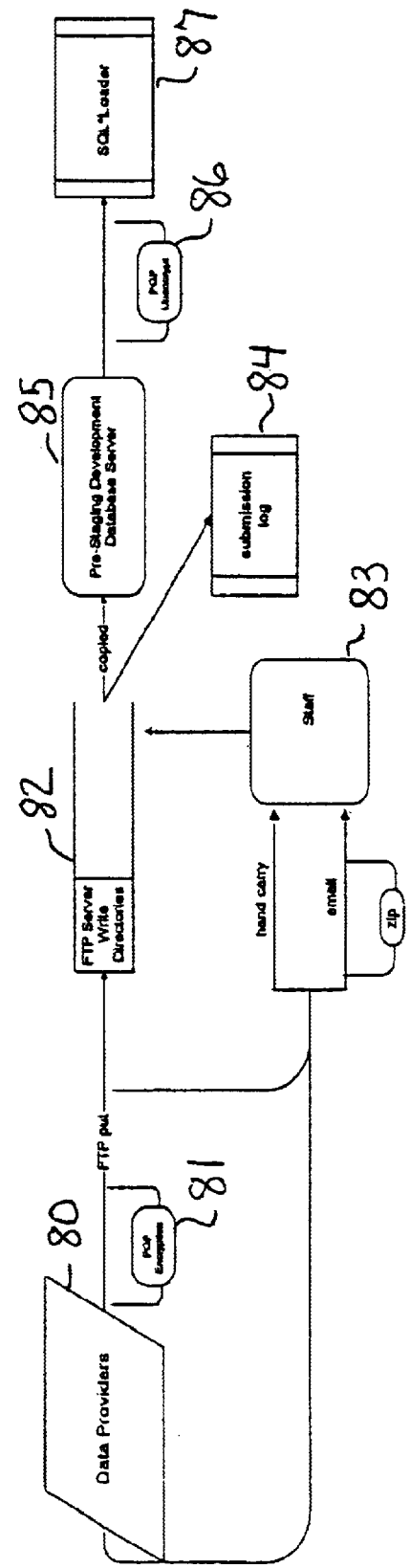
FIG. 21 is a data flow diagram showing data submission of data provided by data providers according to the present invention.

FIG. 21 shows a data flow diagram of the data submission process. As shown, data of data providers 80 is written to write directories 82 of the FTP server 6 after being optionally un-encrypted by encryption module 81. This presumes, however, that the data 80 is in the standard text file format for FTP transmission. In this case, the FTP files can be written directly to server 6 using the data provider/user workstation 1. On the other hand, if the data is not in the standard format, then it is submitted to the data administrator 83 by hand or e-mail, for example, which is then processed into standard format and written into the FTP server write directories 82. Upon completion of the writing of the data 80 to the FTP server write directories 82, a submission log entry is made in submission log 84 and the data is copied into pre-staging development database server 85, which can be part of the development and staging server 11 shown in FIG. 1 or part of the database server 8. At this time, if the data has been encrypted in encryption module 81, it is un-encrypted in un-encryption module 86 and moved to the SQL loader 87. The call flow and tables used during this data load process are shown in FIG. 22.

As explained with reference to the Procedures and Tables shown in FIG. 22, a batch process called loading.bat is launched periodically, every hour for example, to load and validate the files that were submitted in the previous hour. The loading and validation processes are performed for one data submission file at a time until all of the files submitted in the previous hour are processed. The flow of the loading.bat process is shown in FIG. 22 beginning with the execution of the load_data.exe command which sets forth the execution of the steps of pgld_loadata_pkg through prld_ins_aptdata_input.

Specifically, the loading process uses the Oracle SQL*Loader utility to insert all of the records in a submission data file into the ld_1submission table in the Oracle database. This table holds the records for one submission data file at a time. The table is emptied before data for each new submission is loaded.

The SQL*Loader process is controlled by a file called APTDATA.ctl (not shown). This file contains the specifications that match each field in the input file with the corresponding column in the database table.

During the loading process, blank fields in the submission data file are changed to a NULL value, and date fields in "YYYYMMDD" string format are converted to Oracle's DATE format. The load process records load statistics in a file that has the same name as the input data file with a ".log" extension. Errors are recorded in files that have the same name as the input data file with ".bad" and ".dis" extensions.

Once the data file for a submission is loaded, header file information is inserted into the ld_submission table. A unique, sequential submission_id is generated and used to identify each data submission in the table. The status_flag column in the table is set to the value 'L'. The provider_name field in the table is set equal to the company_name field in the WEB_company table for the same provider_id as the one provided in the submission header file.

The last step in the data load process, is to copy the submission data from the ld_1submission table to the ld_APTDATA_input table. At this stage, each record in the latter table is assigned a unique, sequential record_id. The new submission data is appended to the ld_APTDATA_input table.

Data provided by the Department of Housing and Urban Development (HUD) is preferably processed somewhat differently. HUD provides an additional file, called the HUD-Only file, which contains financial attributes provided only by HUD. A manual procedure is required to load this file.

Data Provider Accounts

A separate FTP account is established for each individual of an organization who is authorized to submit data for a data provider. On the WEB server 6, there are two separate directories for each data provider. There is a write-only directory 82 (FIG. 21) for submitting data and a read-only directory 97 (FIG. 23) for retrieving other files, such as error reports. Security requirements limit access by each provider to their specific directories for sending and retrieving files. The data provider account is preferably configured under Windows NT with no list privileges to prevent data providers from viewing or accessing other directories.

Example: Suppose John Smith Management Company authorizes a user named Andrew Jackson, with a user ID of AJACKSON, to submit and retrieve the company's data. When AJACKSON connects to the WEB server 6, he will be in "Smith Mgmt Write." He can set his transfer type (ASCII or binary, as appropriate) and immediately transfer the files to the write-only directory 82. If he wishes to retrieve a file, he must execute the following command:

CD "Smith Mgmt Read"

The home FTP directory for each user is the write directory 82 for the associated data provider. Directories will be named using the COMPANY_NAME column in the COMPANY table of the database, suffixed with the word "Read" or "Write." These directories are created as subdirectories under the \InetPub\FTProot\Data Provider\ directory. For each directory, a virtual directory will be created and named COMPANY_NAME+suffix. Accordingly, on the WEB server 6, user Andrew would find two directories:

\InetPub\FTProot\Data Provider\Smith Mgmt Read\

\InetPub\FTProot\Data Provider\Smith Mgmt Write\

There would be two virtual directories for these physical directories:

Smith Mgmt Read

Smith Mgmt Write

Ensuring Data Integrity

To help ensure the integrity of the data being provided, the system will run a series of validation checks on the data. This validation procedure evaluates and refines the data.

Figure 23:
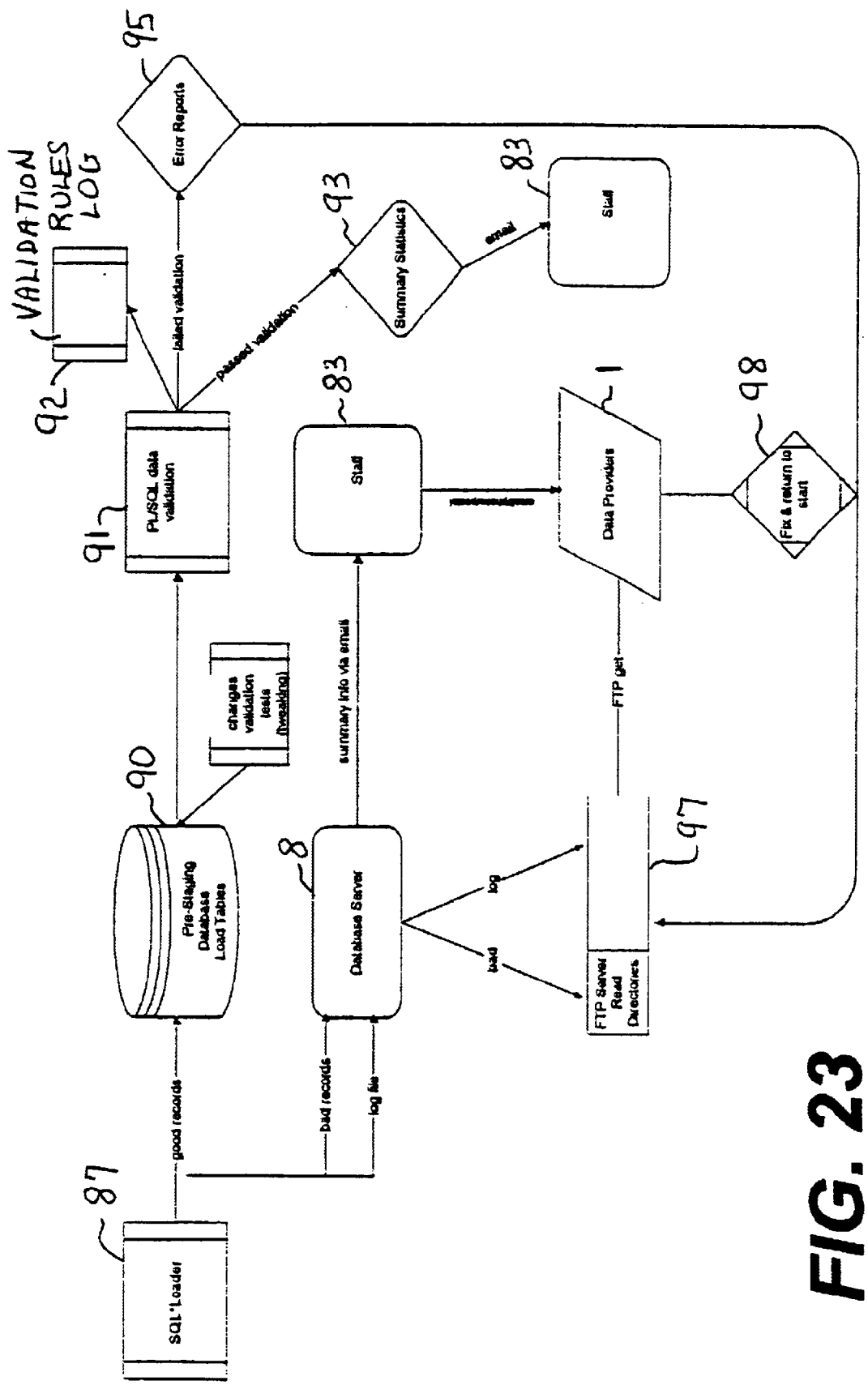
FIG. 23 is a data flow diagram showing data validation of data provided by data providers according to the present invention.

FIG. 23 shows the data flow of the data validation process. Data from the SQL loader 87 comprises good records and bad records. The good records are stored in the pre-staging database load tables 90 from which the data is checked in the data validation process by the PL/SQL data validation module 91. Validation of the data is according to certain pre-defined rules.

After a data provider file has been loaded into the pre-staging database 90, data validation program 91 is run to generate validation report 93 for optional manual review by the system administrator 83. The data validation executed validation rules from a validation rules log 92 to make element-level checks, input-record-level checks, substantial changes to static data checks and to make checks for duplicate record detection and new record detection. Parameters for data validation are examined for their ability to detect erroneous data.

A complete list of the data validation tests that will be run against the data are shown in FIGS. 25–40 and further include checking whether the header file format is entered correctly. The validation check suppresses recurring validation error messages for exceptional values that have been verified as correct without limiting the information available for other values.

Data Validation Processing

After the system has successfully loaded a data provider's file into the INPUT_FILE table, the validation process continues. As SQL*Loader loads a file, Oracle may generate errors. After SQL*Loader is finished, PL/SQL procedures validate all data.

Single-Row Validation Tests

The first set of validation tests will be run on each record submitted. These tests compare the values submitted against a set of "validation rules" that identify a range of acceptable values. If the values submitted are outside the parameters identified by the validation rule, an error will be recorded. An example of the validation rule application is as follows.

Example: Number of units must be between 5 and 10,000

Elevator flag must be Y, N, U, or null

If loan adjustable rate information is populated, interest rate code must be "A" (adjustable rate)

Changes to Static Data

In addition to applying the submitted data against the set of validation rules, each record will also be compared against its previous submission. If any values for static data elements are different than the values previously submitted, an error will be recorded. Manual confirmation of each change to static data elements with the data provider is preferred before the record is loaded into the database.

Missing Loan Test

There will be several multirow validation tests. The only one being used initially is the missing loan test, which covers closed loans. When a loan closes, it is preferred that a data provider submit data for the loan, one last time, in the first quarter after the close of the loan. This record provides a loan closeure date and loan termination code. When a provider fails to submit data for a loan without providing such a closeout record, a loan is "missing." The system will record all missing loans as errors for review. Conversely, when a loan that was closed is resubmitted as being active, an error is generated. Continuing to submit the same close-out record for multiple quarters after a loan is closed is not an error.

Validation Reports for Data Providers

The system will email a summary of errors to the data provider and system administrator. This summary will give only a text description of the validation rule and the number of records that failed to meet the test. This summary information will not violate the confidentially of the data.

This validation information will also be available via the WEB. Since the WEB server uses HTTPS to encrypt information, the data providers will be able to see the detail (individual rows) for each error. Data providers will have to log on to the WEB server to see errors and will be limited to viewing only errors for the data they have submitted. The system administrator staff will have access to all data exceptions reports for all data providers.

Validation Rules

Data validation is performed as part of loading.bat immediately after a submission file is loaded into the database and before the next submission file is processed. Data validations are performed by executing a series of predefined SQL statements that represent validation rules. For each statement, the application logs the number of records that fail to meet each validation criteria.

Before executing the validation rules, every asset data record for the current submission_id is copied into the val_APTDATA_input table. Validation rules are executed against the data in this table. The following validation rules are performed in sequence:

Domain rules (validate_chardomain). Ensure that a string value in a field is a valid value for the field. For example, domain rules check that the workout_facility field has either a 'Y', 'N', or 'U'.

Formula rules (validate_formula). Ensure that calculated field values are correct. For example, formula rules check that the debt_service field equals interest_paid_amt plus principal_paid_amt.

If-then test rules (validate_itthentest). Ensure that if data for one field meets a condition, then another related field meets another condition. For example, if no_stories>6, then elevator_flag='Y'.

Range rules (validate_range). Ensure that a field value falls within a specified value range. For example, initial_construction_yr is between 1850 and the current year.

Foreign key rules (validate_foreignkey). Ensure that a field value matches a list of valid values in a lookup table. For example, foreign key rules make sure that the submitted zip code matches a valid zip code in the zip table.

Custom rules (validate_custom). Enforce custom rules that do not fit in any other category.

The number of records in a submission that do not pass a particular validation rule are counted and recorded in the val_validation_error table. A record is inserted in this table for each erroneous value found in the tested field. The error record contains a count of the number of records in the data submission that contain the erroneous value.

For example, if there are five records in a submission that contain the value 'W' in the workout_facility field, and two records that contain the value 'G', then the val_validation_error table will have two error records, one with a count of five for the 'W' value and one with a count of two for the 'G' value. The error record also contains the submission_id, a code identifying the type of test performed (val_type) and a number identifying the validation rule (val_number).

Once the validation rules are performed, static data in the submission is tested to see if the submitted values are different from the values previously stored in the database. Static data are asset attributes that do not normally change from submission to submission (for example, a property's address). Two additional procedures are executed to verify static data:

Static property rules (validate_static_property). Determines whether any static property information has changed from the last submission.

Static loan rules (validate_static_loan). Determines whether any static loan information has changed from the last submission.

The static data values for each asset in a submission are compared to the last accepted values for that asset, which are stored in the "before matching" tables: bm_property and bm_loan. Any differences are logged in the val_static_error table. For each changed static data column, this table contains the current value copied from the corresponding "before match" table and the value copied from the val_APTDATA_input table.

The validation process works by executing several predefined stored procedures. These stored procedures contain static SQL statements that execute the individual validation rules and log the results. The validation rules can be changed using an administrative interface, in which case the validation stored procedures need to be regenerated.

Data Cleansing

The data administrator reviews data exceptions reports from submissions that do not pass validation tests. From this, the scope of errors and the possibility that systematic problems exist within the process of data file creation are determined. The system administrator staff notifies data providers of errors, and provides a complete errors report. This error report is also available on-line in the data provider's read-only directory. After review of the report, the data provider and administrator determine the best way to correct any data discrepancies.

Review Errors

After the validation rules are executed against one or more submissions, the data validation errors can be reviewed manually by the administrator staff using a browser interface. The browser interface allows clean up of data records so that they can be accepted and moved on to the asset matching process. During error review, the administrator can edit data directly to correct errors, choose to accept records even if they fail one or more validation checks, or reject records that have failed validation checks.

FIGS. 25–37 show the validation rules that are performed in the SQL statements set forth in FIG. 24. The validation rules are performed on load static information as set forth in tables 250a and 250b in FIGS. 25 and 26. The validation rules for loan dynamic information are set forth in table 270 as shown in FIG. 27. The load adjustable rate information validation rules are set forth in table 280 in FIG. 28 and the loan prepayment information validation rules are set forth in table 290 shown in FIG. 29. In table 300 in FIG. 30, the foreclosure or workout information validation rules are set forth.

The property static information validation rules are set forth in tables 310a, 310b and 310c, respectively shown in FIGS. 31, 32 and 33. The validation rules for the property dynamic information are set forth in tables 340a, 340b and 340c, respectively shown in FIGS. 34, 35 and 36.

Tables 370 and 380 describe the validation rules for the target rent information and affordable housing program information, respectively, as shown in FIGS. 37 and 38. FIGS. 39 and 40 show the validation rules for the property valuation information in table 390 and the validation rules for the low income housing tax credit information in table 400, respectively.

Figure 41:
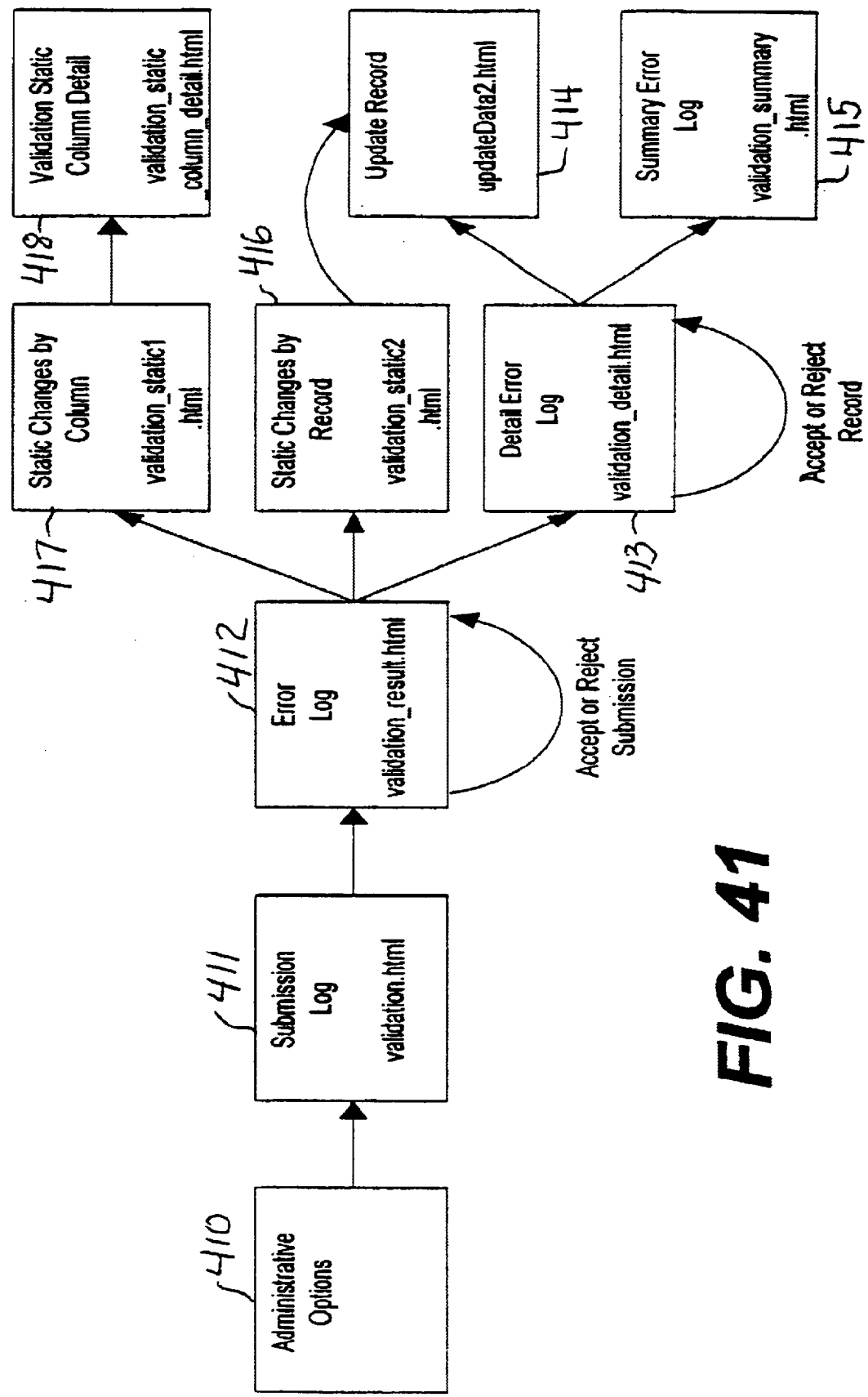
FIG. 41 is flow diagram showing the process of error review of data provided by data providers.

FIG. 41 shows a flowchart of the procedure of reviewing errors. First, in a step 410, administrative options are selected. These options are presented to a system administrator staff member who accesses the system as beforementioned, preferably through the host web site.

The first HTML page used for error review is the Submission Log page (validation.html) 411, which displays all of the current submissions in the system. The page combines all of the current submissions in the ld_submission table with the total number of validation errors recorded in the val_validation_error table. The combination of these two tables gives the data administrator a summary view of the potential number of errors in the database on a per submission basis. For each submission, the data administrator can see on the screen the provider information and the total number of validation errors found for the submission.

In order to learn more details about the particular errors in a submission, each submission shown in the table has a link to the Error Log page (validation_result.html) 412. If a submission has not yet been accepted or rejected, then the Error Log will display a summary of all validation rules that failed for this particular submission. All of the validation errors recorded in the val_validation_error table are displayed to the user, along with the rule itself. On the Error Log page 413, the data administrator can accept or reject the entire submission (which updates the status_flag for the submission in the ld_submission table). Alternatively, the data administrator can click on a rule to view the particular records that failed the validation test.

If the data administrator tries to use the Error Log page to view a submission that has already been accepted, then this page simply confirms that the submission has been accepted. The administrator cannot change the status of the submission once it is accepted or rejected.

When the data administrator clicks on a validation rule, the application opens the Detail Error Log page (validation_detail.html) 413. The Detail Error Log page displays all asset data records in a particular submission that failed the validation test. The page allows the data administrator to accept or reject individual records in the submission, suspend a validation check for a submission, or reverse a suspended validation check.

When the Detail Error Log page is loaded, the val_APTDATA_input table is first searched to find all records that do not pass the current validation check. In order to show only those records that have not been marked as accepted already, the bm_property table is used to filter out previously accepted records. The val_error_detail table may also be used to identify records in the current submission that have been previously marked as rejected. The data administrator can choose not to view these records.

The data administrator can accept or reject one or more records on the Detail Error Log page by selecting a radio button next to each property and clicking on A Save Changes button, for example. When this happens, a record is inserted into the val_error_detail table to record the appropriate change to the accept_or_reject_flag ('A' or 'R'). Each record shown on this page contains a link to the Insert Table page (updateData2.html) 414. The Insert Table page allows the data administrator to edit the fields in a submission record directly. Any such editing results in an entry in the Summary Error Log (validation_summary.html) 415, The result of the validation checking may also result in static changes being made by record 416) or static hanges made by column (417), after which the entriy is entered in a validation static column detail page 418.

Major Revisions

In the case of overwhelming data errors or numerous systematic problems, the data provider is notified to recreate the data file and resubmit the data. In this instance, the validation process would start over.

Minor Revisions

The system is intended to be user friendly for data providers. If smaller revisions to the data are needed, the data provider and the administrator staff member may agree that the administrator staff member will manually adjust the data. The data provider then makes any changes necessary to the source data for future submission, and the administrator staff member keeps a detailed log of all conversations with data providers to verify, update, or correct information in the database, including a record of the erroneous data and the corrected data. Administrator staff will manually adjust data through a WEB interface that will track all changes made to the data and provide a log of who made the changes and when. Written confirmation of these changes will be forwarded to the data provider. Changes are made to data elements in the system with the verification and acceptance of the data provider. If the data provider is unable to resolve the issue, administrator may determine the data is insufficient to include in the database. The deletion of this record would also be included in the detailed record of data changes.

Asset Matching

Figure 42:
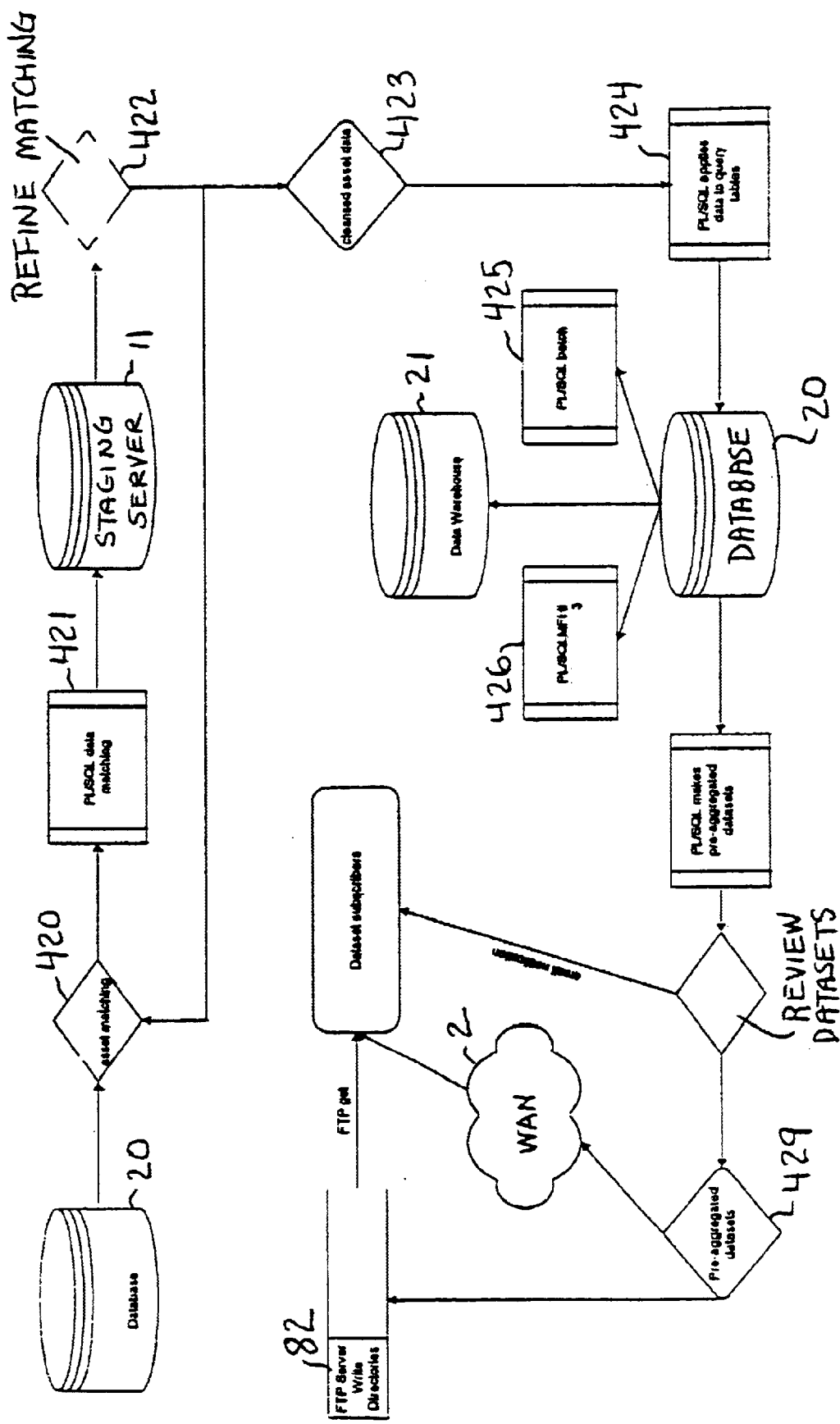
FIG. 42 is a data flow diagram showing asset matching of data provided by data providers with data already stored in the database according to the present invention.

FIG. 42 shows the data flow and performance of the steps followed in the asset matching process. As part of the asset matching process, the data records, which have already been subjected to validation checking, are stored in the development database 11. The system administrator triggers asset matching in step 420, which results in the asset matching being performed in PL/SQL data matching step 421. After the asset matching is performed, the data is again stored in the staging data base 11. The system administrator checks the data stored in staging database 11 in step 422 for reviewing and refining the asset matching that has been performed. Following this step, the asset matching is performed again by returning to step 420, or if needed, otherwise the asset data is cleansed by the system administrator in step 423 and the flow passes to a step of applying the data to query tables in step 424. Then, the data is stored in the production database 20 as validated, and asset matched data. From this data, PL/SQL batch queries following the confidentiality rules are processed in step 425 and reviewed by the system administrator and also PL/SQL data administrator indices are determined in step 426 followed by review of the system administrator. After these indices and queries steps are completed, pre-aggregated reports are stored in data warehouse 21.

Also, data stored in the production database 20 is processed in step 427 using PL/SQL to make pre-aggregated data sets in which the confidentiality rules enforced (step 427). The system administrator reviews the data sets in step 428 and the pre-aggregated data sets 429 are written to the data set subscribers write directories 82 in the FTP server 6 so that data set subscribers can retrieve the pre-aggregated data sets through FTP. Alternatively, the pre-aggregated data sets 429 are made available over the WEB 2 to the data set subscribers, which also receive an e-mail notification.

In detail, the asset matching process is composed of three distinct sub-processes: Before Matching, Matching, and After Matching.

The purpose of the Before Matching process is to merge newly submitted property and loan data with pre-existing property and loan data. Before this stage, a single record contained all of the data fields for the asset. The Before Matching process splits the single asset record into four separate records: property static, property dynamic, loan static and loan dynamic data.

Figure 43:
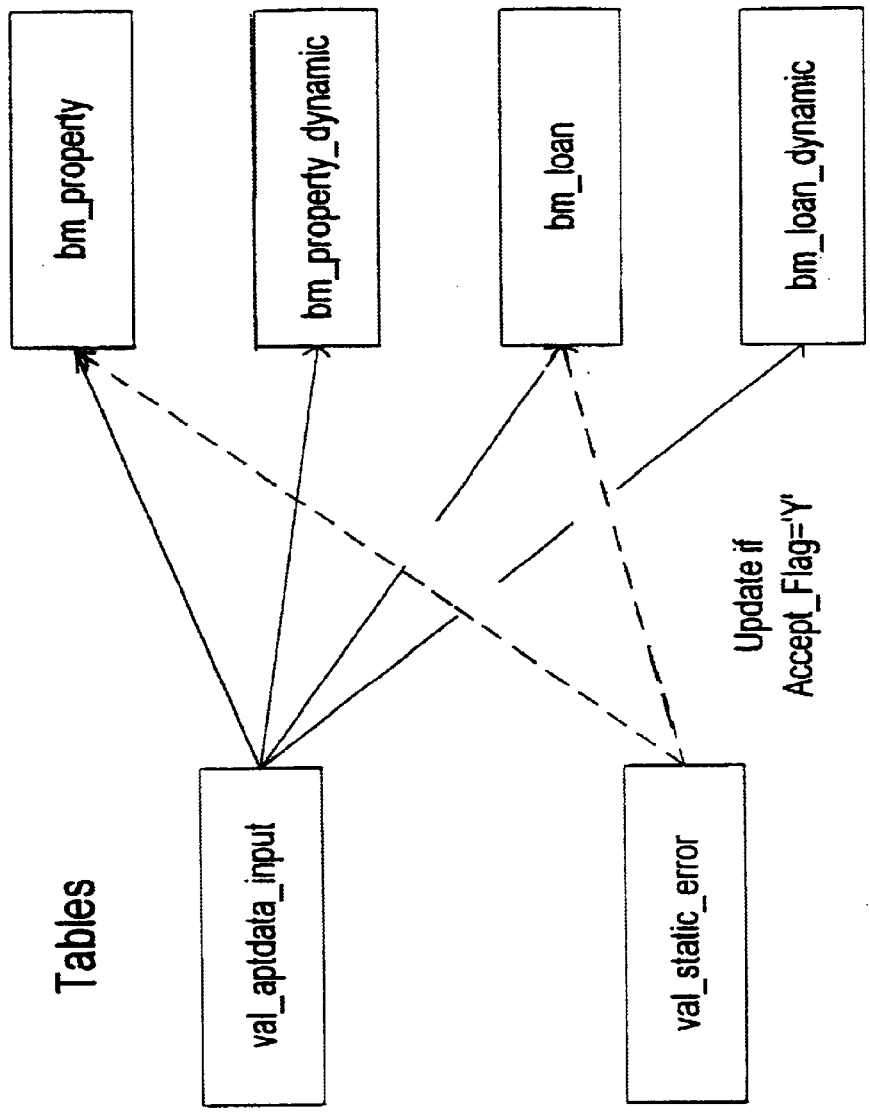
FIG. 43 is a diagram of the call flow and corresponding tables used in the before matching sub-process as part of the asset matching process.

With reference to FIG. 43, which shows the Procedures and Tables and for each new data submission, a stored procedure called prbm_update is launched automatically or manually by the system administrator to perform this merge, which includes the steps shown from prbm_update_property through prbm_update_loan_dynamic, followed by prbm_calculated_columns. If there are any new properties in the submission, then their static fields are inserted into the bm_property table. The val_static_error table is then searched to find any updates to existing static property information. If the data administrator had reviewed and accepted a change to a static field during the Review Errors process, then an update will be made to the existing record in the bm_property table.

After the static property data has been updated, all of the dynamic property data records for the submission that have not been rejected are copied from val_APTDATA_input to bm_property_dynamic.

After the property data has been merged into the before matching tables, loan data is merged in a similar manner. If there are any new loans in the submission, then their static information is inserted into the bm_loan table. The val_static_error table is then searched to find any updates to existing static loan information. If the data administrator has reviewed and accepted a change to a static field during the Review Errors process, then an update will be made to the existing record in the bm_loan table.

After the static loan data has been updated, all of the dynamic loan data that was not rejected is copied from val_APTDATA_input to bm_loan_dynamic.

A separate stored procedure, prbm_calculated_columns, must then be manually executed to complete the Before Matching process. This procedure computes certain calculated values (for example, total revenue) for each asset and updates these values in the bm_property_dynamic table.

Matching

The Matching process involves running several procedures that identify data submissions for the same asset from different providers. Each procedure, called an iteration, uses one or more matching criteria to determine the likelihood that a group of two or more records are really for the same property. For example, an iteration may check whether the property names and addresses for two or more asset records are similar. The data administrator can accept or reject a proposed set of asset matches via a WEB browser.

Figure 44:
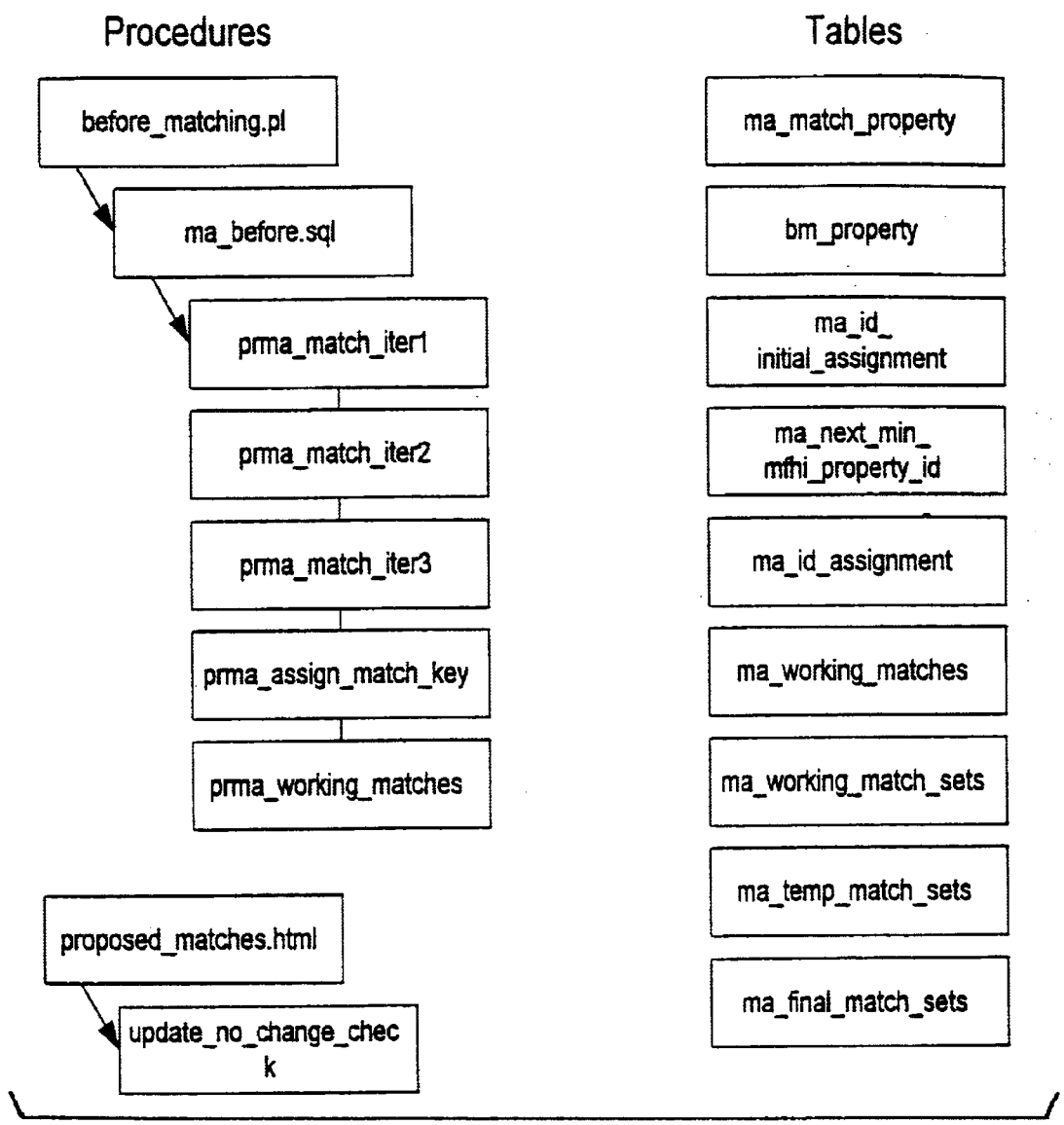
FIG. 44 is a diagram of the call flow and corresponding tables used in the matching sub-process as part of the asset matching process.

As shown in FIG. 44, to start the matching process, a perl script called before_matching.sql is executed manually or automatically by the system administrator. This perl script uses the tables ma_match_property through ma_final_match_sets in connection with executing a group of stored procedures (ma_before.pl) that perform the asset comparisons. Three stored procedures (prma_match_iter1, prma_match_iter2, and prma_match_iter3) execute different match criteria against the bm_property table. Assets that meet the matching criteria in these three iterations are grouped together as possible asset matches.

For each possible match combination found, a record is inserted into the ma_match_property table. The prma_assign_match_key procedure, which runs after the three iterations above, assigns every potential match combination a match_key number, which groups the matching records.

After each potential match combination is identified, the prma_working_matches procedure inserts a single record into the ma_working_match_sets table for every proposed match group. The mifhi_property_id for each property in a proposed matching group is associated with the match_key in the ma_working_match_sets table.

The matching procedures contain static SQL statements to perform the comparisons. These procedures would need to be regenerated when the data administrator changes the iteration rules in the administrative interface.

Once the matching procedures are executed, the data administrator uses an administrative interface (at the web site) to accept or reject the proposed matching groups.

At the web site, a first HTML page that is can be used for asset matching is a Search Proposed Matches page (asset_matching_search.html). The data administrator can select which column he or she wishes to use to filter the set of proposed matches. Typically, each of the three iteration numbers is used as a filter. The Proposed Matches page (proposed_matches.html) then displays summary information for each set of properties that have been identified as potential matches. The data administrator can accept or reject one or more matched sets of assets on the Proposed Matches page by selecting the appropriate radio button next to each set of proposed matches and clicking on a Save Changes button, for example. When a proposed match is accepted or rejected, the corresponding accept_or_reject_ flag ('A' or 'R') is updated in the ma_working_matches table. After all of the proposed matches have been reviewed and rejected or accepted, the administrator can run the After Matching process.

During this process, the ma_final_match_sets table is checked to make sure that proposed matches that had been previously accepted or rejected are not presented to the user again.

After Matching

The objective of the After Matching process is to combine data for assets that were accepted as matching assets by the data administrator. For each set of matched properties, the process creates a composite asset record out of the data for the assets in the group.

The After Matching process is executed automatically or manually by the system administrator and will be explained by referring to FIG. 45. The first script manually executed during the After Matching process is after_matching.pl, which refers to tables ma_match_property through ma_working_working matches, as shown. This script calls ma_after.sql and matching.sql to add the matched assets in the ma_working_matches and ma_working_match_sets tables to the ma_final matches and ma_final_match_sets tables. During this process, sets of assets that were accepted or rejected during the Matching process are inserted into the ma_final_match_sets table so that in the future these match sets will be automatically accepted or rejected.

Figure 45:
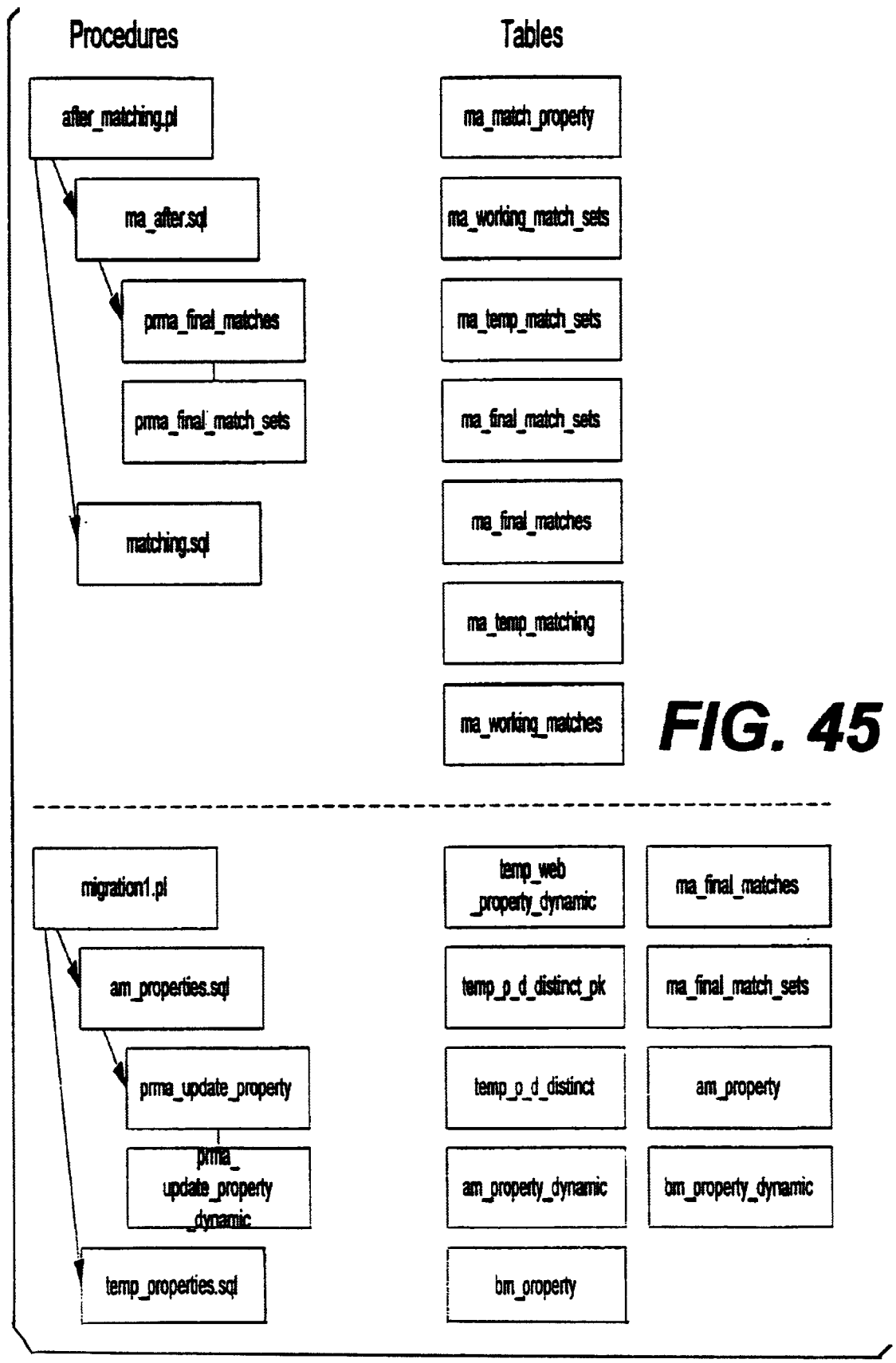
FIG. 45 a diagram of the call flow and corresponding tables used in the after matching sub-process as part of the asset matching process.

The second script that must be executed is migration1.pl, which refers to tables temp_WEB_property_dynamic through bm_property, as shown in FIG. 45. This script calls the pram_update_property and pram_update_property_ dynamic stored procedures as part of the call to am_properties.sql. If an asset record was not matched with any other records during the matching process, then these scripts will copy records directly from the bm_property and bm_property_dynamic tables into the am_property and am_property_dynamic tables. For each of the accepted asset matched records, these procedures will select the minimum values from each of the columns in the accepted matched records to create a composite record. The composite records built from these matched sets are inserted into the am_property and am_property_dynamic tables.

The migration1.pl script is used to remove duplicate records from the am_property_dynamic table. This process creates two temporary tables, temp_p_d_distinct and temp_p_d_distinct_pk.

Figure 46:
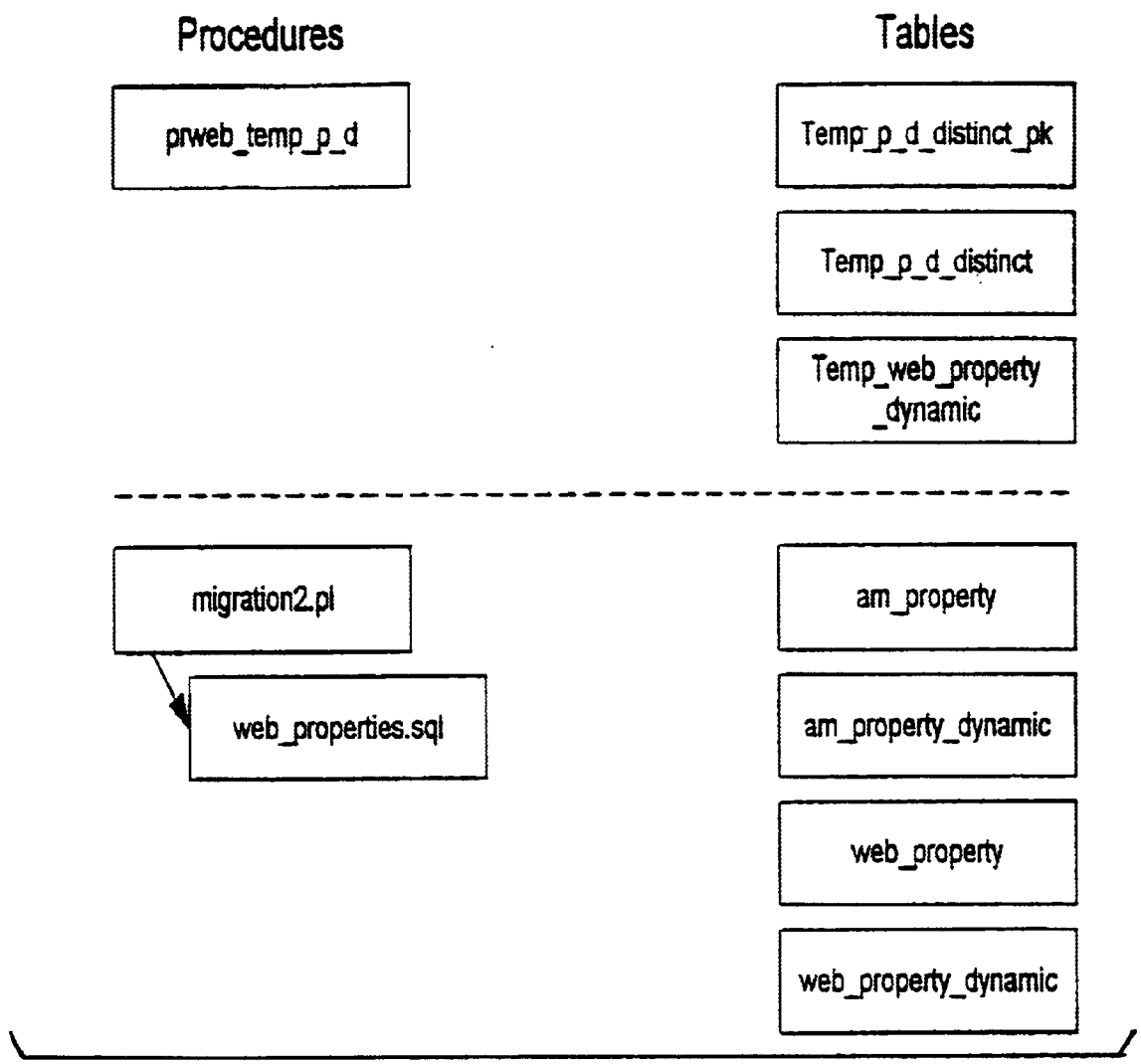
FIG. 46 is a diagram of the call flow and corresponding tables used in the migration process.

With reference to FIG. 46, in a subsequent migration process, all of the asset information is copied to the production database used for reporting. The migration process is executed, preferably manually, by launching the migration.pl script (not shown), that calls the stored procedure prWEB_temp_p_d to build a temporary table called temp_WEB_property_dynamic out of the data in the temp_p_d_distinct and temp_p_d_distinct_pk tables.

Once this step is complete, the script migration2.pl must also be executed, preferably manually, which calls the WEB_properties.sql procedure. This procedure first remove all records in the WEB_property and WEB_property_ dynamic tables. The procedures then copy all of the records from the after matching tables into the WEB_property and WEB_property_dynamic tables. Once this process is complete, the reporting process will use the updated asset information.

Administrative Processes

Figure 47:
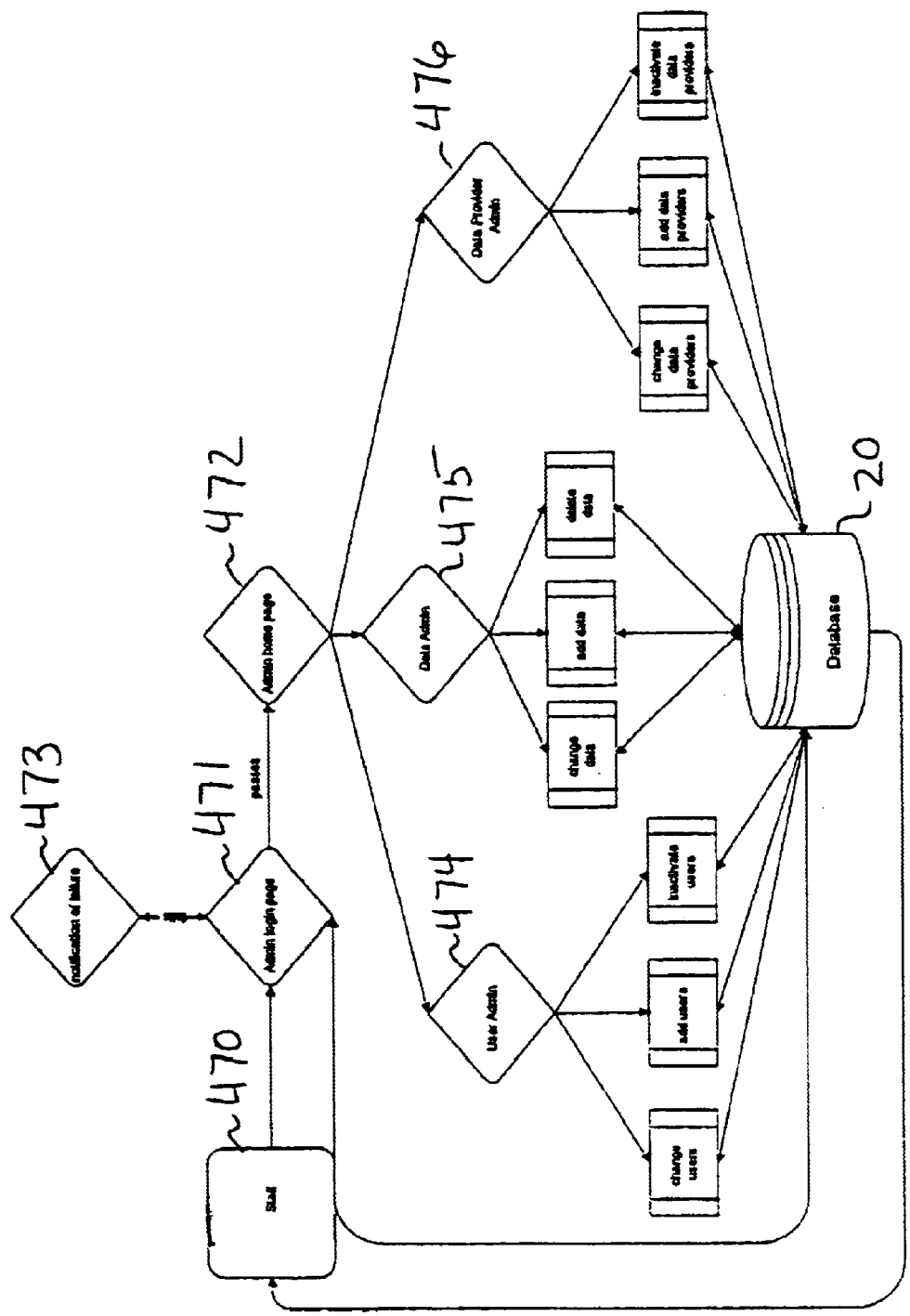
FIG. 47 is a data flow diagram showing data administration functions performed according to the present invention.

FIG. 47 shows the function of the data administration performed by the system administrator. The user information of the system users and the data provider information of the data providers can be performed by the system administrator 470. For example, a staff person of the system administrator can log onto the system using an admin log in page 471 which authorizes the administration functions by passing the user to an admin home page 472 unless the log in fails producing a suitable notification 473. Then, the system administrator can select one of the WEB pages 474, 475 or 476 for making changes to user information, data records of the assets or data provider information, respectively. The functions enabled by the system for maintaining this data are shown in FIG. 47.

Edit Validation Rules

For example, system administrator staff may use the administrative interface to edit the rules used during the validation process. There are four types of validation rules that the data administrator may edit via the administrative interface: domain rules, formula rules, if-then-else rules, and range rules. Several database tables contain the current validation rules used. There are different tables for each type of validation. See FIG. 24. The administrative interface updates the information in these tables.

The first part of the update process involves using a WEB interface, explained with reference to FIG. 47, to change or add validation rules. For each type of rule, there is a WEB page, accessible via the administration interface under Validation Parameters, for example. As a single validation rule is changed or added, the appropriate validation rule table (such as val_chardomain) is updated to reflect the new set of validation rules.

If the data administrator needs to change a foreign key or custom validation rule, then he or she would have to edit the appropriate validation tables directly.

Once the data administrator has made all of the validation rule changes, the validation_first.pl script must be executed manually to backup the old validation rule scripts. The validation_stmts.sql script must then be manually executed. The stored procedure that this script executes, prval_ define_from_template, regenerates the stored procedures for each set of validation rules (such as the stored procedure validate_chardomain). Once all of the validation stored procedures have been regenerated, the script validation_ final.pl must be executed manually to load the new stored procedure into the database.

Edit Asset Matching Iterations

From another WEB page, not shown, such as an Asset Matching Parameters WEB page (asset_matching_ parameters.html), a data administrator can add, edit or delete the asset matching parameters and iterations used during the Asset Matching process. The Parameters page displays all of the records in the ma_criteria2 table. The data administrator can then edit a field (such as the threshold) and save the updated field in the ma_criteria2 table. An iteration parameter can also be created or deleted from this page.

Administer Membership

This process allows users to be added/edited/removed from the system, as shown in FIG. 47. Only users that have been listed as "admin" in the user_category_id field of the WEB_person1 table may perform this function. In addition, all valid users may edit their own member information and change their password through the "Member" area of the WEB site.

Administrator staff may administer users through the WEBsite/DataEntry user interface. This interface allows the administrator to add and edit companies and persons.

The Company add and edit pages display all of the fields (such as company name, address, etc.) found in the WEB_company table. As new companies or changes are made on these pages, the new data is stored directly into WEB_company. The Person add and edit pages display all of the fields (such as name, address, etc.) found in the WEB_person1 table. As new people or changes are made on these pages, the new data is stored directly into WEB_person1.

Reporting Process

Figure 48:
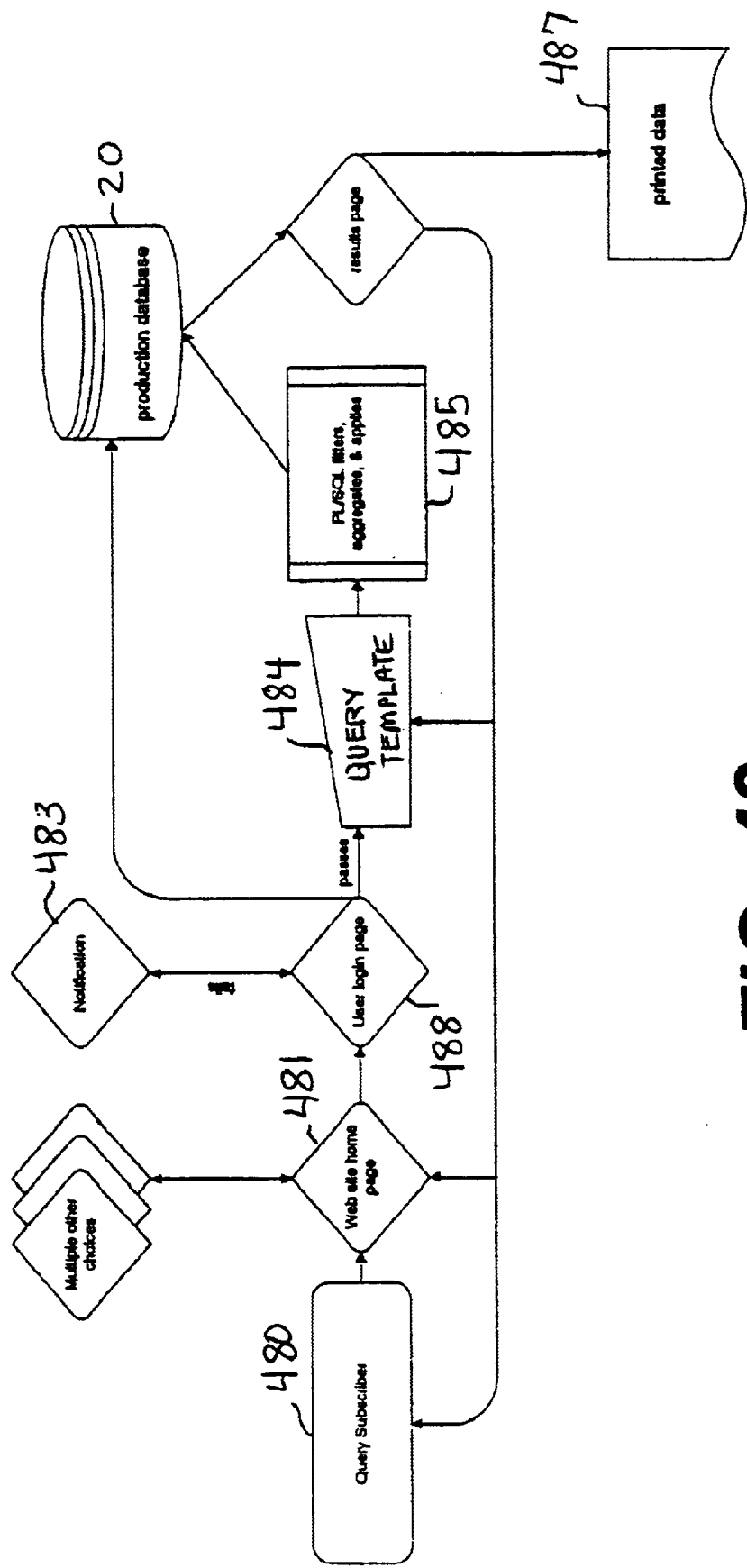
FIG. 48 a data flow diagram showing the user query process performed according to the present invention.

FIG. 48 shows a data flow diagram of the query and reporting process. In particular, a query subscriber 480 makes an inquiry to the system through the WEB site home page 481 and logs into the WEB site through a log in page 482 which either authorizes the user or notifies the user that the log in has failed at step 483. If the log in is authorized, then the user proceeds to the query templates or screens shown in FIGS. 3–7 in step 484 and the result of the query is processed from the production database 20 in step 485 with TL/SQL filter. If the resulting report from the query generated in the query templates fails to pass the confidentiality rules, then the report is not forwarded to the results page 486. Reports that are forwarded to the results page 486 are printed at 487 or otherwise output from the system.

The Reporting Process component provides users with aggregated data reports based on asset information stored in the database. A user can create search criteria for two types of reports: Trend Analysis and Geographic Comparisons. The reporting application is accessible to registered users through the WEB site.

Figure 49:
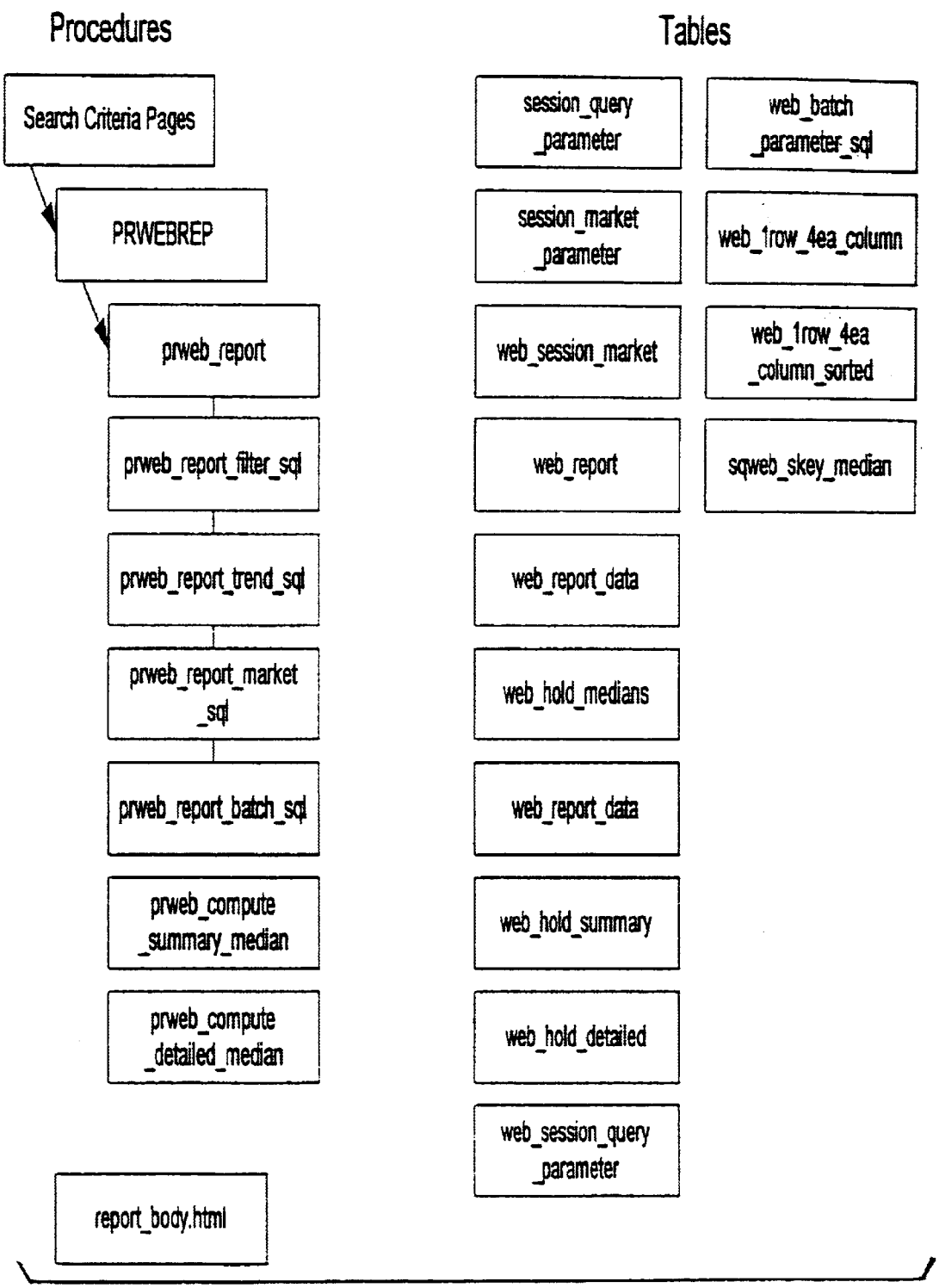
FIG. 49 a diagram of the call flow and corresponding tables used in the reporting process.

Using the report definition pages or templates shown in FIGS. 3–7, the user selects the desired report criteria. The user may select the following criteria types: market, time period, property, and financing. The Search Criteria Pages procedure is executed at the beginning of a search and a stored procedure PRWEBREP is called. Tables session_query_parameter through WEB_session_query_parameter tables are referred to in the execution of the search, as shown in FIG. 49. Each search criteria selected is stored into the session_query_parameter table. The application also uses the ESRI mapping software to present area maps to the user for selecting market areas.

Once the user has specified their search criteria, PRWEBREP is executed to generate the report. Before the report is shown to the user, the data records are analyzed to verify that the search criteria follows the confidentiality rules, such as the 5/3/3 rule (at least 5 assets provided by at least 3 data providers, and at least 3 non-NULL values per field). If the 5/3/3/ rule is met, then a report_body.html page displays the report to the user.

The main function of the PRWEBREP procedure is to call prWEB_report. The prWEB_report procedure builds the query string (based on the user's search criteria) used to search the production database for records to be used in the report. The prWEB_report_market_sql procedure executes each search criteria and stores the results in either the WEB_hold_summary or WEB_hold_detailed table (depending on the type of report requested). The procedure prWEB_compute_summary_medians or prWEB_compute_detailed_medians calculate the averages, medians, and counts for the records returned and store the results in WEB_hold_medians. Finally, the calculated results are inserted into the WEB_report and WEB_report_data tables, which are used to build the body of the report.

Each report request is identified by a session_id. From the report page, users may choose to save a report request for future execution, download a report, or run another report. If the user chooses to run another report, then they are given a new session_id so that each report requested can be tracked in the database.

FIG. 50 shows an example of a WEB page, report_body.html page, that displays a sample summary report 500 that is output by the system. FIG. 51 shows a sample detail report 510 that is output by the system, and FIG. 52 shows a sample detail report statistics 520 that is output in conjunction with the sample detail report 510.

While preferred embodiments have been set forth with specific details, further embodiments, modifications and variations are contemplated according to the broader aspects of the present invention, all as determined by the spirit and scope of the following claims.

I claim:

1. A database system, comprising:

a database or storing data records, each record containing information about a multifamily real estate asset;

a communications server providing communications access for users to said database;

a firewall server connected between said database and said communications server through which data is exchanged between said database and said communications server;

said communications server hosting a query template for requesting report generated from the data records of said database;

means for receiving data from data providers;

means processing said received data including validation processing and asset matching of said received data pertaining to assets with data of stored records of assets;

means for storing said validated and asset matched data in said database;

means processing said report requests, said report processing means receiving a request for data from one said query template, retrieving data from said database in response to said request and generating a report in response to said request, said report processing means further determining if said report generate from said request reveals information of a data record of a single multifamily real estate asset; and means providing said report to said communications server on the basis of said report request unless said report is determined by said report processing means to provide information of a data record of a single multifamily real estate asset.

* * * * *